US007151998B2

(12) United States Patent
Tajima

(10) Patent No.: US 7,151,998 B2
(45) Date of Patent: Dec. 19, 2006

(54) NAVIGATION APPARATUS AND NAVIGATION SYSTEM

(75) Inventor: Hiroshi Tajima, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/521,913

(22) PCT Filed: Jul. 23, 2003

(86) PCT No.: PCT/JP03/09297

§ 371 (c)(1),
(2), (4) Date: Jan. 20, 2005

(87) PCT Pub. No.: WO2004/010386

PCT Pub. Date: Jan. 29, 2004

(65) Prior Publication Data

US 2005/0267679 A1 Dec. 1, 2005

(30) Foreign Application Priority Data

Jul. 24, 2002 (JP) ............................ 2002-215269

(51) Int. Cl.
*G01C 21/30* (2006.01)

(52) U.S. Cl. ...................... 701/209; 701/201; 701/207; 340/928; 235/380

(58) Field of Classification Search ............ 701/23–26, 701/200–201, 207–209, 213; 705/1, 10, 705/16–17, 20–21, 400, 412, 401, 417–418; 340/928, 933; 235/375–378, 380, 382, 384
See application file for complete search history.

(56) References Cited

U.S. PATENT DOCUMENTS 5,490,079 A * 2/1996 Sharpe et al. ............... 705/418
5,991,689 A * 11/1999 Aito et al. .................. 701/209
6,019,285 A * 2/2000 Isobe et al. ................. 235/384
6,042,008 A * 3/2000 Ando et al. ................. 235/384
6,140,941 A * 10/2000 Dwyer et al. ............... 340/928
6,591,172 B1 * 7/2003 Oda et al. ...................... 701/23
6,684,156 B1 * 1/2004 Fujimoto et al. ........... 701/212
6,937,162 B1 * 8/2005 Tokitsu et al. .............. 340/928

FOREIGN PATENT DOCUMENTS

| | | |
|---|---|---|
| JP | 10-293866 | 11/1998 |
| JP | 2000-311261 | 11/2000 |
| JP | 2002-49945 | 2/2002 |

OTHER PUBLICATIONS

International Search report corresponding to application no. PCT/JP03/09297 dated Nov. 11, 2003.

* cited by examiner

*Primary Examiner*—Gertrude A. Jeanglaude
(74) *Attorney, Agent, or Firm*—RatnerPrestia

(57) ABSTRACT

A navigation apparatus includes a position detecting device for detecting a current position of an automotive vehicle, an operation mode setting device for setting whether or not an electronic toll collection system is utilized on a toll road, and a communication device for performing communication with an in-vehicle apparatus provided in the automotive vehicle as part of the electronic toll collection system. The communication device is operative to transmit a signal to the in-vehicle apparatus to change an operation mode in which the electronic toll collection system is utilized.

7 Claims, 30 Drawing Sheets

NAVIGATION APPARATUS AND NAVIGATION SYSTEM

This application is a U.S. national phase application of PCT International application PCT/JP2003/009297.

TECHNICAL FIELD OF THE INVENTION

The present invention relates to a navigation apparatus, an in-vehicle apparatus to be provided in an automotive vehicle to allow an electronic toll collection system to be utilized by its user, and a navigation system to be provided with the navigation apparatus electrically connected to the in-vehicle apparatus.

DESCRIPTION OF THE RELATED ART

In recent years, there have been put in practice an electronic toll collection system (ETC system) as an example of an automated toll collection system, and expected to be used in an expanded range on a toll road. The ETC system is operative to perform short range communication with an automotive vehicle on the toll road through a microwave.

One example of conventionally known ETC in-vehicle apparatuses is shown in FIG. 30 as being provided in the automotive vehicle as part of the ETC system.

As shown in FIG. 30, information on a toll of a toll road is transmitted to the conventional ETC in-vehicle apparatus 900 from a computer system (not shown) disposed on the toll road through an antenna (not shown). On the other hand, the information on the toll of the toll road is received by the conventional ETC in-vehicle apparatus 900 through an antenna 910.

The information received by the conventional ETC in-vehicle apparatus 900 through the antenna 910 is processed by the wireless communication unit 920. The processed information is then outputted as a signal to be processed by a central processing unit (CPU) 930.

When, for example, the information on the toll of the toll road is received from the computer system disposed on the toll road, the information can be stored by the CPU 930 in an ETC card (not shown) inserted in the conventional ETC in-vehicle apparatus 900 on the basis of the information outputted from the wireless communication unit 920.

The information on whether or not the information on the toll of the toll road is normally stored in the ETC card is required for the computer system disposed on the toll road to judge whether or not the information on the toll of the toll road is normally stored in the ETC card by the conventional ETC in-vehicle apparatus 900.

The ETC in-vehicle apparatus 900 will be more specifically described hereinafter. The CPU 930 of the conventional ETC in-vehicle apparatus 900 is operated to produce information to be transmitted to a computer system disposed on the toll road. The wireless communication unit 920 is then operated to process and transmit the produced information to the computer system disposed on the toll road through the antenna 910.

As a result of the fact that the communication is established between the conventional ETC in-vehicle apparatus 900 and the above mentioned computer system disposed on the toll road, the CPU 930 of the conventional ETC in-vehicle apparatus 900 can process the information on the toll of the toll road and other information on whether or not the automotive vehicle is allowed to get on the toll road through the ETC lane by utilizing the ETC system.

The CPU 930 can judge whether or not each of the antenna 910, the wireless communication unit 920 and other constitutional elements of the conventional ETC in-vehicle apparatus 900 is functioning properly, and additionally whether or not the ETC card is inserted in the conventional ETC in-vehicle apparatus 900.

The conventional ETC in-vehicle apparatus 900 can allow the user to receive the above mentioned information on the toll and various types of judgments through an image displayed by a display apparatus (not shown) and a sound produced by a speaker unit (not shown).

Additionally, the conventional ETC in-vehicle apparatus 900 can be electrically connected to an external apparatus (not shown) through the interface unit 940 and the signal input and output terminal 950, and output the above mentioned information on the toll and various types of judgments to the external apparatus through the interface unit 940 and the signal input and output terminal 950 in response to an instruction issued by the external apparatus.

The above mentioned conventional ETC in-vehicle apparatus 900, however, encounters such a problem that the conventional ETC in-vehicle apparatus tends to impose tedious tasks on its user.

The conventional ETC in-vehicle apparatus will be more specifically described hereinafter.

When the conventional ETC in-vehicle apparatus 900 is in an active mode to allow the user to utilize the ETC system at an entrance of the toll road by having the ETC card inserted therein, the automotive vehicle is allowed to get on the toll road with the ETC system through the ETC lane. When, for example, the non-ETC lane is mistakenly selected at the entrance of the toll road, or the ETC in-vehicle apparatus is in an inactive mode to prevent the user from utilizing the ETC system without having the ETC card inserted therein, the automotive vehicle is not allowed to get on the toll road with the ETC system through the ETC lane.

If the automotive vehicle gets on the toll road with the ETC system, the automotive vehicle is allowed to get off the toll road with the ETC system through the ETC lane. When, for example, the non-ETC lane is mistakenly selected at the exit of the toll road, or the ETC in-vehicle apparatus is in the inactive mode to prevent the user from utilizing the ETC system at the exit of the toll road without having the ETC card inserted therein, the automotive vehicle is not allowed to get off the toll road with the ETC system through the ETC lane.

When, on the other hand, the conventional ETC in-vehicle apparatus 900 is in the inactive mode to prevent the user from utilizing the ETC system at the entrance of the toll road without having the ETC card inserted therein, the automotive vehicle is allowed to get on the toll road without the ETC system through the non-ETC lane.

When the ETC lane is. mistakenly selected at the entrance of the toll road, and the ETC in-vehicle apparatus is in the active mode to allow the user to utilize the ETC system at an entrance of the toll road by having the ETC card inserted therein, the automotive vehicle is not allowed to get on the toll road without the ETC system through the non-ETC lane even if the user dares not to utilize the ETC system.

When the automotive vehicle gets on the toll road through the non-ETC lane with a ticket issued at the entrance of the toll road, the automotive vehicle is allowed to get off the toll road through the non-ETC lane. Even if the ETC lane is mistakenly the exit of the toll road, the user cannot utilize the ETC system.

When the ETC system cannot be utilized by the user on the ETC lane of the entrance or the exit of the toll road, the automotive vehicle cannot pass through the entrance or the exit of the toll road with a closed toll bar.

From the above detail description, the conventional ETC in-vehicle apparatus 900 tends to impose on the user a tedious task of carefully checking whether or not the traffic sign is indicative of the ETC lane at the entrance or the exit of the toll road.

When the user of the conventional ETC in-vehicle apparatus 900 carelessly fails to remember about whether or not the automotive vehicle gets on the toll road with the ETC system through the ETC lane, the conventional ETC in-vehicle apparatus 900 tends to impose a tedious task on the user with a lane mistakenly selected at the exit of the toll road.

When the user of the conventional ETC in-vehicle apparatus 900 forgets to turn off the conventional ETC in-vehicle apparatus 900, or to eject the ETC card from the conventional ETC in-vehicle apparatus 900 in a rest area of the toll road, the user of the conventional ETC in-vehicle apparatus 900 tends to rush to turn on the conventional ETC in-vehicle apparatus 900, or to insert the ETC card into the conventional ETC in-vehicle apparatus 900 in the vicinity of the exit of the toll road. This leads to the fact that the conventional ETC in-vehicle apparatus 900 imposes on the user of the conventional ETC in-vehicle apparatus 900 a tedious task of turning on the conventional ETC in-vehicle apparatus 900, or inserting the ETC card into the conventional ETC in-vehicle apparatus 900 in the vicinity of the exit of the toll road.

When the automotive vehicle gets on the toll road with the ETC system, the conventional ETC in-vehicle apparatus 900 tends to impose on the user of the conventional ETC in-vehicle apparatus 900 a tedious task of ejecting the ETC card from the conventional ETC in-vehicle apparatus 900 to ensure that the conventional ETC in-vehicle apparatus 900 is in the inactive mode to prevent the user from utilizing the ETC system.

The conventional ETC in-vehicle apparatus 900 can more enlarge the tedious task to be imposed on the user of the conventional ETC in-vehicle apparatus 900 in response to the increased number of toll roads of the travel route.

It is, therefore, an object of the present invention to provide a navigation apparatus which can reduce the tedious task to be imposed on the user of the ETC system in comparison with the tedious task to be imposed on the user of the ETC system by the conventional apparatus.

DISCLOSURE OF THE INVENTION

In accordance with the present invention, there is provided a navigation apparatus, comprising: position detecting means for detecting a current position of an automotive vehicle; destination setting means for setting a destination of the automotive vehicle; travel route setting means for setting a travel route to the destination set by the destination setting means on the basis of the current position detected by the position detecting means; operation mode setting means for setting whether or not to utilize an electronic toll collection system on a toll road of the travel route set by the travel route setting means; and communication means for performing communication with an in-vehicle apparatus provided in the automotive vehicle as part of the electronic toll collection system, the communication means being operative to transmit a signal to the in-vehicle apparatus to change an operation mode of the in-vehicle apparatus to the electronic toll collection system.

The navigation apparatus thus constructed as previously mentioned according to the present invention can reduce the tedious task to be imposed on the user of the electric toll collection system in comparison with the tedious task to be imposed on the user of the electric toll collection system by the conventional apparatus by reason that the navigation apparatus is operative to set the in-vehicle apparatus to the inactive mode to prevent the electric toll collection system from being utilized in response to the signal received from the communication means without allowing the user of the electric toll collection system to eject the card from the in-vehicle apparatus when, for example, the automotive vehicle is guided without the electric toll collection system into the toll road.

The navigation apparatus thus constructed as previously mentioned according to the present invention can reduce the tedious task to be imposed on the user of the electric toll collection system in comparison with the tedious task to be imposed on the user of the electric toll collection system by the conventional apparatus by reason that the navigation apparatus is operative to set the in-vehicle apparatus to the active mode to allow the electric toll collection system to be utilized in response to the signal received from the communication means without allowing the user of the electric toll collection system to insert the card into the in-vehicle apparatus when, for example, the automotive vehicle is guided with the electric toll collection system into the toll road.

In accordance with the present invention, there is provided a navigation apparatus, comprising: position detecting means for detecting a current position of an automotive vehicle; destination setting means for setting a destination of the automotive vehicle; travel route setting means for setting a travel route to the destination set by the destination setting means on the basis of the current position detected by the position detecting means; operation mode setting means for setting whether or not an electronic toll collection system is utilized on a toll road of the travel route set by the travel route setting means; and guiding means for guiding the automotive vehicle through the travel route set by the travel route setting means, when the judgment is made that there are electric toll collection system supporting and non-supported lanes on the travel route set by the travel route setting means, the guiding means being operative to guide the automotive vehicle into any one of an electric toll collection system supporting and non-supported lanes on the basis of the setting of the operation mode setting means.

The navigation apparatus thus constructed as previously mentioned according to the present invention can reduce the tedious task to be imposed on the user of the electric toll collection system in comparison with the tedious task to be imposed on the user of the electric toll collection system by the conventional apparatus by reason that the guiding unit is operative to guide the automotive vehicle into any one of the lanes on the basis of the setting of the operation mode setting means without allowing the user of the electric toll collection system to check guide plates and traffic signs at the entrance or exit of the toll road.

The navigation apparatus thus constructed as previously mentioned according to the present invention can reduce the tedious task to be imposed on the user of the electric toll collection system in comparison with the tedious task to be imposed on the user of the electric toll collection system by the conventional apparatus by reason that the guiding unit is operative to guide the automotive vehicle into any one of lanes on the basis of the setting of the operation mode setting means without allowing the user of the electric toll collection system to check whether or not the traffic sign is indicative of the ETC lane at the entrance or the exit of the toll road even if the user of the electric toll collection system carelessly fails to remember about whether or not the automotive vehicle gets on the toll road with the electric toll collection system through the ETC lane.

The navigation apparatus according to the present invention may further comprises: communication means for performing communication with an in-vehicle apparatus provided in the automotive vehicle as part of the electronic toll collection system; and a warning means for issuing a warning. The communication means may be operative to obtain from the in-vehicle apparatus mode information about whether or not the in-vehicle apparatus is in an active mode to allow the electronic toll collection system to be utilized. The warning means may be operative to issue a warning on the basis of the setting of the operation mode setting means and the mode information obtained by the communication means.

The navigation apparatus thus constructed as previously mentioned according to the present invention can prevent the user of the electric toll collection system from rushing to turn on the in-vehicle apparatus, or rushing to insert the card into the in-vehicle apparatus by reason that the warning means is operative to issue a warning when the judgment is made that the in-vehicle apparatus is not in the active mode to prevent the electric toll collection system from being utilized on the travel route although the operation mode setting means is operated to switch to the active mode to allow the electric toll collection system to be utilized on the travel route. Accordingly, the navigation apparatus can reduce the tedious task to be imposed on the user of the electric toll collection system.

The navigation apparatus according to the present invention may further comprises: communication means for performing communication with an in-vehicle apparatus provided in the automotive vehicle as part of the electronic toll collection system; and a warning means for issuing a warning. The communication means is operative to obtain from the in-vehicle apparatus mode information about whether or not the in-vehicle apparatus is in an active mode to allow the electronic toll collection system to be utilized. The warning means is operative to issue the warning on the basis of the setting of the operation mode setting means and the mode information obtained by the communication means when the guiding means is operated to guide the automotive vehicle into any one of the lanes.

The navigation apparatus thus constructed as previously mentioned according to the present invention can allow the user of the electric toll collection system to set the in-vehicle apparatus to the active mode to allow the electric toll collection system to be utilized on the toll road in an early stage by reason that the warning means is operative to issue a warning when the judgment is made that the in-vehicle apparatus is in the inactive mode to prevent the user from utilizing the electric toll collection system although the automotive vehicle is guided into the ETC lane, compared with a task to be imposed by an apparatus which fails to comprise a warning unit 422 for issuing the warning.

Accordingly, the navigation apparatus can reduce the tedious task to be imposed on the user of the electric toll collection system by preventing the user of the electric toll collection system from rushing to turn on the in-vehicle apparatus to ensure that the electric toll collection system is utilized on the toll road when the automotive vehicle is guided with the electric toll collection system on the toll road, compared with a task to be imposed by an apparatus which fails to comprise a warning unit 422 for issuing the warning.

The navigation apparatus according to the present invention may further comprises: communication means for performing communication with an in-vehicle apparatus provided in the automotive vehicle as part of the electronic toll collection system. The communication means is operative to obtain from the in-vehicle apparatus mode information about whether or not the in-vehicle apparatus is in an active mode to allow the electronic toll collection system to be utilized. The guiding means is operative to guide the automotive vehicle into any one of the lanes on the basis of the setting of the operation mode setting means and the mode information obtained by the communication means.

The navigation system thus constructed as previously mentioned according to the present invention can allow the user of the electric toll collection system to set the in-vehicle apparatus to the active mode to allow the electric toll collection system to be utilized on the toll road by reason that the guiding means is operative to guide the automotive vehicle into the non-ETC lane on the basis of the current position detected by the position detecting unit 313 when the judgment is made that the in-vehicle apparatus is in the inactive mode to prevent the user from utilizing the electric toll collection system.

The navigation apparatus thus constructed as previously mentioned according to the present invention can prevent the user of the electric toll collection system from rushing to turn on the in-vehicle apparatus, or rushing to insert the card into the in-vehicle apparatus by reason that the warning means is operative to issue a warning when the judgment is made that the in-vehicle apparatus is not in the active mode to prevent the electric toll collection system from being utilized on the travel route although the operation mode setting means is operated to switch to the active mode to allow the electric toll collection system to be utilized on the travel route. Accordingly, the navigation apparatus can reduce the tedious task to be imposed on the user of the electric toll collection system.

The navigation apparatus according to the present invention may further comprises: toll information storing means for storing toll information on a toll depending on whether or not the electric toll collection system is utilized on the toll road, and toll calculating means for calculating a toll to be collected on the toll road of the travel route set by the travel route setting unit on the basis of the toll information stored in the toll information storing unit and the setting of the operation mode setting unit.

The navigation system thus constructed as previously mentioned according to the present invention can allow the user of the electric toll collection system to set whether or not to utilize the electric toll collection system through the toll road of the travel route after allowing the user of the electric toll collection system to recognize the difference the toll to be collected with the electric toll collection system and the toll to be collected without the electric toll collection system by reason that the navigation system is operative to calculate the toll of the toll road of the travel route set by judging whether or not the electric toll collection system is utilized on the toll road.

In the navigation apparatus according to the present invention, the operation mode setting means includes toll road extracting means for extracting a toll road from the travel route set by the travel route setting unit, and toll road setting means for setting in each toll road extracted by the toll road extracting means whether or not an electronic toll collection system is utilized.

The navigation system thus constructed as previously mentioned according to the present invention can reduce the tedious task to be imposed on the user of the electric toll collection system in comparison with the tedious task to be imposed on the user of the electric toll collection system by the conventional apparatus by reason that the toll road setting means is operative to set in each toll road extracted by the toll road extracting means whether or not an electronic toll collection system is utilized even if there are two or more toll road on the travel route.

In accordance with the present invention, there is provided a navigation apparatus, comprising: position detecting means for detecting a current position of an automotive vehicle; operation mode setting means for setting whether or not an electronic toll collection system is utilized on a toll road of the travel route set by the travel route setting means; and communication means for performing communication with an in-vehicle apparatus provided in the automotive vehicle as part of the electronic toll collection system, the communication means being operative to transmit a signal to the in-vehicle apparatus to change an operation mode of the in-vehicle apparatus to the electronic toll collection system.

The navigation apparatus thus constructed as previously mentioned according to the present invention can reduce the tedious task to be imposed on the user of the electric toll collection system in comparison with the tedious task to be imposed on the user of the electric toll collection system by the conventional apparatus by reason that the in-vehicle apparatus is operative to assume the inactive mode to prevent the electric toll collection system from being utilized in response to the signal received from the communication means without ejecting the card from the in-vehicle apparatus when, for example, the automotive vehicle is guided without the electric toll collection system into the toll road.

The navigation apparatus thus constructed as previously mentioned according to the present invention can reduce the tedious task to be imposed on the user of the electric toll collection system in comparison with the tedious task to be imposed on the user of the electric toll collection system by the conventional apparatus by reason that the in-vehicle apparatus is operative to assume the active mode to allow the electric toll collection system to be utilized in response to the signal received from the communication means without inserting the card into the in-vehicle apparatus when, for example, the automotive vehicle is guided with the electric toll collection system into the toll road.

In accordance with the present invention, there is provided a navigation apparatus, comprising: position detecting means for detecting a current position of an automotive vehicle; communication means for performing communication with an in-vehicle apparatus provided in the automotive vehicle as part of the electronic toll collection system; and guiding means for guiding the automotive vehicle into any one of lanes, and in which communication means for performing communication with an in-vehicle apparatus provided in the automotive vehicle as part of the electronic toll collection system, the communication means being operative to transmit a signal to the in-vehicle apparatus to change an operation mode of the in-vehicle apparatus to the electronic toll collection system.

The navigation apparatus thus constructed as previously mentioned according to the present invention can reduce the tedious task to be imposed on the user of the electric toll collection system in comparison with the tedious task to be imposed on the user of the electric toll collection system by the conventional apparatus by reason that the guiding unit is operative to guide the automotive vehicle into a lane based on the setting of the operation mode setting means without allowing the user of the electric toll collection system to check the traffic sign indicative of the ETC lane or the non-ETC lane at the entrance of the toll road or at the exit of the toll road.

The navigation apparatus thus constructed as previously mentioned according to the present invention can reduce the tedious task to be imposed on the user of the electric toll collection system in comparison with the tedious task to be imposed on the user of the electric toll collection system by the conventional apparatus by reason that the guiding unit is operative to guide the automotive vehicle into a lane based on the utilization information received from the in-vehicle apparatus through the communication unit even if the user carelessly forgets the fact that the automotive vehicle is guided with the electric toll collection system at the entrance of the toll road, or without the electric toll collection system at the entrance of the current toll road.

In accordance with the present invention, there is provided an in-vehicle apparatus, comprises: communication means for performing communication with a navigation apparatus; and an operation mode switching means for switching its operation mode in which an electronic toll collection system is utilized on the basis of a signal received from the navigation apparatus by the communication means.

The in-vehicle apparatus according to the present invention can reduce the tedious task to be imposed on the user of the electric toll collection system in comparison with the tedious task to be imposed on the user of the electric toll collection system by the conventional apparatus by reason that the in-vehicle apparatus is operative to assume the inactive mode to prevent the electric toll collection system from being utilized in response to the signal received from the communication means without ejecting the card from the in-vehicle apparatus when, for example, the automotive vehicle is guided without the electric toll collection system at the entrance of the toll road.

The in-vehicle apparatus according to the present invention can reduce the tedious task to be imposed on the user of the electric toll collection system in comparison with the tedious task to be imposed on the user of the electric toll collection system by the conventional apparatus by reason that the in-vehicle apparatus is operative to assume the active mode to allow the electric toll collection system to be utilized in response to the signal received from the communication means without inserting the card into the in-vehicle apparatus when, for example, the automotive vehicle is guided with the electric toll collection system at the entrance of the toll road.

In accordance with the present invention, there is provided a navigation system, comprising: a navigation apparatus; and an in-vehicle apparatus provided in the automotive vehicle as part of the electronic toll collection system to perform communication with the communication means of the navigation apparatus.

The navigation system according to the present invention can reduce the tedious task to be imposed on the user of the electric toll collection system in comparison with the tedious task to be imposed on the user of the electric toll collection system by the conventional apparatus by reason that the navigation apparatus can reduce the tedious task to be imposed on the user of the electric toll collection system in comparison with the tedious task to be imposed on the user of the conventional apparatus.

BRIEF DESCRIPTION OF THE DRAWINGS

The features and advantages of a navigation apparatus, an in-vehicle apparatus, and a navigation system according to the present invention will be more clearly understood from the following description taken in conjunction with the accompanying drawings.

DESCRIPTION OF THE PREFERRED EMBODIMENTS

The embodiments of the navigation apparatus, the in-vehicle apparatus, and the navigation system will be described hereinafter in accordance with accompanying drawings.

(First Embodiment)

The following description will now be directed to the constitution of the first embodiment of the navigation apparatus, the in-vehicle apparatus, and the navigation system according to the present invention.

Figure 1:
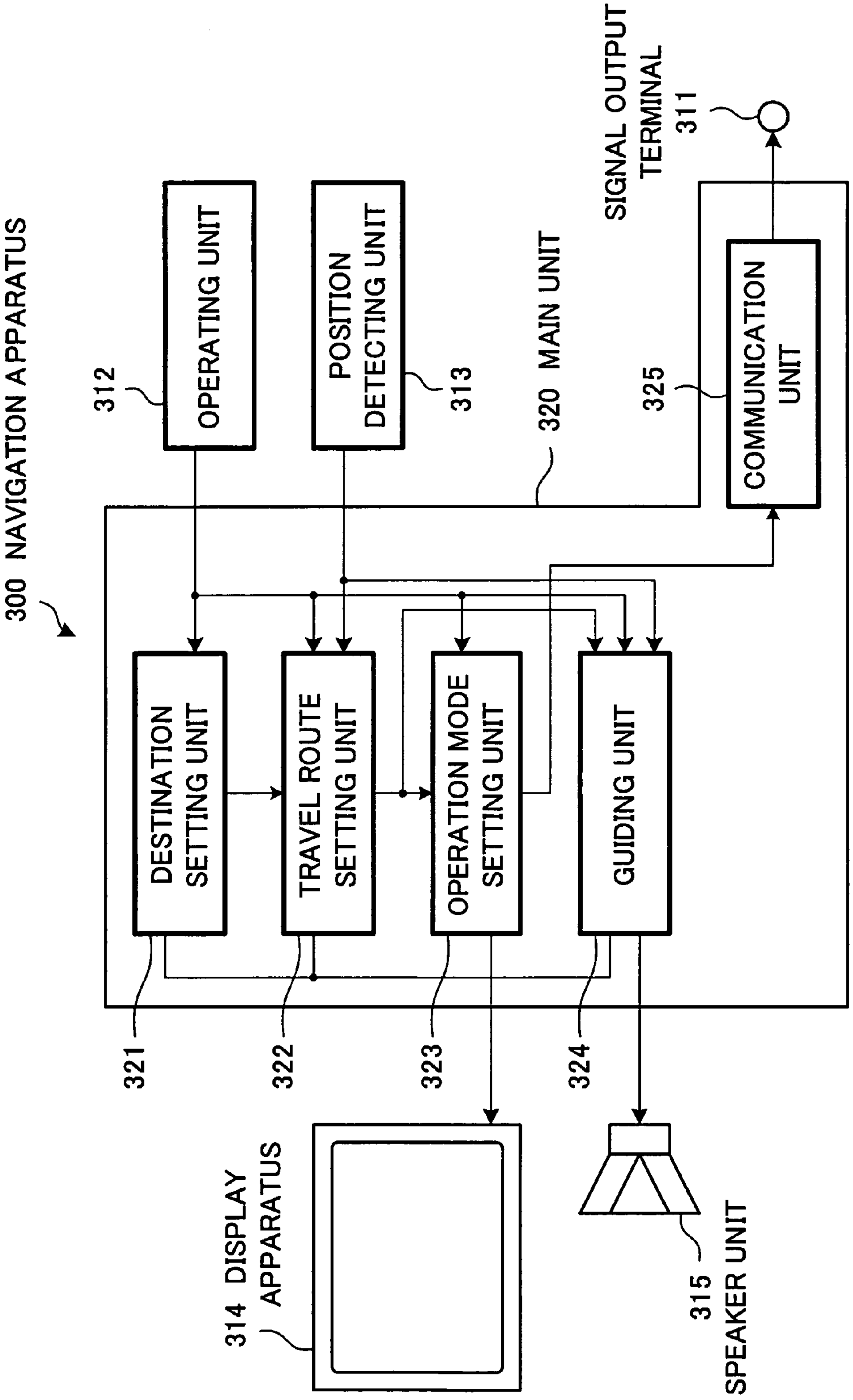
FIG. 1 is a block diagram showing the navigation apparatus according to the first embodiment of the present invention.
Figure 2:
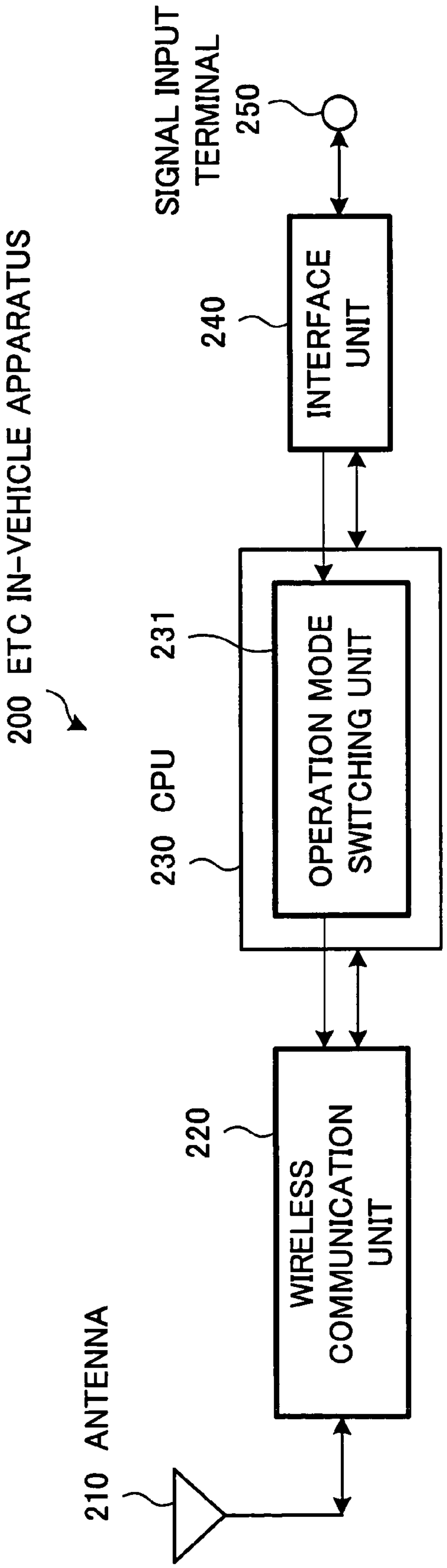
FIG. 2 is a block diagram showing the in-vehicle apparatus according to the first embodiment of the present invention.
Figure 3:
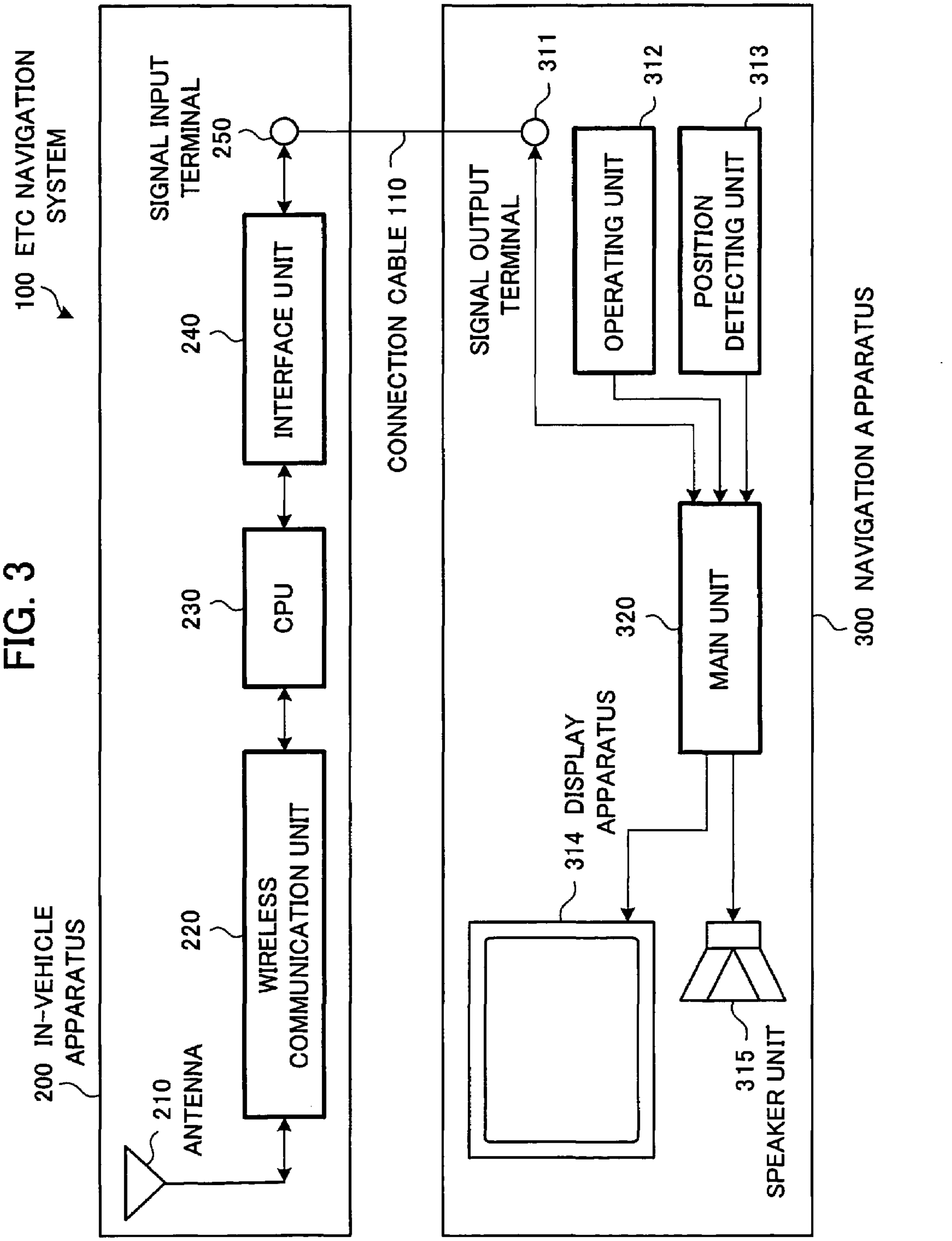
FIG. 3 is a block diagram showing the navigation system according to the first embodiment of the present invention.

As shown in FIGS. 1 to 3, the ETC navigation system 100 shown as a navigation system according to the first embodiment is operative in combination with an electronic toll collection system (ETC system) shown as an example of an automated toll collection system. The ETC navigation system 100 comprises an ETC in-vehicle apparatus 200 shown as an in-vehicle apparatus according to the first embodiment, the ETC in-vehicle apparatus 200 being provided in an automotive vehicle as part of the ETC system, a navigation apparatus 300 according to the first embodiment, and a connection cable 110 intervening between the ETC in-vehicle apparatus 200 and the navigation apparatus 300 to ensure that the ETC in-vehicle apparatus 200 is electrically connected to the navigation apparatus 300.

The navigation apparatus 300 comprises a signal output terminal 311 having outputted therethrough a signal which is outputted to the ETC in-vehicle apparatus 200, an operating unit 312 to be operated by an user, a position detecting unit 313 constituting position detecting means for detecting a current position of the automotive vehicle, a display apparatus 314 having displayed thereon image information, a speaker unit 315 for outputting sound information, and a main unit 320.

The main unit 320 comprises a destination setting unit 321 constituting destination setting means for setting a destination of the automotive vehicle, a travel route setting unit 322 constituting travel route setting means for setting a travel route to the destination set by the destination setting means on the basis of the current position detected by the position detecting unit 313, an operation mode setting unit 323 constituting operation mode setting means for setting whether or not to have the ETC system utilized on a toll road of the travel route set by the travel route setting unit 322, a guiding unit 324 constituting guiding means for guiding the automotive vehicle through the travel route set by the travel route setting unit 322 on the basis of the setting of the operation mode setting unit 323, and a communication unit 325 constituting communication means for performing communication with the ETC in-vehicle apparatus 200.

The destination setting unit 321 is operative to receive a signal from the operating unit 312, and to produce signals to be respectively outputted to the display apparatus 314 and the travel route setting unit 322. The destination setting unit 321 is constituted by a central processing unit (not shown) and a memory unit (not shown).

The travel route setting unit 322 is operative to receive signals from the operating unit 312, the position detecting unit 313 and the destination setting unit 321, and to produce signals to be respectively outputted to the display apparatus 314, the operation mode setting unit 323 and the guiding unit 324. The travel route setting unit 322 is constituted by a central processing unit (not shown) and a memory unit (not shown).

The operation mode setting unit 323 is operative to receive signals from the operating unit 312 and the travel route setting unit 322, and to produce signals to be respectively outputted to the display apparatus 314 and the communication unit 325. The operation mode setting unit 323 is constituted by a central processing unit (not shown) and a memory unit (not shown).

The guiding unit 324 is operative to receive signals from the operating unit 312, the position detecting unit 313 and the travel route setting unit 322, and to produce signals to be respectively outputted to the display apparatus 314 and the speaker unit 315. The guiding unit 324 is constituted by a central processing unit (not shown) and a memory unit (not shown).

The communication unit 325 is operative to receive a signal from the operation mode setting unit 323, and to produce a signal to be outputted to the signal output terminal 311. The communication unit 325 is constituted by a central processing unit (not shown), a memory unit (not shown) and an interface unit (not shown).

The communication unit 325 is operative to transmit an inactive mode setting signal to the ETC in-vehicle apparatus 200 as a switching signal to have the ETC in-vehicle apparatus 200 selectively assume active and inactive modes on the basis of the setting of the operation mode setting unit 323, and operative to have the ETC in-vehicle apparatus 200 assume the inactive mode to prevent the ETC system from being utilized in response to the inactive mode setting signal.

The ETC in-vehicle apparatus 200 includes an antenna 210 for receiving information from an roadside antenna (not shown) located at a toll station, and transmitting information to the roadside antenna, a wireless communication unit 220 for processing each of the information received through the antenna 210 and the information to be transmitted to the roadside antenna through the antenna 210, a central processing unit (CPU) 230 for processing the information received from the wireless communication unit 220, and producing information to be transmitted to a computer system (not shown) located on the toll road, a display apparatus (not shown) for displaying image information on an accounting and various types of judgments of the CPU 230, a speaker unit (not shown) for producing a sound on the basis of the information on the accounting and various types of judgments of the CPU 230, an interface unit 240 to be electrically connected to the navigation apparatus 300 through each of the connection cable 110 and a signal input terminal 250.

Here, the interface unit 240 and the signal input terminal 250 collectively constitute communication means for performing communication with the navigation apparatus 300.

The CPU 230 includes an operation mode switching section 231 constituting operation mode switching means for switching to the inactive mode to prevent the ETC system from being utilized in response to the inactive mode setting signal received from the navigation apparatus 300 through the interface unit 240.and the signal input terminal 250.

The following description will then be directed to the operation of the navigation apparatus, the in-vehicle apparatus and the navigation system according to the first embodiment of to the present invention.

The destination setting unit 321 of the navigation apparatus 300 is firstly operated to set the destination of the automotive vehicle in response to the operation of the operating unit 312 by having the display apparatus 314 display an image to be watched by the user in response to the operation of the operating unit 312.

The travel route setting unit 322 is then operated to set the travel route to the destination set by the destination setting unit 321 in response to the operation of the operating unit 312 by having the display apparatus 314 display an image to be watched by the user on the basis of the in response to the operation of the operating unit 312, the current position detected by the position detecting unit 313, and the destination set by the destination setting unit 321.

The operation mode setting unit 323 is then operated to judging whether or not to set the active mode to allow the ETC system to be utilized on a toll road of the travel route set by the travel route setting unit 322 in response to the operation of the operating unit 312 by having the display apparatus 314 display an image to be watched by the user in response to the operation of the operating unit 312 and the travel route set by the travel route setting unit 322.

When the instruction signal to start to guide the automotive vehicle is outputted to the guiding unit 324 from the operating unit 312, the guiding unit 324 is operated to start to guide the automotive vehicle through the travel route set by the travel route setting unit 322 by having the display apparatus 314 display an image, and by having the speaker unit 315 produce a sound on the basis of the current position detected by the position detecting unit 313.

When, on the other hand, the judgment made that the ETC system is not utilized on the toll road of the travel route set by the travel route setting unit 322, the inactive mode setting signal is outputted to the ETC in-vehicle apparatus 200.

Figure 4:
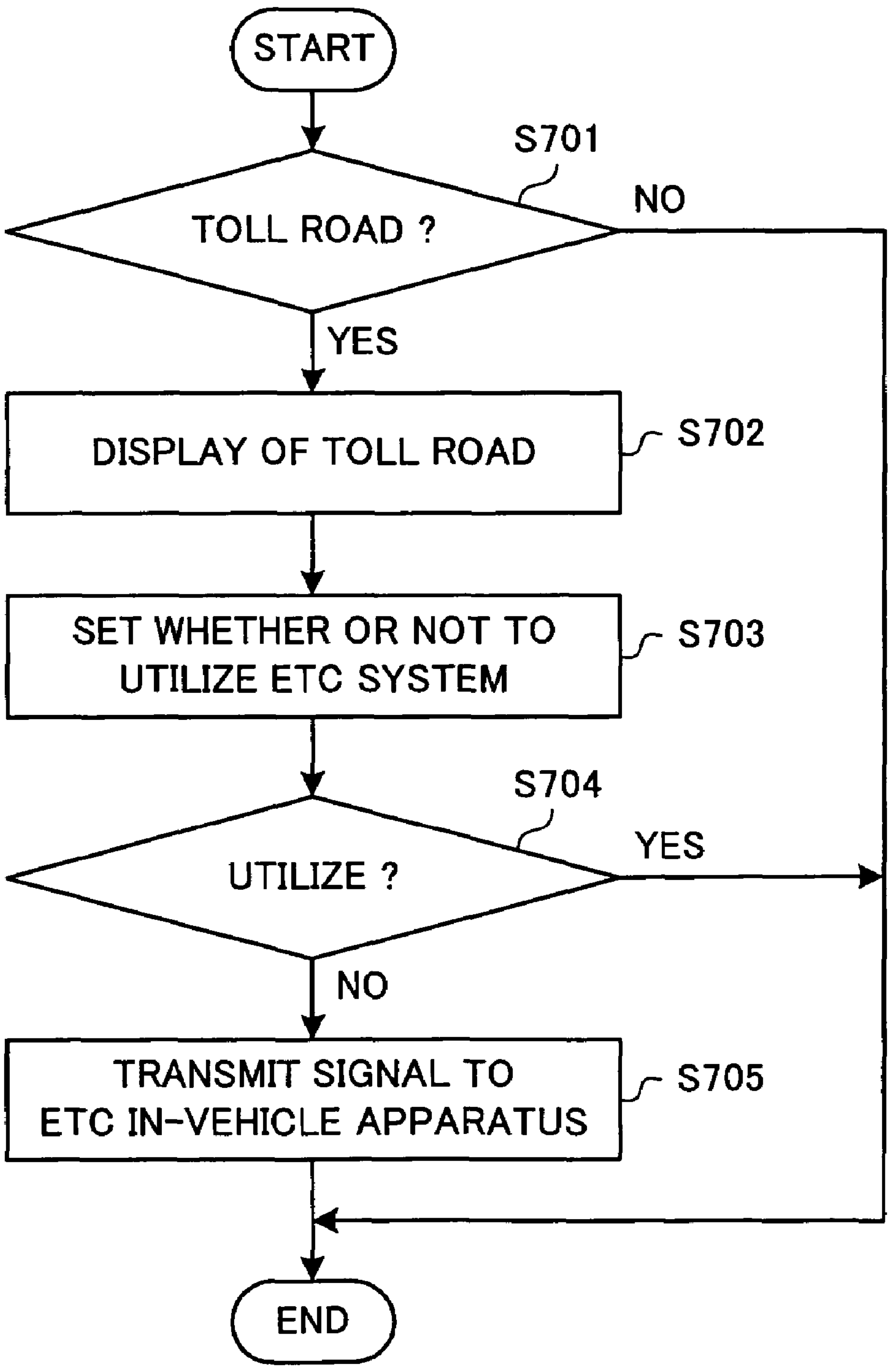
FIG. 4 is a flow chart showing an operation of determining a travel route by the navigation apparatus shown in FIG. 1.

The operation of the navigation apparatus 300 will be more specifically described hereinafter. As shown in FIG. 4, the judgment is firstly made by the navigation apparatus 300 on whether or not there is one or more toll roads on the travel route set by the travel route setting unit 322 in the step S701. When the toll road is extracted from the travel route set by the travel route setting unit 322, the travel route setting unit 322 is operated to have the display apparatus 314 display an image as to the toll road extracted from the travel route set by the travel route setting unit 322 in the step S702, and to judge whether or not to set the active mode to allow the ETC system to be utilized on the toll road of the travel route set by the travel route setting unit 322 in the step S703. When, on the other hand, the toll road is not extracted from the travel route set by the travel route setting unit 322, the navigation apparatus 300 is operated to terminate the step of setting a travel route as shown in FIG. 4.

After the step S703, the judgment is made by the communication unit 325 on whether or not the ETC system is utilized on the toll road of the travel route set by the travel route setting unit 322 on the basis, of the setting of the operation mode setting unit 323 (in the step S704). When the judgment is made in the step S704 that the ETC system is not utilized on the toll road of the travel route, the inactive mode setting signal is outputted to the ETC in-vehicle apparatus 200 (in the step S705) before completing the step of determining the travel route as shown in FIG. 4. When, on the other hand, the judgment is made in the step S704 that the ETC system is utilized on the toll road of the travel route, the inactive mode setting signal is not outputted to the ETC in-vehicle apparatus 200. The navigation apparatus 300 is then operated to complete the step of determining the travel route as shown in FIG. 4.

When the inactive mode setting signal is received from the navigation apparatus 300 by the ETC in-vehicle apparatus 200 through the connection cable 110, the operation mode switching section 231 is operated to prevent the wireless communication unit 220 from being electrically connected to the antenna 210 to have the ETC system fail to be utilized on the toll road.

When the information on the accounting is transmitted to the ETC in-vehicle apparatus 200 by the computer system disposed on the toll road, the information on the accounting is received by the ETC in-vehicle apparatus 200 through the antenna 210.

When the information is received by the ETC in-vehicle apparatus 200 from the computer system disposed on the toll road through the antenna 210, the received information is processed by the wireless communication unit 220, and outputted to the CPU 230.

The CPU 230 can store, for example, the information on the accounting received from the computer system disposed on the toll road on the basis of the information received from the wireless communication unit 220 in the ETC card (not shown) inserted into the ETC in-vehicle apparatus 200.

When the information on the accounting is stored in the ETC card, the ETC in-vehicle apparatus 200 is operated to produce information to be transmitted to the computer system disposed on the toll road on the basis of the information on the accounting stored in the ETC card. The judgment is then made by the computer system disposed on the toll road on whether or not the information on the accounting is correctly stored in the ETC card inserted into the ETC in-vehicle apparatus 200.

More specifically, the CPU 230 of the ETC in-vehicle apparatus 200 is operated to produce information to be transmitted to the computer system disposed on the toll road. In order to produce a transmittable signal on the basis of the information, the wireless communication unit 220 is then operated to process the information produced by the CPU 230. The transmittable signal is then transmitted to the computer system disposed on the on the toll road by the wireless communication unit 220.

From the above detail description, it will be understood that the CPU 230 of the ETC in-vehicle apparatus 200 can process the information on the accounting received from the computer system disposed on the toll road by performing communication with the computer system disposed on the toll road.

The CPU 230 of the ETC in-vehicle apparatus 200 can judge whether or not each of the antenna 210, the wireless communication unit 220 and other constitutional elements is functioning properly, and can judge whether or not the ETC card is inserted into the ETC in-vehicle apparatus 200.

This leads to that fact that the ETC in-vehicle apparatus 200 can allow the information on the above mentioned accounting and various types of judgments to be received by the user of the ETC system through each of the image displayed by the display apparatus (not shown) and the sound produced by the speaker unit (not shown).

From the above detail description, it will be understood that the navigation apparatus 300 according to the first embodiment can reduce the tedious task to be imposed on the user of the ETC system in comparison with the tedious task to be imposed by the conventional apparatus by reason that the ETC in-vehicle apparatus 200 is operative to assume the inactive mode to prevent the ETC system from being utilized on the toll road in response to the inactive mode setting signal received from the communication unit 325 without ejecting the ETC card form the ETC in-vehicle apparatus 200 even if the automotive vehicle is guided without the ETC system into the toll road.

In this embodiment, the navigation apparatus 300 is operative to transmit the inactive mode setting signal to the ETC in-vehicle apparatus 200 on the basis of the setting of the operation mode setting unit 323. However, the navigation apparatus according to the present invention may be operative to transmit the active mode setting signal to the ETC in-vehicle apparatus 200 as a switching signal to have the ETC in-vehicle apparatus 200 selectively assume active and inactive modes on the basis of the setting of the operation mode setting unit 323, and operative to have the ETC in-vehicle apparatus 200 assume the active mode to allow the ETC system to be utilized in response to the active mode setting signal.

The navigation apparatus 300 according to the first embodiment can reduce the tedious task to be imposed on the user of the ETC system in comparison with the tedious task to be imposed by the conventional apparatus by reason that the navigation apparatus 300 is operative to transmit the active mode setting signal to the ETC in-vehicle apparatus 200, the ETC in-vehicle apparatus 200 is operative to assume the active mode to allow the ETC system to be utilized in response to the active mode setting signal without inserting the ETC card into the ETC in-vehicle apparatus 200 when the automotive vehicle is guided with the ETC system into the toll road.

The navigation apparatus 300 according to the first embodiment can reduce the tedious task to be imposed on the user of the ETC system in comparison with the tedious task to be imposed by the conventional apparatus by reason that the ETC in-vehicle apparatus 200 is operative to assume the inactive mode to prevent the ETC system from being utilized in response to the inactive mode setting signal received from the communication unit 325 without ejecting the ETC card from the ETC in-vehicle apparatus 200 when the automotive vehicle is guided without the ETC system into the toll road.

The ETC navigation system 100 according to the first embodiment can reduce the tedious task to be imposed on the user of the ETC system in comparison with the tedious task to be imposed by the conventional system by reason that the ETC navigation system according to the first embodiment comprises the ETC in-vehicle apparatus 200 and the navigation apparatus 300.

In this embodiment, the operation mode switching section 231 is operative to have the antenna 210 electrically isolated form the wireless communication unit 220 to have the ETC system fail to be utilized. However, the ETC in-vehicle apparatus according to the present invention may have the ETC system fail to be utilized without having the antenna 210 electrically isolated form the wireless communication unit 220 to have the ETC system fail to be utilized.

In this embodiment, the ETC navigation apparatus 300 is electrically connected to the ETC in-vehicle apparatus 200 through the connection cable 110. However, the ETC navigation apparatus 300 may be operative to perform the wireless communication with the ETC in-vehicle apparatus 200.

In this embodiment, each of the destination setting unit 321, the travel route setting unit 322, and the operation mode setting unit 323 is operative to have the display apparatus 314 output an image. However, each of the destination setting unit, the travel route setting unit, and the operation mode setting unit may be operative to have the speaker unit 315 output a sound in addition to the image outputted by the display apparatus 314.

(Second Embodiment)

The following description will then be directed to the constitution of the second embodiment of the navigation apparatus, the in-vehicle apparatus, and the navigation system according to the present invention.

The constitutional elements of the navigation apparatus, the in-vehicle apparatus, and the navigation system according to the second embodiment are substantially the same as those of the navigation apparatus, the in-vehicle apparatus; and the navigation system according to the first embodiment except for the constitutional elements appearing in the following description. Therefore, the constitutional elements of the navigation apparatus, the in-vehicle apparatus, and the navigation system according to the second embodiment the same as those of the navigation apparatus, the in-vehicle apparatus, and the navigation system according to the first embodiment will not be described but bear the same reference numerals and legends as those of the navigation apparatus, the in-vehicle apparatus, and the navigation system according to the first embodiment.

Figure 5:
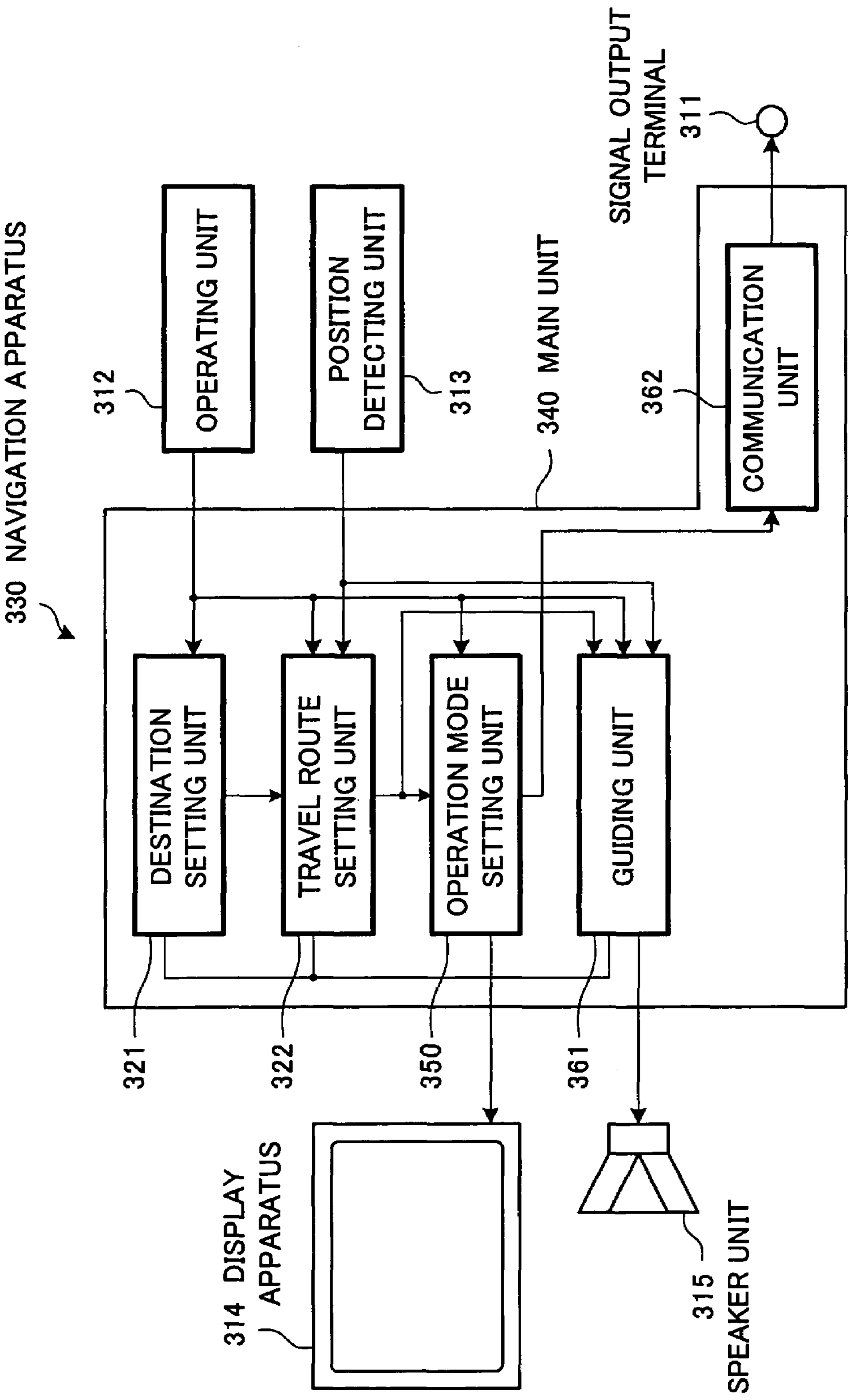
FIG. 5 is a block diagram showing the navigation apparatus according to the second embodiment of the present invention.
Figure 6:
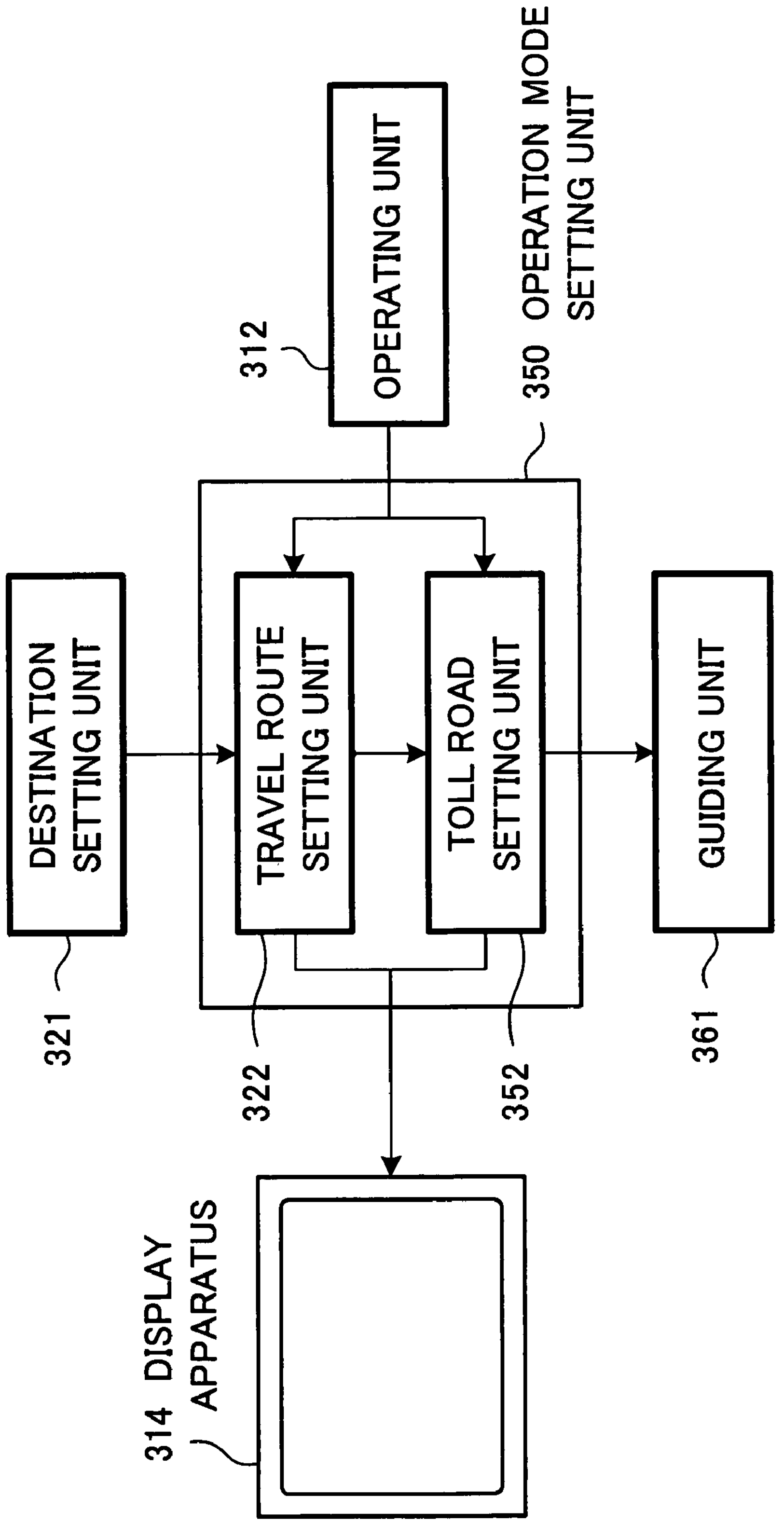
FIG. 6 is a block diagram showing an operation mode setting unit and the vicinities of the navigation apparatus shown in FIG. 5.

The ETC navigation system according to the second embodiment is substantially the same in construction as the ETC navigation system 100 (see FIG. 3) according to the first embodiment with the exception of the fact that the ETC navigation system comprises a navigation apparatus 330 (see FIGS. 5 and 6) in place of the navigation apparatus 300 (see FIG. 1).

The navigation apparatus 330 is substantially the same in construction as the navigation apparatus 300 with the exception of the fact that the navigation apparatus 330 comprises a main unit 340 in place of the main unit 320 (see FIG. 1).

The main unit 340 is substantially the same in construction as the main unit 320 with the exception of the fact that the main unit 340 comprises an operation mode setting unit 350 constituting operation mode setting means for judging whether or not the ETC system is utilized on a toll road of the travel route set by the travel route setting unit 322, a guiding unit 361 constituting guiding means for guiding the automotive vehicle through the travel route set by the travel route setting unit 322, and a communication unit 362 constituting communication means for performing communication with the ETC in-vehicle apparatus 200 provided in the automotive vehicle in place of the operation mode setting unit 323 (see FIG. 1), the guiding unit 324 (see FIG. 1), and the communication unit 325 (see FIG. 1).

The operation mode setting unit 350 includes a toll road extracting section 351 constituting toll road extracting means for extracting a toll road from the travel route set by the travel route setting unit 322, and a toll road setting section 352 constituting toll road setting means for judging whether or not to set the active mode to allow the ETC system to be utilized on the toll road extracted from the travel route set by the travel route setting unit 322.

The operation mode setting unit 350 is operative to receive signals from the operating unit 312 and the travel route setting unit 322, and to produce signals to be respectively outputted to the display apparatus 314 and the guiding unit 361. The operation mode setting unit 350 is constituted by a central processing unit (not shown) and a memory element (not shown).

The guiding unit 361 is operative to receive signals from the operating unit 312, the position detecting unit 313, the travel route setting unit 322, and the operation mode setting unit 350, and to produce signals to be respectively outputted to the display apparatus 314, the speaker unit 315, and the communication unit 362. The destination setting unit 321 is constituted by a central processing unit (not shown) and a memory element (not shown).

The communication unit 362 is operative to receive a signal from the guiding unit 361, and to produce a signal to be transmitted to the signal output terminal 311. The communication unit 362 is constituted by electronic elements such as CPU (not shown), a memory element (not shown), an interface unit (not shown).

The following description will then be directed to the operation of the second embodiment of the navigation apparatus, the in-vehicle apparatus, and the navigation system according to the present invention.

The operations of the navigation apparatus, the in-vehicle apparatus, and the navigation system according to the second embodiment substantially the same as those of the navigation apparatus, the in-vehicle apparatus, and the navigation system according to the first embodiment will not be described hereinafter.

In the operation mode setting unit 350 of the navigation apparatus 330, the toll road extracting section 351 is firstly operated to extract the toll road from the travel route set by the travel route setting unit 322. The toll road setting section 352 is then operated to have the display apparatus 314 display an image to be watched as setting information by an user on the basis of the operation of the operating unit 312 and the travel route set by the travel route setting unit 322, and to judging whether or not to set the active mode in which the automotive vehicle is guided with the ETC system through the extracted toll road set by the travel route setting unit 322.

When the instruction signal to start to guide the automotive vehicle is outputted to the guiding unit 361 from the operating unit 312, the guiding unit 361 is operated to start to guide the automotive vehicle through the travel route set by the travel route setting unit 322 by having the display apparatus 314 display an image, and by having the speaker unit 315 produce a sound on the basis of the current position detected by the position detecting unit 313. When the automotive vehicle is guided without the ETC system by the guiding unit 361 into a toll road, the predetermined signal is outputted to the communication unit 362 from the guiding unit 361.

When the predetermined signal is outputted to the communication unit 362 from the guiding unit 361, the inactive mode setting signal is transmitted to the ETC in-vehicle apparatus 200 from the communication unit 362.

Figure 7:
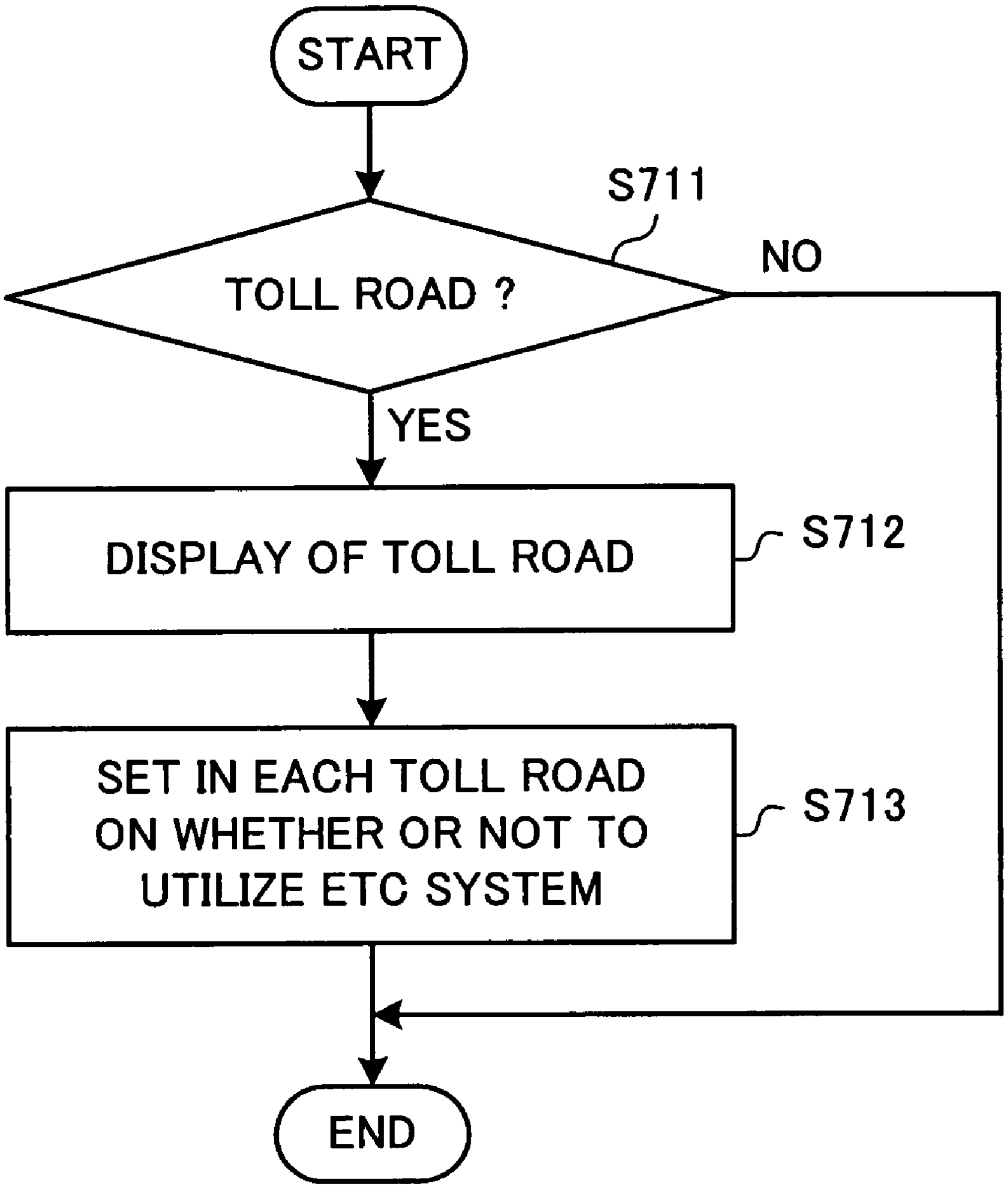
FIG. 7 is a flowchart showing an operation of determining a travel route by the navigation apparatus shown in FIG. 5.

The operation of the navigation apparatus 330 will be more specifically described hereinafter. As shown in FIG. 7, the judgment is firstly made by the operation mode setting unit 350 on whether or not there is one or more toll roads on the travel route set by the travel route setting unit 322.(in the step S711). When the judgment is made that there is no toll road on the travel route in the step S711, the navigation apparatus 330 is operated to complete the operation of setting a travel route. When, on the other hand, the judgment is made that there is one or more toll roads on the travel route in the step S711, the toll road extracting section 351 of the operation mode setting unit 350 is operated to extract each of the toll roads from the travel route set by the travel route setting unit 322, to have the display apparatus 314 display setting information on each of the extracted toll roads (in the step S712), and to judge whether or not to set the active mode in each of the extracted toll roads (in the step S713).

Figure 8:
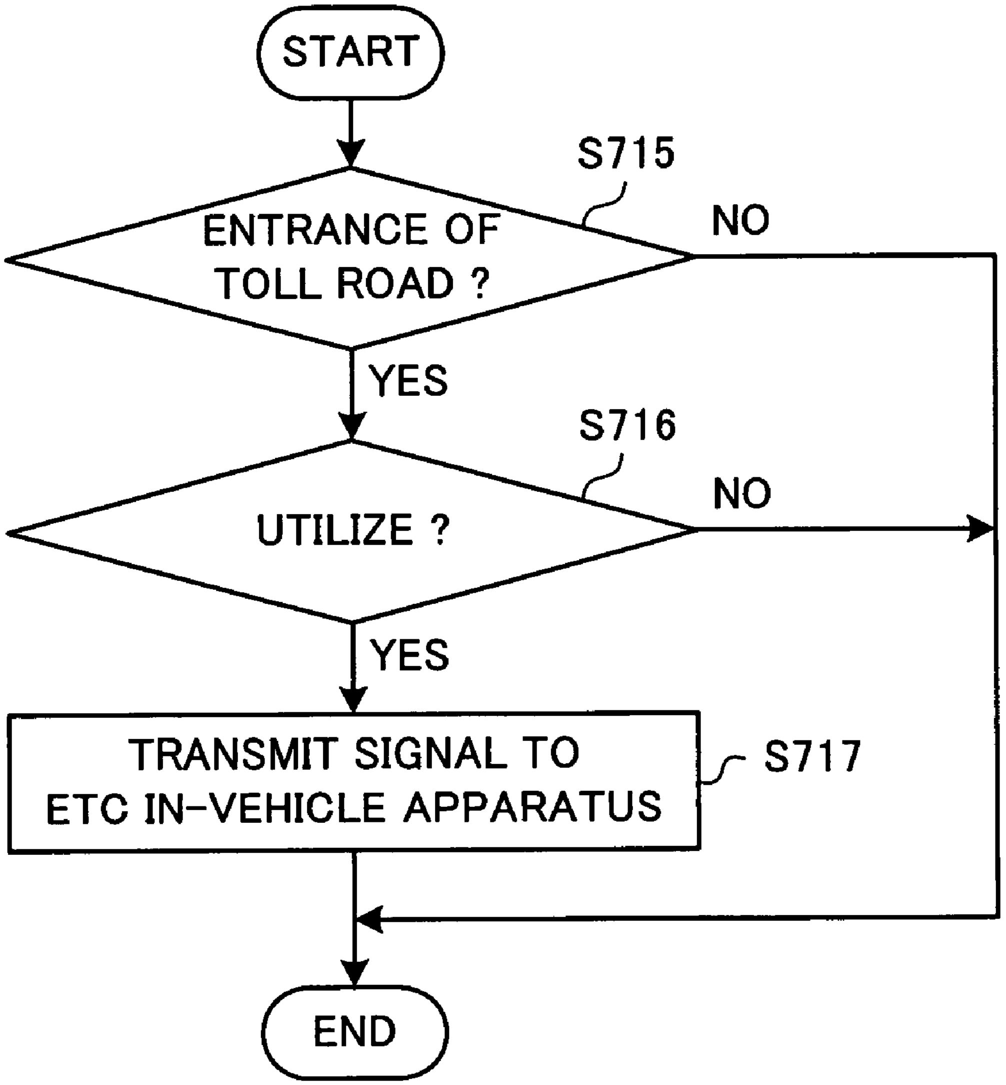
FIG. 8 is a flowchart showing an operation of guiding an automotive vehicle in the vicinity of an entrance of a toll road by the navigation apparatus shown in FIG. 5.

When the automotive vehicle is guided by the guiding unit 361 of the navigation apparatus 330 as shown in FIG. 8, the judgment is made on whether or not the automotive vehicle is in the vicinity of the entrance of the toll road on the basis of the current position detected by the position detecting unit 313, in other words, the distance between the automotive vehicle and the toll station of the toll road is equal to or smaller than a predetermined threshold value (in the step S715). When the judgment is made that the automotive vehicle is not in the vicinity of the toll station of the toll road, the navigation apparatus 300 is operated to complete the step of guiding the automotive vehicle in the vicinity of the entrance of the toll road as shown in FIG. 8.

When the judgment is made that the automotive vehicle is in the vicinity of the toll station of the toll road in the step S715, the judgment is made by the guiding unit 361 on whether or not to guide the automotive vehicle with the ETC system into the toll road on the basis of the setting of the operation mode setting unit 350 (in the step S716). When the judgment is made that the automotive vehicle is guided without the ETC system into the toll road, the inactive mode setting signal is transmitted to the ETC in-vehicle apparatus 200 from the communication unit 362 (in the step S717).

In other words, the inactive mode setting signal is transmitted to the ETC in-vehicle apparatus 200 by the communication unit 362 on the basis of the setting of the operation mode setting unit 350.

When the judgment is made in the step S716 that the automotive vehicle is guided with the ETC system through that toll road on the basis of the setting of the operation mode setting unit 350, or after the step S717, the navigation apparatus 330 is operated to complete the step of guiding the automotive vehicle in the vicinity of the toll road as shown in FIG. 8.

When the automotive vehicle is guided by the navigation apparatus 330, the navigation apparatus 330 is operated to compute the elapsed time after completing the operation shown in FIG. 8. When the judgment is made that the elapsed time exceeds a predetermined threshold value, the operation shown in FIG. 8 is restarted by the navigation apparatus 330.

When the inactive mode setting signal is received from the navigation apparatus 330 by the ETC in-vehicle apparatus 200 through the connection cable 110, the ETC in-vehicle apparatus 200 is operated to prevent the ETC system from being utilized on the toll road in a manner similar to that of the first embodiment.

From the above detail description, it will be understood that the navigation apparatus according to the second embodiment can set in detail in each toll road in comparison with the navigation apparatus according to the first embodiment In this embodiment, the operation mode setting unit 350 is operative to have the display apparatus 314 display an image as output information. However, the operation mode setting unit may be operative to have the speaker unit 315 produce a sound in addition to the image displayed by the display apparatus 314.

(Third Embodiment)

The following description will then be directed to the constitution of the third embodiment of the navigation apparatus according to the present invention.

The constitutional elements of the navigation apparatus according to the third embodiment are substantially the same as those of the navigation apparatus according to the first embodiment except for the constitutional elements appearing in the following description. Therefore, the constitutional elements of the navigation apparatus according to the third embodiment the same as those of the navigation apparatus according to the first embodiment will not be described but bear the same reference numerals and legends as those of the navigation apparatus according to the first embodiment.

Figure 9:
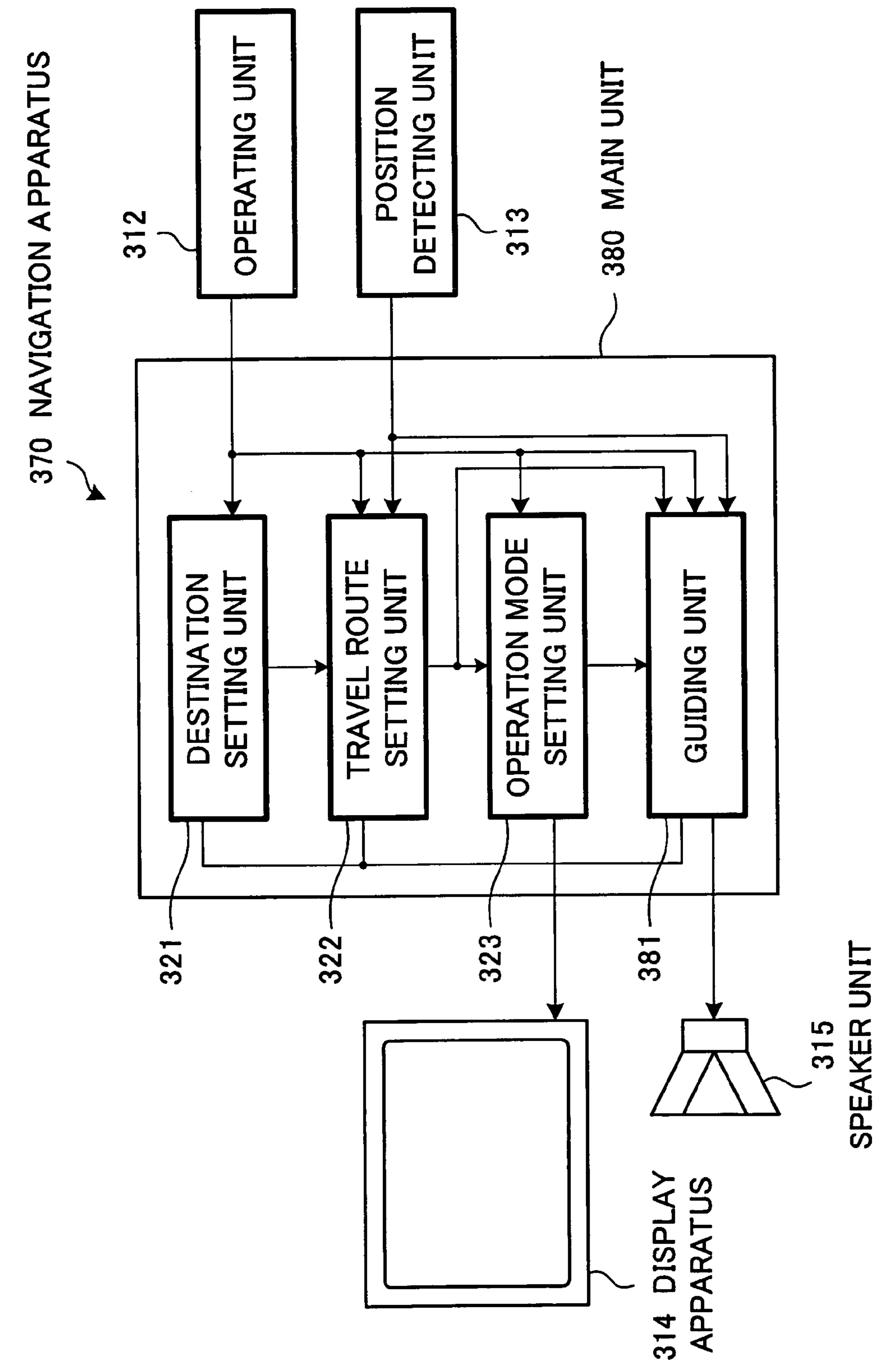
FIG. 9 is a block diagram showing the navigation apparatus according to the third embodiment of the present invention.

As. shown in FIG. 9, the navigation apparatus 370 according to the third embodiment is substantially the same in construction as the navigation apparatus 300 (see FIG. 1) according to the first embodiment with the exception of the fact that the navigation apparatus 370 according to the third embodiment comprises a main unit 380 without the signal output terminal 311 (see FIG. 1) in place of the main unit 320 (see FIG. 1).

The main unit 380 is substantially the same in construction as the main unit 320 with the exception of the fact that the main unit 380 includes a guiding unit 381 constituting guiding means for guiding the automotive vehicle through the travel route set by the travel route setting unit 322 without the communication unit 325 (see FIG. 1) in place of the guiding unit 324 (see FIG. 1).

The guiding unit 381 is operative to receive signals from the operating unit 312, the position detecting unit 313, the travel route setting unit 322, and the operation mode setting unit 323, and to produce signals to be respectively outputted to the display apparatus 314 and the speaker unit 315. The guiding unit 381 is constituted by electronic elements such as for example CPU (not shown) and memory element (not shown).

If the travel route set by the travel route setting unit 322 includes a lane for the ETC system-enabled vehicle (hereinafter simply referred to as "ETC lane") and a lane for the ETC system-disable vehicle (hereinafter simply referred to as "non-ETC lane"), the guiding unit 381 is operative to guide the automotive vehicle through the travel route by alternatively setting the ETC lane and the non-ETC lane on the basis of the determination of the operation mode setting unit 323.

The following description will then be directed to the operation of the third embodiment of the navigation apparatus according to the present invention.

The operation of the navigation apparatus according to the third embodiment substantially the same as the operation of the navigation apparatus according to the first embodiment will not be described hereinafter.

When the instruction signal to start to guide the automotive vehicle is firstly outputted to the guiding unit 381 of the navigation apparatus 370 from the operating unit 312, the guiding unit 381 of the navigation apparatus 370 is operated to start to guide through the travel route set by the travel route setting unit 322 on the basis of the current position detected by the position detecting unit 313 by having the display apparatus 314 display an image, and by having the speaker unit 315 produce a sound. When the judgment is made that there are the ETC and non-ETC lanes on the travel route, the guiding unit 381 is operated to guide the automotive vehicle through the travel route by judging whether to guide the automotive vehicle into the ETC lane or the non-ETC lane on the basis of the setting of the operation mode setting unit 323.

Figure 10:
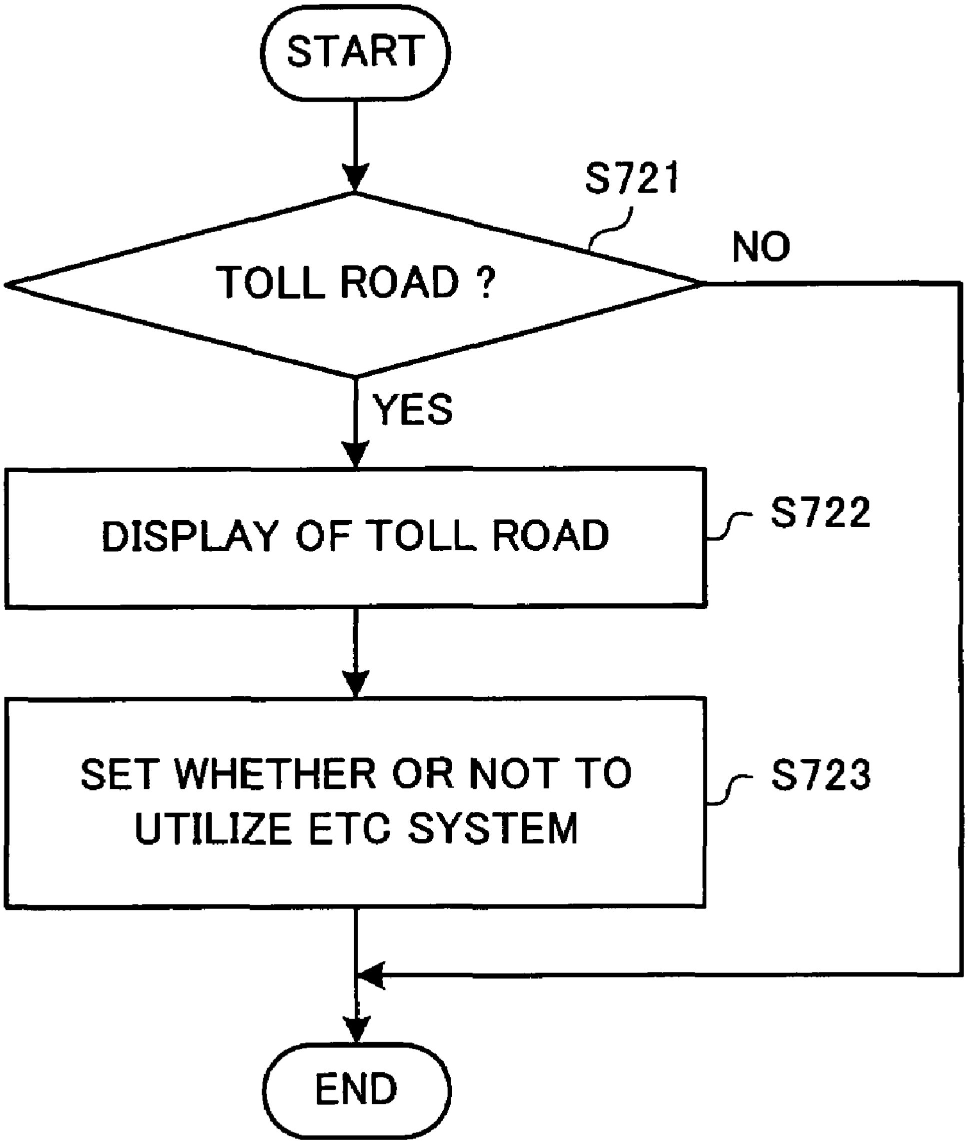
FIG. 10 is a flowchart showing an operation of determining a travel route by the navigation apparatus shown in FIG. 9.

The operation of the navigation apparatus 370 according to the third embodiment will be more specifically described hereinafter. As shown in FIG. 10, the judgment is firstly made by the operation mode setting unit 323 on whether or not there is one or more toll roads on the travel route set by the travel route setting unit 322 (in the step S721). When the judgment is made that there is one or more toll roads on the travel route in the step S721, the operation mode setting unit 323 is operated to have the display apparatus 314 display setting information on each of the extracted toll roads (in the step S722), and to judge whether or not to set the active mode in each of the extracted toll roads (in the step S723).

When, on the other hand, the judgment is made that there is no toll road on the travel route (in the step S721), the navigation apparatus 370 is operated to complete the step of setting a travel route as shown in FIG. 10.

Figure 11:
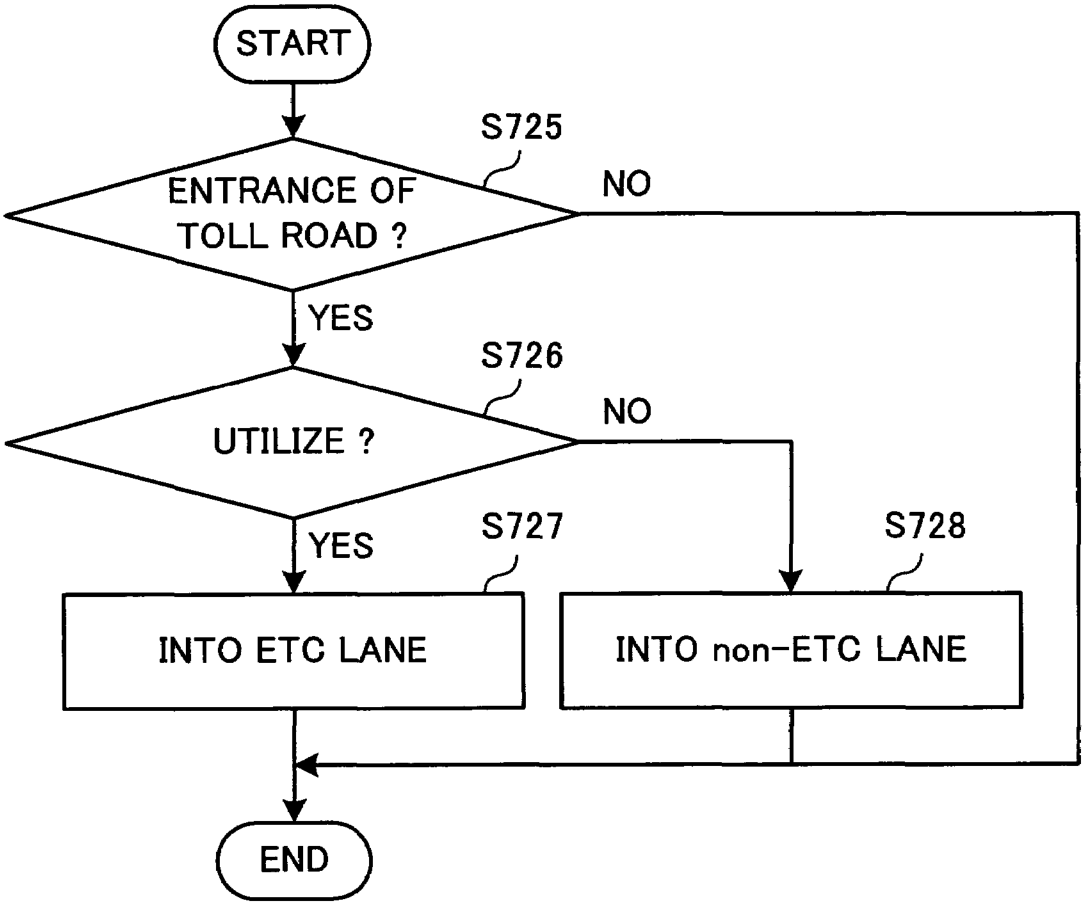
FIG. 11 is a flowchart showing an operation of guiding the automotive vehicle in the vicinity of the entrance of the toll road by the navigation apparatus shown in FIG. 9.

When the automotive vehicle is guided by the guiding unit 381 of the navigation apparatus 370 as shown in FIG. 11, the judgment is made by the guiding unit 381 on whether or not the automotive vehicle is in the vicinity of the entrance of the toll road on the basis of the current position detected by the position detecting unit 313, in other words, the distance between the automotive vehicle and the entrance of the toll road is equal to or smaller than a predetermined threshold value (in the step S725). When the judgment is made that the automotive vehicle is not in the vicinity of the entrance of the toll road, the navigation apparatus 370 is operated to complete the step of guiding the automotive vehicle in the vicinity of the entrance of the toll road as shown in FIG. 11.

When the judgment is made that the automotive vehicle is in the vicinity of the entrance of the toll road in the step S725, the judgment is made by the guiding unit 381 on whether or not the ETC system is utilized on the toll road on the basis of the setting of the operation mode setting unit 323 (in the step S726). When the judgment is made that the ETC system is utilized on the toll road in the step S726, the guiding unit 381 is operated to guide the automotive vehicle into the ETC lane (in the step S727). When, on the other hand, the judgment is made that the ETC system is not utilized on the toll road in the step S726, the guiding unit 381 is operated to guide the automotive vehicle into the non-ETC lane (in the step S728).

The navigation apparatus 370 is then operated to complete the step of guiding the automotive vehicle in the vicinity of the entrance of the toll road after the step S727 or the step S728 as shown in FIG. 11.

When the automotive vehicle is guided by the navigation apparatus 370, the navigation apparatus 370 is operated to compute the elapsed time after completing the operation shown in FIG. 11. When the judgment is made that the elapsed time exceeds a predetermined threshold value, the operation shown in FIG. 11 is restarted by the navigation apparatus 370.

When the automotive vehicle is guided by the guiding unit 381 of the navigation apparatus 370, the judgment is made by the guiding unit 381 on whether or not the automotive vehicle is in the vicinity of the exit of the toll road on the basis of the current position detected by the position detecting unit 313, in other words, the distance between the automotive vehicle and the exit of the toll road is equal to or smaller than a predetermined threshold value (in the step S731). When the judgment is made that the automotive vehicle is not in the vicinity of the exit of the toll road, the navigation apparatus 370 is operated to complete the step of guiding the automotive vehicle in the vicinity of the exit of the toll road as shown in FIG. 12.

When the judgment is made that the automotive vehicle is in the vicinity of the exit of the toll road in the step S731, the judgment is made by the guiding unit 381 on whether or not the ETC system is utilized on the toll road on the basis of the setting of the operation mode setting unit 323 (in the step S732). When the judgment is made that the ETC system is utilized on the toll road in the step S732, the guiding unit 381 is operated to guide the automotive vehicle into the ETC lane (in the step S733). When, on the other hand, the judgment is made that the ETC system is not utilized on the toll road in the step S732, the guiding unit 381 is operated to guide the automotive vehicle into the non-ETC lane (in the step S734).

Figure 12:
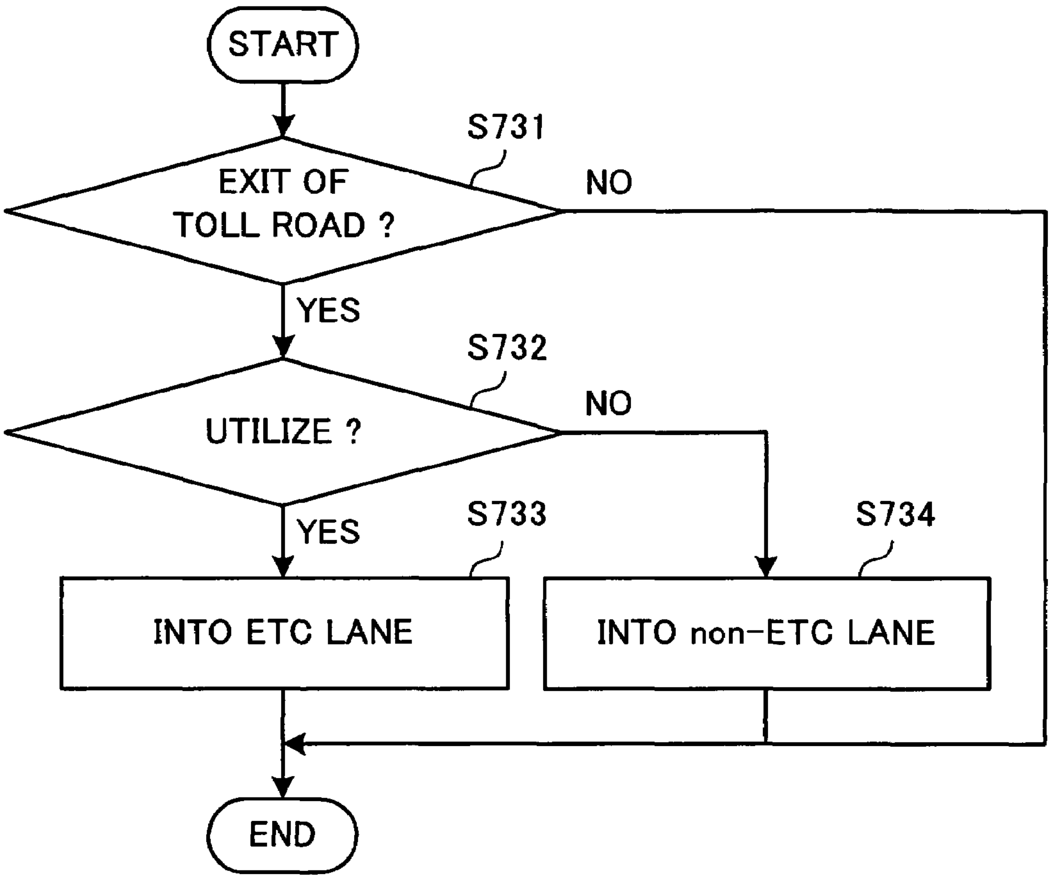
FIG. 12 is a flowchart showing an operation of guiding the automotive vehicle in the vicinity of an exit of the toll road by the navigation apparatus shown in FIG. 9.

The navigation apparatus 370 is then operated to complete the step of guiding the automotive vehicle in the vicinity of the exit of the toll road after the step S733 or the step S734 as shown in FIG. 12.

When the automotive vehicle is guided by the navigation apparatus 370, the navigation apparatus 370 is operated to compute the elapsed time after completing the operation shown in FIG. 12. When the judgment is made that the elapsed time exceeds a predetermined threshold value, the operation shown in FIG. 12 is restarted by the navigation apparatus 370.

Figure 13:
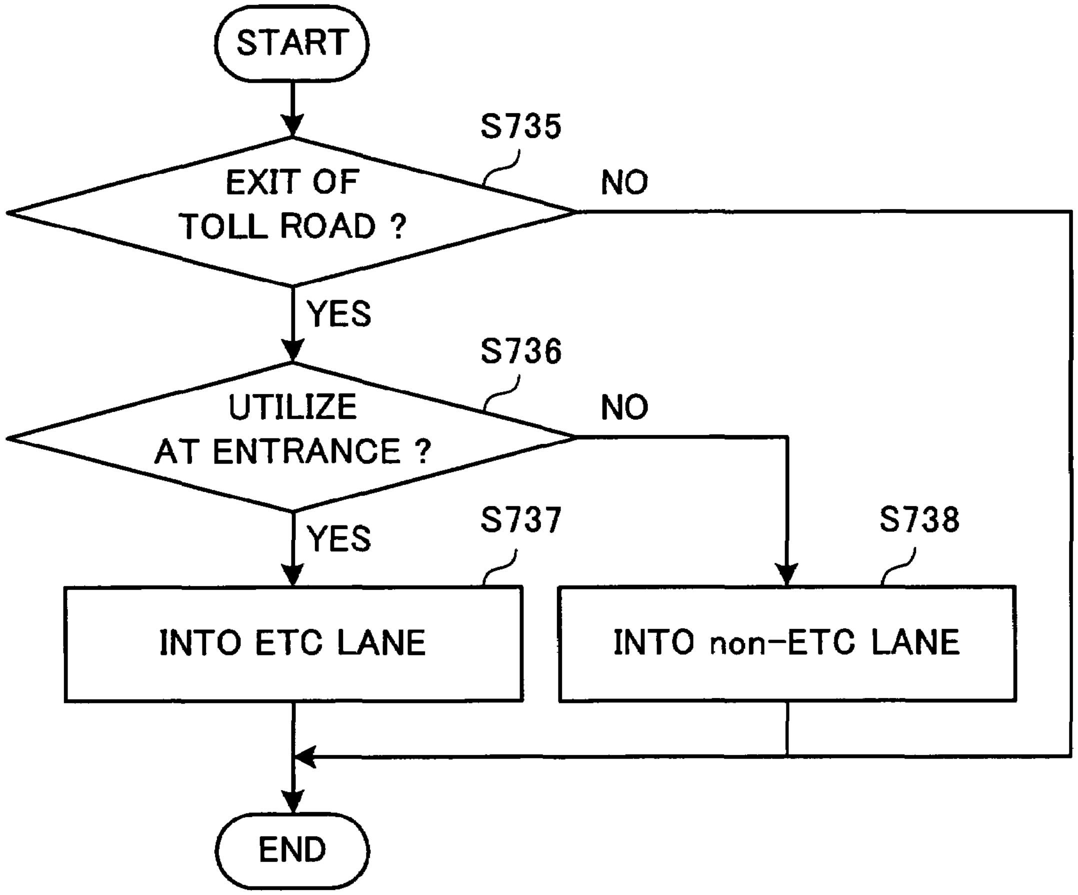
FIG. 13 is a flowchart showing an operation which is different from the operation shown in FIG. 12, and which is of guiding the automotive vehicle in the vicinity of the entrance of the toll by the navigation apparatus shown in FIG. 9.

Here, the operation shown in FIG. 13 may be executed by the navigation apparatus 370 in place of the operation shown in FIG. 12.

When the automotive vehicle is guided by the guiding unit 381 of the navigation apparatus 370 as shown in FIG. 13, the judgment is made by the guiding unit 381 on whether or not the automotive vehicle is in the vicinity of the exit of the toll road on the basis of the current position detected by the position detecting unit 313, in other words, the distance between the automotive vehicle and the exit of the toll road is equal to or smaller than a predetermined threshold value (in the step S735). When the judgment is made that the automotive vehicle is not in the vicinity of the exit of the toll road, the navigation apparatus 370 is operated to complete the step of guiding the automotive vehicle in the vicinity of the exit of the toll road as shown in FIG. 13.

When the judgment is made that the automotive vehicle is in the vicinity of the exit of the current toll road in the step S735, the judgment is made by the guiding unit 381 on whether or not the automotive vehicle is guided through the ETC lane at the entrance of the current toll road (in the step S736). When the automotive vehicle is guided through the ETC lane at the entrance of the current toll road in the step S736, the guiding unit 381 is operated to guide the automotive vehicle into the ETC lane at the exit of the current toll road (in the step S737). When, on the other hand, the judgment is made that the automotive vehicle is not guided through the ETC lane at the entrance of the current toll road in the step S736, the guiding unit 381 is operated to guide the automotive vehicle into the non-ETC lane at the exit of the current toll road (in the step S738).

The navigation apparatus 370 is then operated to complete the step of guiding the automotive vehicle in the vicinity of the exit of the toll road after the step S737 or the step S738 as shown in FIG. 13.

When the automotive vehicle is guided by the navigation apparatus 370, the navigation apparatus 370 is operated to compute the elapsed time after completing the operation shown in FIG. 13. When the judgment is made that the elapsed time exceeds a predetermined threshold value, the operation shown in FIG. 13 is restarted by the navigation apparatus 370.

From the above detail description, it will be understood that the navigation apparatus 370 can reduce the tedious task to be imposed on the user of the ETC system at the entrance or exit of the toll road by preventing the user from checking the traffic sign indicative of the ETC lane or non-ETC lane by reason that the guiding unit 381 is operative to guide the automotive vehicle through the travel route on the basis of the setting of the operation mode setting unit 323.

Even if the user carelessly forgets the fact that the automotive vehicle is guided with the ETC system at the entrance of the toll road, or without the ETC system at the entrance of the current toll road, the navigation apparatus 370 can guide the automotive vehicle on the basis of the setting of the operation mode setting unit 323 at the exit of the toll road. This leads to the fact that the navigation apparatus 370 can reduce the tedious task to be imposed on the user of the ETC system by guiding the automotive vehicle on the basis of the setting of the operation mode setting unit 323 at the exit of the current toll road by reason that the navigation apparatus 370 is operative to guide the automotive vehicle on the basis of the setting of the operation mode setting unit 323 at the entrance of the toll road.

Additionally, even if the judgment is made that there are two or more toll roads on the travel route set by the travel route setting unit 322, the navigation apparatus 370 according to the third embodiment is operative to judge whether or not to set the active mode to guide the automotive vehicle with the ETC system into each of the toll roads. However, the navigation apparatus according to the present invention may be operative to selectively set active and inactive modes on each of the toll roads by judging on each of the toll roads on whether to guide the automotive vehicle with the ETC system or without the ETC system as has been described in the second embodiment.

(Fourth Embodiment)

The following description will then be directed to the constitution of the fourth embodiment of the navigation apparatus according to the present invention.

The constitutional elements of the navigation apparatus according to the fourth embodiment are substantially the same as those of the navigation apparatus according to the third embodiment except for the constitutional elements appearing in the following description. Therefore, the constitutional elements of the navigation apparatus according to the fourth embodiment the same as those of the navigation apparatus according to the third embodiment will not be described but bear the same reference numerals and legends as those of the navigation apparatus according to the third embodiment.

Figure 14:
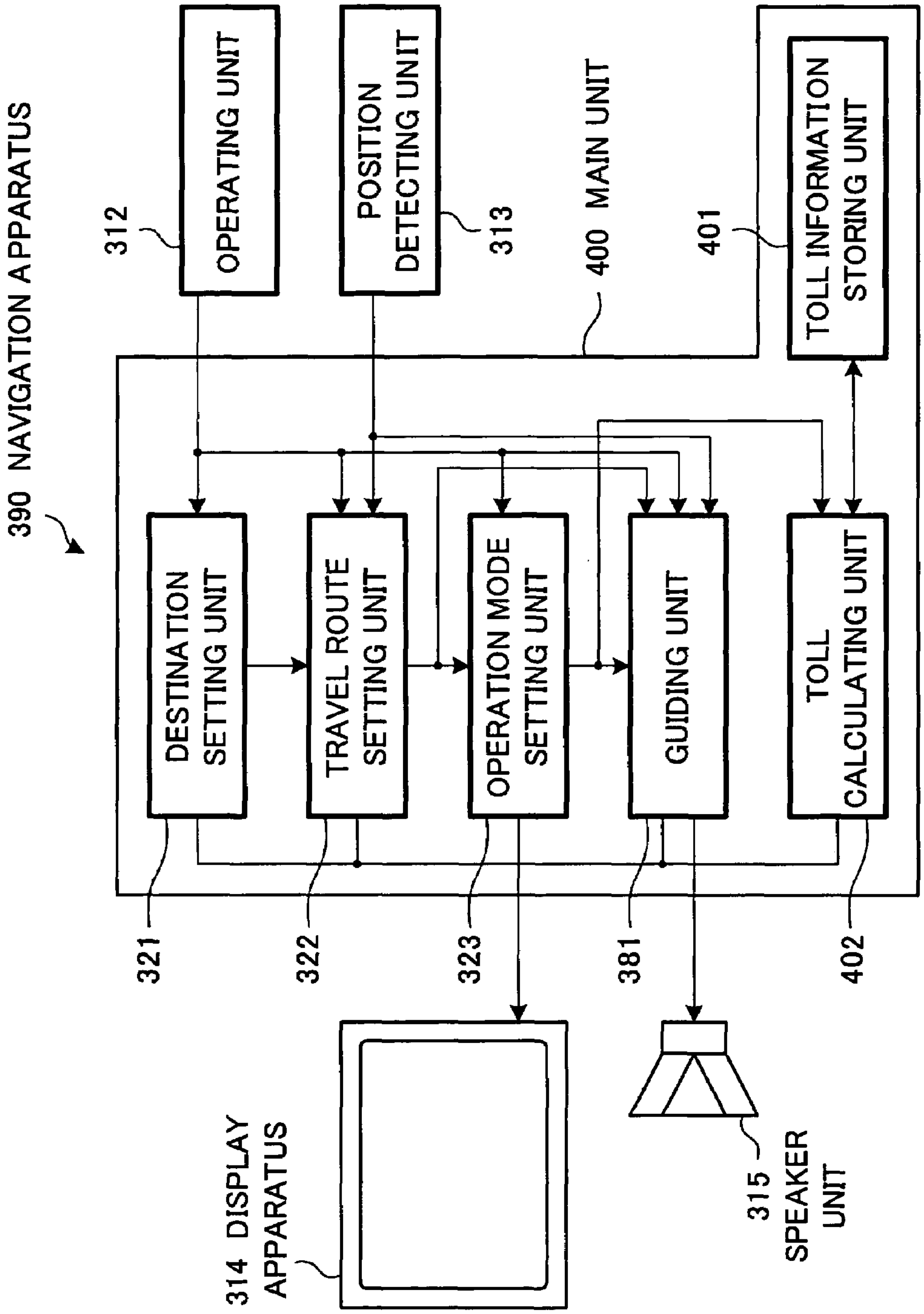
FIG. 14 is a block diagram showing the navigation apparatus according to the fourth embodiment of the present invention.

As shown in FIG. 14, the navigation apparatus 390 according to the fourth embodiment is substantially the same in construction as the navigation apparatus 370 (see FIG. 9) with the exception of the fact that the navigation apparatus 390 according to the fourth embodiment comprises a main unit 400 in place of the main unit 380 (see FIG. 9).

The main unit 400 is substantially the same in construction as the main unit 380 with the exception of the fact that the main unit 400 further includes, in addition to the constitutional elements of the main unit 380, a toll information storing unit 401 constituting toll information storing means for storing toll information of the toll road, depending on whether or not the ETC system is utilized on the toll road, and a toll calculating unit 402 constituting toll calculating means for calculating the toll to be collected on the toll road of the travel route set by the travel route setting unit 322 on the basis of the toll information stored in the toll information storing unit 401 and the setting of the operation mode setting unit 323.

The toll information storing unit 401 is constituted by a memory unit. The toll calculating unit 402 is operative to receive a signal from the operation mode setting unit 323, to receive the toll information from the toll information storing unit 402, and to produce a signal to be outputted to the display apparatus 314. The toll calculating unit 402 is constituted by a central processing unit (not shown) and a memory unit (not shown).

The following description will then be directed to the operation of the fourth embodiment of the navigation apparatus according to the present invention.

The operation of the navigation apparatus according to the fourth embodiment substantially the same as the operation of the navigation apparatus according to the third embodiment will not be described hereinafter.

The toll calculating unit 402 of the navigation apparatus 390 is operative to receive identification information indicative of the toll road of the travel route from the operation mode setting unit 323, and to receive the toll information from the toll information storing unit 401.

The toll calculating unit 402 is operative to calculate a total of the tolls of the toll roads of the travel route, and to have the display apparatus 314 display the total of the tolls of the toll roads on the travel route.

From the above detail description, it will be understood that the navigation apparatus 390 can allow an user to set a travel route, and to set whether or not the automotive vehicle is guided with the ETC system through the toll road of the travel route after allowing the user to recognize the difference the toll to be collected with the ETC system and the toll to be collected without the ETC system by reason that the toll calculating unit 402 is operative to calculate a total of the tolls of the toll roads on the travel route set by the travel route setting unit 322 on the basis of the setting of the operation mode setting unit 323.

Additionally, even if the judgment is made that there are toll roads on the travel route set by the travel route setting unit 322, the navigation apparatus 390 according to the fourth embodiment is operative to judge whether or not to set the active mode to guide the automotive vehicle with the ETC system into each of the toll roads. However, the navigation apparatus may be operative to selectively set active and inactive modes on each of the toll roads by judging on each of the toll roads on whether or not to guide the automotive vehicle with the ETC system or without the ETC system as has been described in the second embodiment.

In this embodiment, the toll calculating unit 402 is operative to have the display apparatus 314 display an image as output information. However, the toll calculating unit may be operative to have the speaker unit 315 produce a sound in addition to the image displayed by the display apparatus 314.

(Fifth Embodiment)

The following description will then be directed to the constitution of the fifth embodiment of the navigation apparatus and the navigation system according to the present invention.

The constitutional elements of the navigation apparatus according to the fifth embodiment are substantially the same as those of the navigation apparatus according to the third embodiment except for the constitutional elements appearing in the following description. Therefore, the constitutional elements of the navigation apparatus according to the fifth embodiment the same as those of the navigation apparatus according to the third embodiment will not be described but bear the same reference numerals and legends as those of the navigation apparatus according to the third embodiment.

The constitutional elements of the in-vehicle apparatus of the navigation system according to the fifth embodiment the same as those of the in-vehicle apparatus of the navigation system according to the first embodiment will not be described but bear the same reference numerals and legends as those of the in-vehicle apparatus of the navigation system according to the first embodiment.

Figure 15:
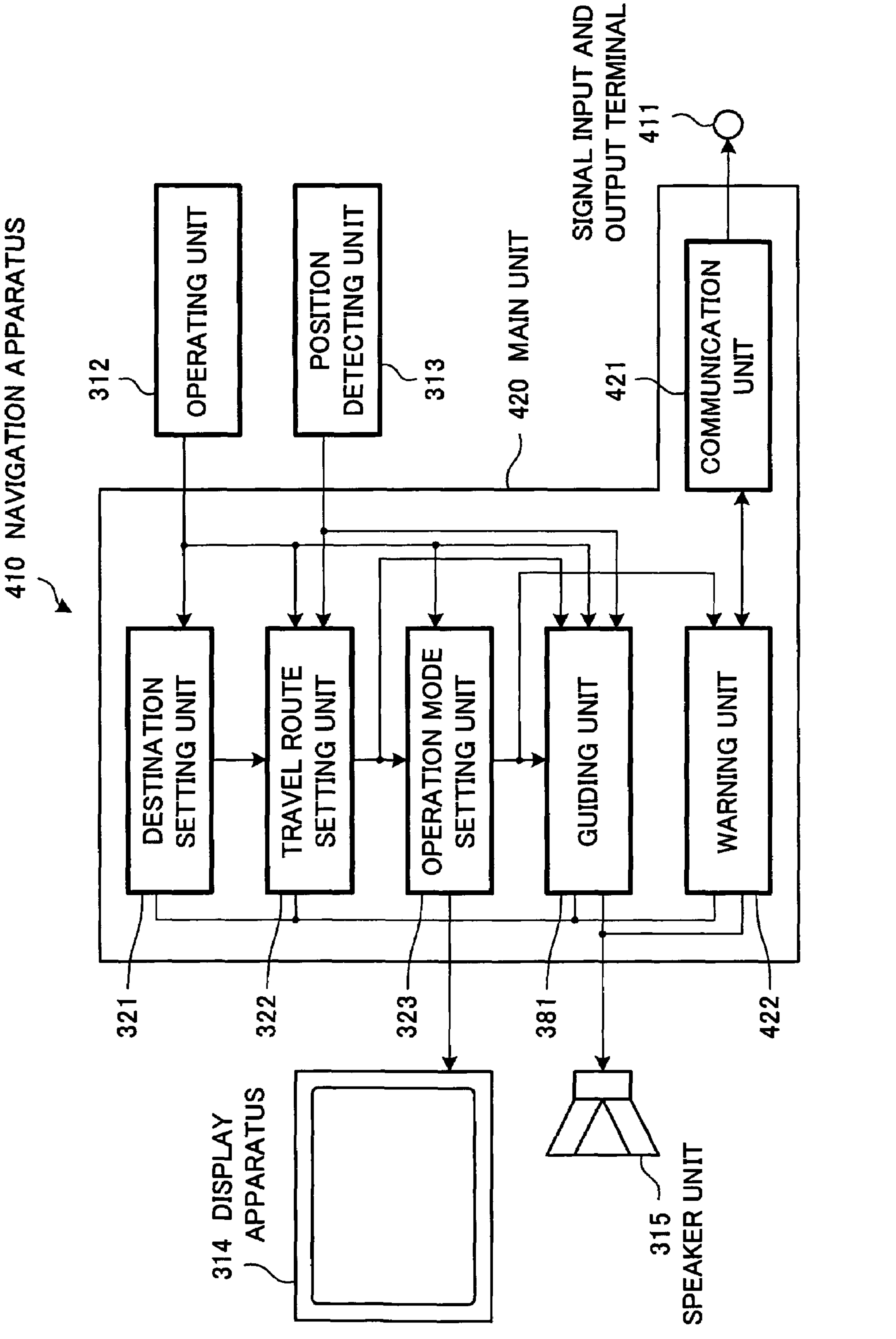
FIG. 15 is a block diagram showing the navigation apparatus according to the fifth embodiment of the present invention.
Figure 16:
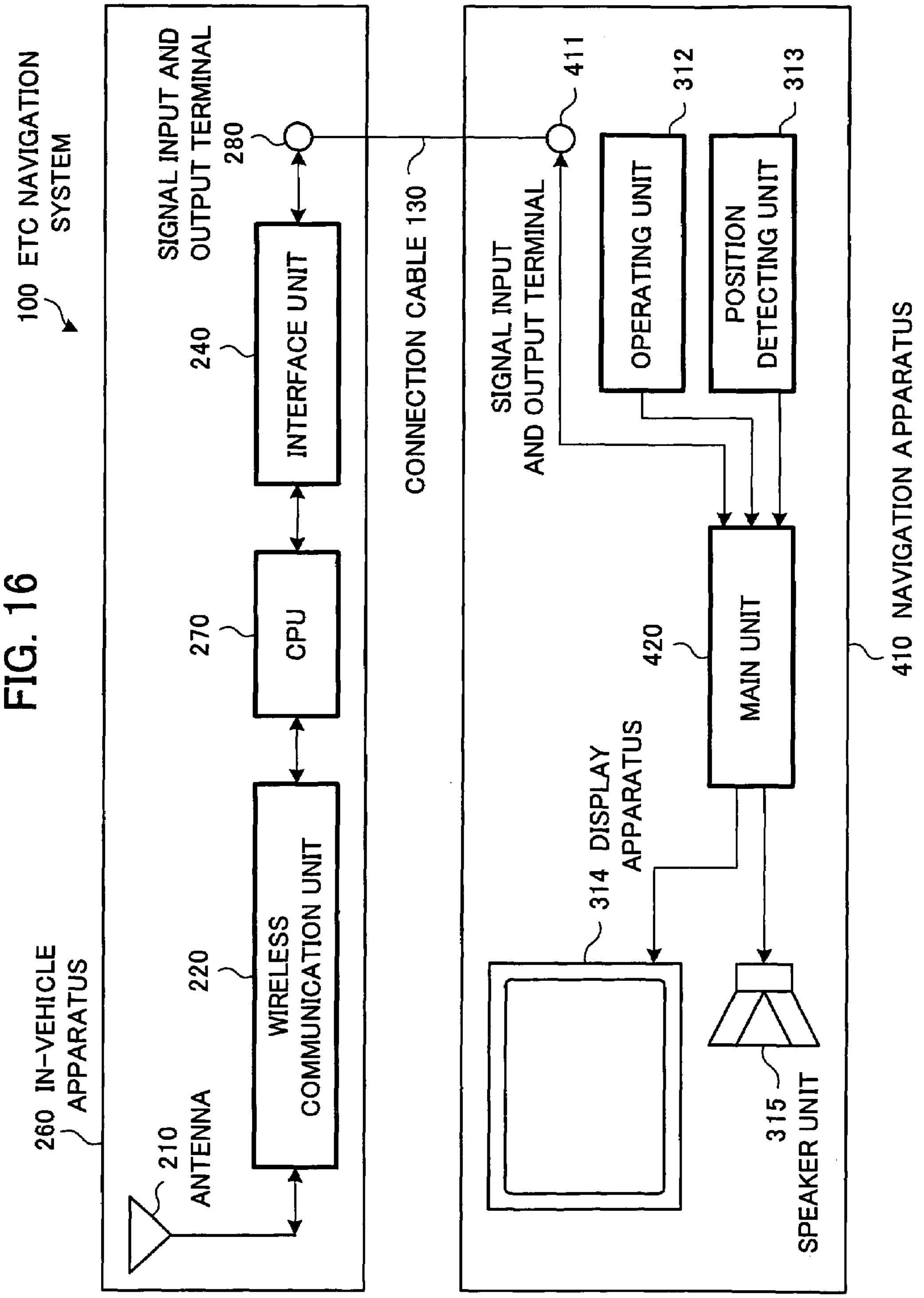
FIG. 16 is a block diagram showing the navigation system according to the fifth embodiment of the present invention.

As shown in FIGS. 15 and 16, the ETC navigation system 120 to be provided as a navigation system according to the fifth embodiment is operative in combination with the ETC system to be provided as one embodiment of an automated toll collection system. The ETC navigation system 120 comprises an ETC in-vehicle apparatus 260 to be provided as an in-vehicle apparatus provided in an automotive vehicle as part of the ETC system, a navigation apparatus 410 according to the fifth embodiment, a connection cable intervening between the ETC in-vehicle apparatus 260 and the navigation apparatus 410 to ensure that the ETC in-vehicle apparatus 260 is electrically connected to the navigation apparatus 410.

The ETC in-vehicle apparatus 260 is substantially the same in construction as the ETC in-vehicle apparatus 200 (see FIG. 3) with the exception of the fact that the ETC in-vehicle apparatus 260 includes a central processing unit (CPU) 270 and a signal input and output terminal 280 having inputted therein a signal which is received from the navigation apparatus 410, and having outputted therethrough a signal which is outputted to the navigation apparatus 410 in place of the CPU 230 (see FIG. 3) and the signal input and output terminal 250 (see FIG. 3).

The navigation apparatus 410 is substantially the same in construction as the navigation apparatus 370 (see FIG. 9) with the exception of the fact that the navigation apparatus 410 includes a main unit 420 in place of the main unit 380 (see FIG. 9), and further includes a signal input and output terminal 411 having inputted therein a signal which is received from the ETC in-vehicle apparatus 260, and having outputted therethrough a signal which is outputted to the ETC in-vehicle apparatus 260.

The main unit 420 is substantially the same in construction as the main unit 380 with the exception of the fact that the main unit 420 further includes a communication unit 421 constituting communication means for performing communication with the ETC in-vehicle apparatus 260, and a warning unit 422 to be provides as instructing means for instructing an user.

The communication unit 421 is operative to receive signals from each of the signal input and output terminal 411 and the warning unit 422, and to produce signals to be respectively outputted to the signal input and output terminal 411 and the warning unit 422. The communication unit 421 is constituted by electronic elements such as for example CPU (not shown), memory unit (not shown), and interface unit (not shown).

The communication unit 421 is operative to receive operation mode information indicative of the operation mode to be assumed by the ETC in-vehicle apparatus 260. The warning unit 422 is operative to judge whether or not the ETC in-vehicle apparatus 260 is operable to allow the ETC system to be utilized at this time on the basis of the operation mode information received by the communication unit 421.

The warning unit 422 is operative to receive signals from the operation mode setting unit 323 and the communication unit 421. The warning unit 422 is operative to produce signals to be respectively transmitted to the display apparatus 314, the speaker unit 315, and the communication unit 421. The warning unit 422 is constituted by a central processing unit (not shown) and a memory unit (not shown).

The warning unit 422 is operative to issue a warning on the basis of the setting of the operation mode setting unit 323 and the information obtained as the operation mode of the in-vehicle apparatus by the communication unit 421.

The warning unit 422 is operative to issue a warning when the judgment is made that the in-vehicle apparatus is in the inactive mode to prevent the ETC system from being utilized on the toll road on the basis of the information obtained as an operation mode of the ETC in-vehicle apparatus 260 by the communication unit 421 under the condition that the operation mode setting means sets the active mode to allow the ETC system to be utilized on the toll road.

The following description will then be directed to the operation of the fifth embodiment of the navigation apparatus and the navigation system according to the present invention.

The operation of the navigation apparatus 410 according to the fifth embodiment substantially the same as the operation of the navigation apparatus according to the third embodiment will not be described hereinafter.

Figure 17:
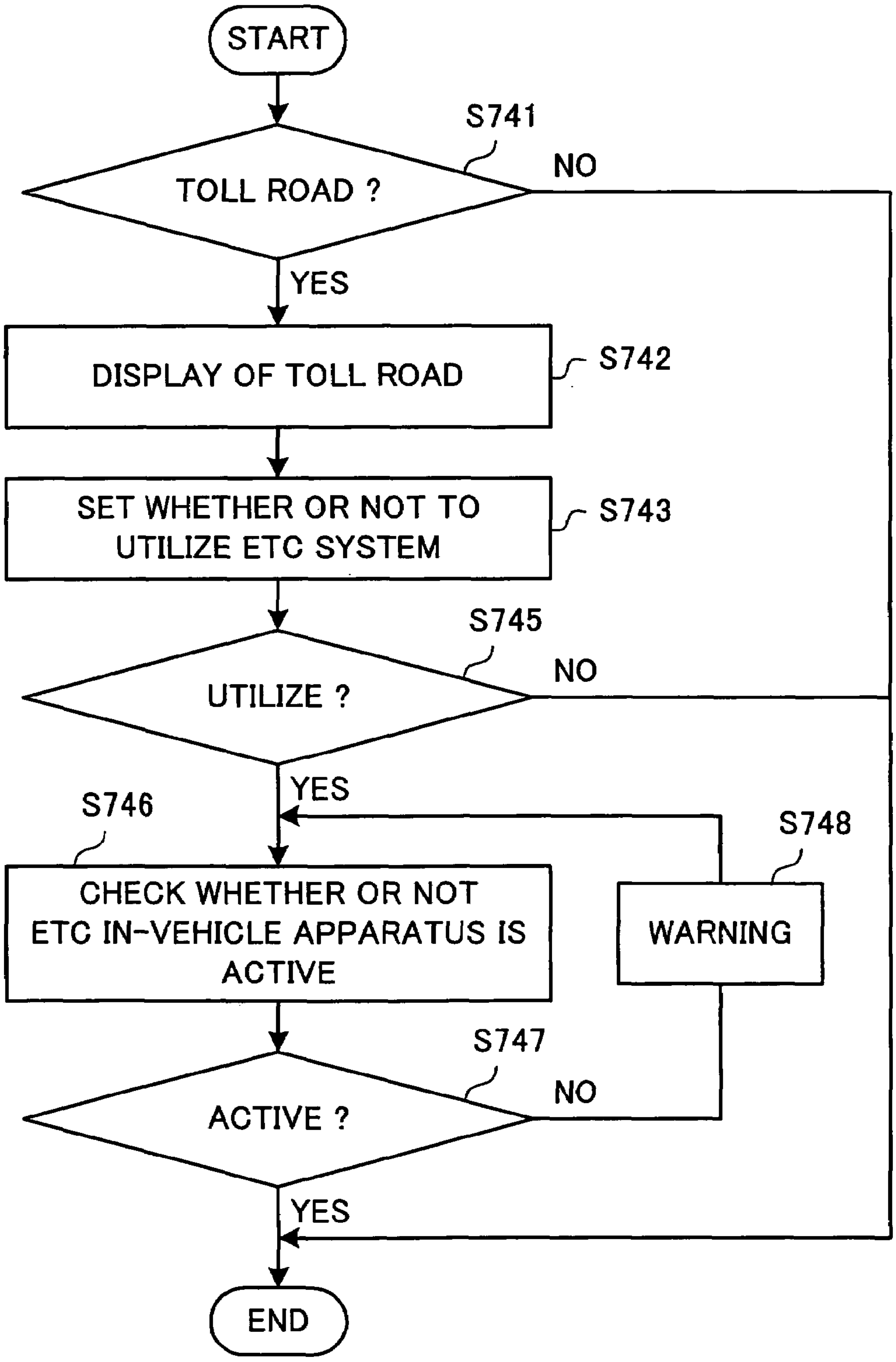
FIG. 17 is a flowchart showing an operation of determining a travel route by the navigation apparatus shown in FIG. 15.

As shown in FIG. 17, the judgment is firstly made by the operation mode setting unit 323 on whether or not there is one or more toll roads on the travel route set by the travel route setting unit 322 (in the step S741). When the judgment is made that there is one or more toll roads on the travel route, the operation mode setting unit 323 is operated to have the display apparatus 314 display information on the toll road of the travel route (in the step S742) to allow an user to set whether or not to utilize the ETC system on the toll road of the travel route set by the travel route setting unit 322 (in the step S743).

The warning unit 422 is then operated to judge whether or not the ETC system is utilized on the toll road of the travel route set by the travel route setting unit 322 on the basis of the setting of the operation mode setting unit 323 (in the step S745). The navigation apparatus 410 is operated to have the warning unit 422 judge whether or not the ETC in-vehicle apparatus 260 is in the active mode to allow the ETC system to be utilized on the toll road (in the step S746) when the judgment is made in the step S745 that the ETC system is utilized on the toll road.

The navigation apparatus and the navigation system will be more specifically described hereinafter. The warning unit 422 is firstly operated to obtain the information on the operation mode of the in-vehicle apparatus from the ETC in-vehicle apparatus 260 through the signal input and output terminal 411 and the connection cable 130.

The communication unit 421 of the navigation apparatus 410 is then operated to issue an instruction to the CPU 270 of the ETC in-vehicle apparatus 260 to require the information on the operation mode of the in-vehicle apparatus through the connection cable 130, the signal input and output terminal 280 and the interface unit 240. The information on the operation mode of the in-vehicle apparatus is then transmitted to the communication unit 421 of the navigation apparatus 410 from the CPU 270 of the ETC in-vehicle apparatus 260 through the connection cable 130, the signal input and output terminal 280 and the interface unit 240.

When the information on the operation mode of the in-vehicle apparatus is obtained from the ETC in-vehicle apparatus 260 through the connection cable 130 and the signal input and output terminal 411, the communication unit 421 of the navigation apparatus 410 is operated to input the information on the operation mode of the in-vehicle apparatus to the guiding unit 461.

When the judgment is made in the step S741 that there is no toll road on the travel route, or the judgment is made in the step S745 that the ETC system is not utilized on the travel route, the navigation apparatus 410 is operated to complete the step of determining the travel route as shown in FIG. 17.

The judgment is made by the warning unit 422 on whether or not the ETC in-vehicle apparatus 260 is in the inactive mode to prevent the ETC system from being utilized on the current toll road (in the step S747). When the judgment is made in the step S747 that the ETC in-vehicle apparatus 260 is in the inactive mode, the warning unit 422 is operated to issue a warning through the image to be displayed by the display apparatus 314 and the sound to be produced by the speaker unit 315 (in the step S748). When the judgment is made in the step S747 that the ETC in-vehicle apparatus 260 is in the active mode, the navigation apparatus 410 is operated to complete the step of determining the travel route as shown in FIG. 17.

From the above detail description, it will be understood that the navigation apparatus 410 according to the sixth embodiment can allow the user of the ETC system in a relatively early state to set the ETC in-vehicle apparatus 260 to the active mode to allow the ETC system to be utilized on the toll road by reason that the warning unit 422 is operative to issue a warning when the judgment is made that the ETC in-vehicle apparatus 260 is in the inactive mode to be prevent the ETC system from being utilized on the toll road although the automotive vehicle is being guided into the ETC lane. Accordingly, the navigation apparatus 410 can reduce the tedious task to be imposed on the user of the ETC system by preventing the user of the ETC system from rushing to turn on the ETC in-vehicle apparatus 260, or rushing to insert the ETC card into the ETC in-vehicle apparatus 260 when the automotive vehicle is guided with the ETC system on the toll road, compared with a task to be imposed by an apparatus which fails to comprise a warning unit 422 for issuing the warning.

The navigation system according to the fifth embodiment can reduce the tedious task to be imposed on the user of the ETC system in comparison with the tedious task to be imposed on the user of the ETC system by the conventional system by reason that the navigation apparatus 410 can reduce the tedious task to be imposed on the user of the ETC system in comparison with the tedious task to be imposed on the user of the ETC system by the conventional apparatus.

Additionally, even if the judgment is made that there are two or more toll roads on the travel route, the navigation apparatus 410 according to the fifth embodiment is operative to judge in a lump about whether or not to set the active mode to allow the ETC system to be utilized on the toll roads. However, the navigation apparatus according to the present invention may be operative to selectively set active and inactive modes on each of the toll roads by judging on each of the toll roads on whether to guide the automotive vehicle with the ETC system or without the ETC system as has been described in the second embodiment.

Further, the navigation apparatus 410 according to the fifth embodiment may allow the user to selectively set whether or to utilize the ETC system on the toll road of the travel route after allowing the user to notice the difference between the toll to be collected with the ETC system and the toll to be collected without the ETC system as has been described in the fourth embodiment.

In this embodiment, the ETC navigation system 120 comprises a connection cable 130 intervening between the ETC in-vehicle apparatus 260 and the navigation apparatus 410 to ensure that the ETC in-vehicle apparatus 260 is electrically connected to the navigation apparatus 410. However, the wireless communication may be performed between the ETC in-vehicle apparatus 260 and the navigation apparatus 410.

(Sixth Embodiment)

The following description will then be directed to the constitution of the sixth embodiment of the navigation apparatus and the navigation system according to the present invention.

The constitutional elements of the navigation apparatus and the navigation system according to the sixth embodiment are substantially the same as those of the navigation apparatus and the navigation system according to the fifth embodiment except for the constitutional elements appearing in the following description. Therefore, the constitutional elements of the navigation apparatus and the navigation system according to the sixth embodiment the same as those of the navigation apparatus and the navigation system according to the fifth embodiment will not be described but bear the same reference numerals and legends as those of the navigation apparatus and the navigation system according to the fifth embodiment.

Figure 18:
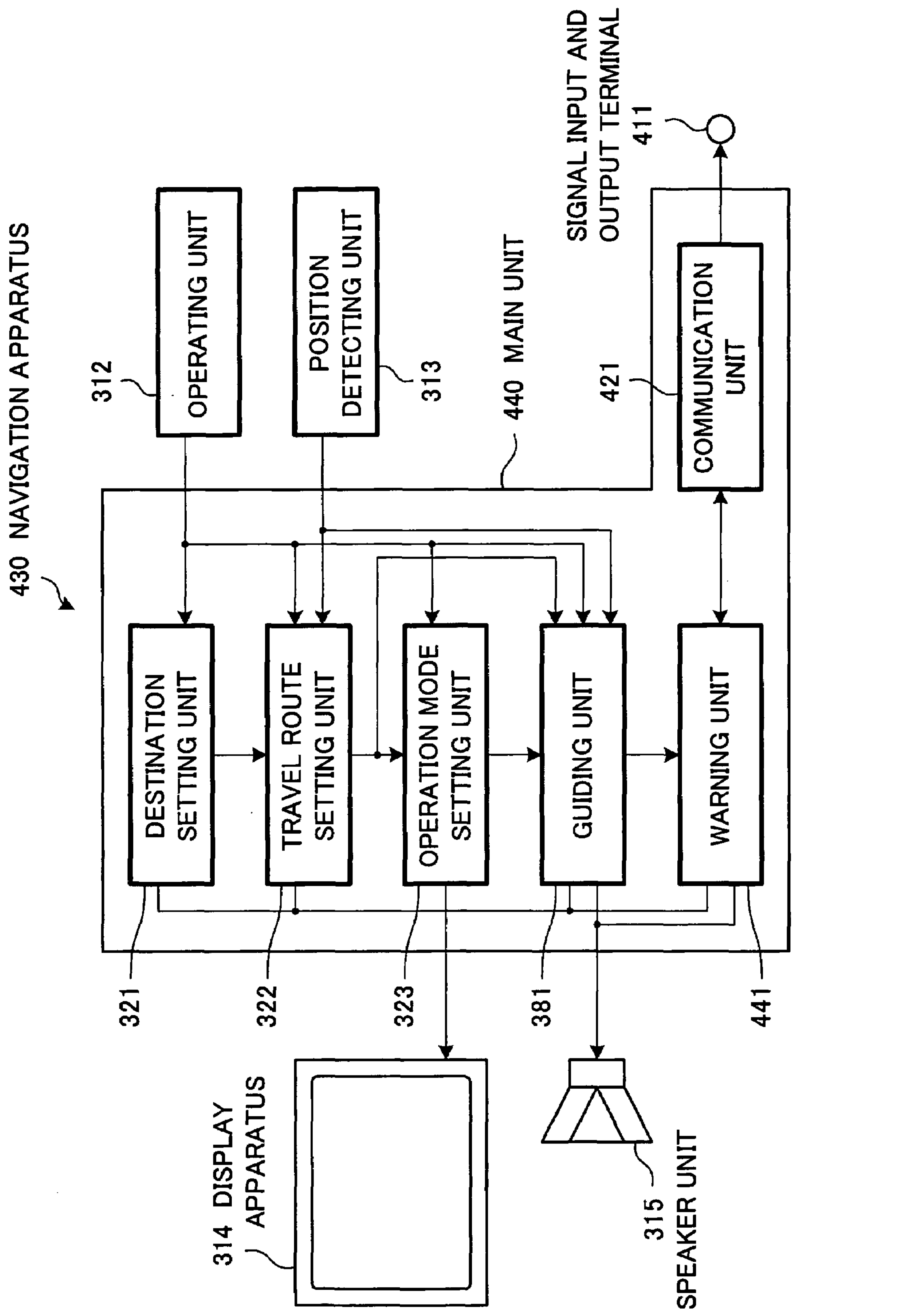
FIG. 18 is a block diagram showing the navigation apparatus according to the sixth embodiment of the present invention.

The ETC navigation system to be provided as a navigation system according to the sixth embodiment is substantially the same in construction as the ETC navigation system 120 (see FIG. 16) according to the fifth embodiment with the exception of the fact that the ETC navigation system according to the sixth embodiment comprises a navigation apparatus 430 shown in FIG. 18 in place of the navigation apparatus 410 (see FIG. 16).

The navigation apparatus 430 is substantially the same in construction as the navigation apparatus 410 with the exception of the fact that the navigation apparatus 430 comprises a main unit 440 in place of the main unit 420 (see FIG. 16).

The main unit 440 is substantially the same in construction as the main unit 420 with the exception of the fact that the main unit 440 comprises a warning unit 441 constituting warning means for issuing a warning in place of the warning unit 422 (see FIG. 15). The warning unit 441 is operative to receive signals from the guiding unit 381 and the communication unit 421, and to produce signals to be respectively outputted to the display apparatus 314, the speaker unit 315, and the communication unit 421. The warning unit 440 is constituted by a central processing unit (not shown) and a memory unit (not shown).

When the automotive vehicle is guided into a specific lane by the guiding unit 381, the warning unit 441 is operative to issue a warning on the basis of the setting of the operation mode setting unit 323 and the information obtained as the operation mode of the in-vehicle apparatus by the communication unit 421. When, for example, the automotive vehicle is guided into the ETC lane by the guiding unit 381, the warning unit 441 is operative to judge whether or not the ETC in-vehicle apparatus 260 is in the active mode to allow the ETC system to be utilized on the toll road on the basis of the mode information obtained by the communication unit 421, and to issue a warning when the judgment is made that the ETC in-vehicle apparatus 260 is in the inactive mode to prevent the ETC system from being utilized on the toll road.

The following description will then be directed to the operation of the sixth embodiment of the navigation apparatus and the navigation system according to the present invention.

The operation of the navigation apparatus 430 according to the sixth embodiment substantially the same as the operation of the navigation apparatus according to the fifth embodiment will not be described hereinafter.

As shown in FIG. 10, the judgment is firstly made by the operation mode setting unit 323 on whether or not there is one or more toll roads on the travel route set by the travel route setting unit 322 (in the step S721). When the judgment is made in the step S721 that there is one or more toll roads on the travel route, the operation mode setting unit 323 is operated to have the display apparatus 314 display the information on each of the toll roads extracted from the travel route (in the step S722), and to judge in each of the toll roads extracted from the travel route set by the travel route setting unit 322 on whether or not to set the active mode to allow the ETC system to be utilized (in the step S723).

When, on the other hand, the judgment is made in the step S721 that there is no toll road on the travel route, or after the step S723, the navigation apparatus 430 is operated to complete the step of determining the travel route as shown in FIG. 10.

Figure 19:
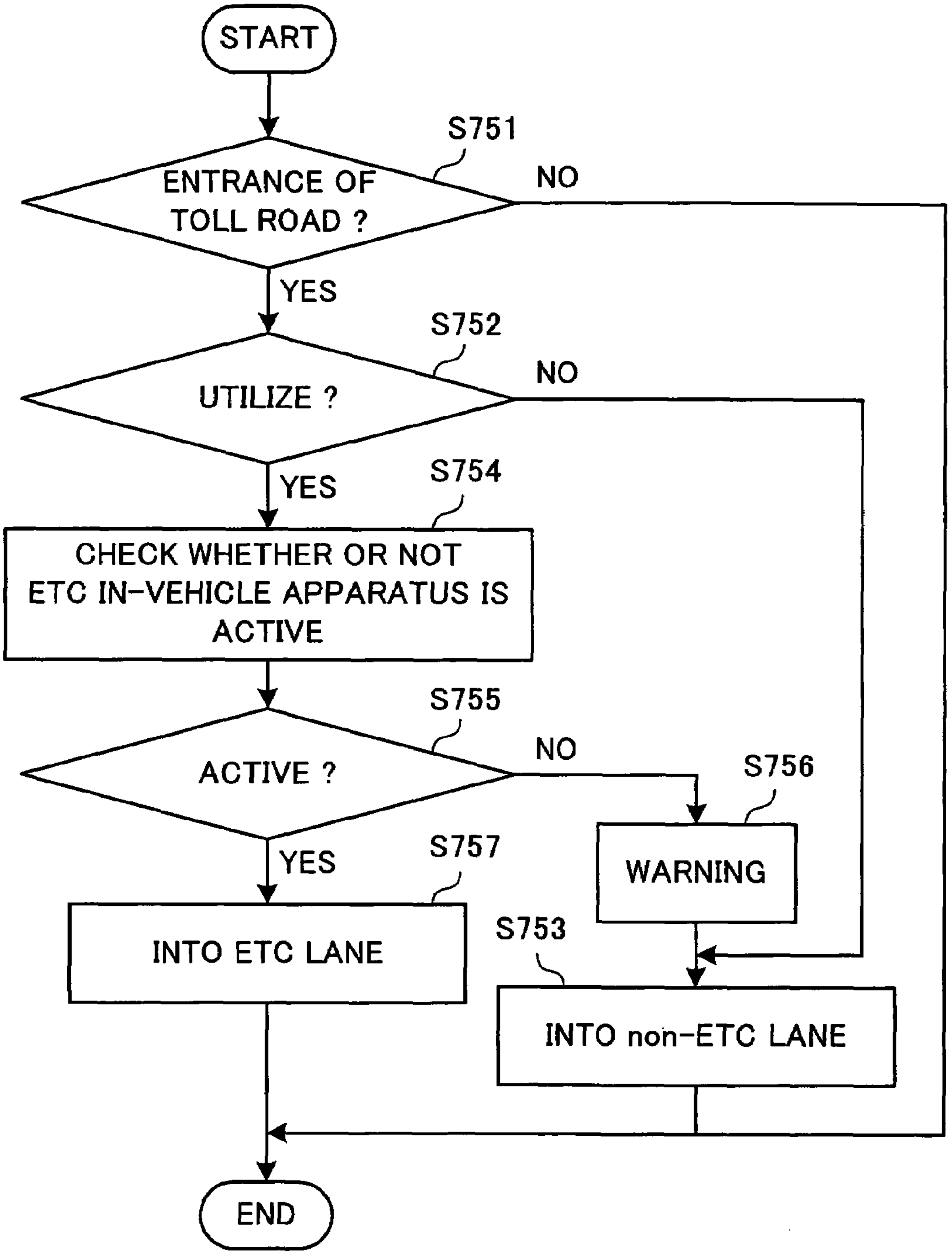
FIG. 19 is a flowchart showing an operation of guiding the automotive vehicle in the vicinity of the entrance of the toll road by the navigation apparatus shown in FIG. 18.

When the automotive vehicle is guided by the guiding unit 381 of the navigation apparatus 430, the judgment is made by the guiding unit 381 on whether or not the automotive vehicle is in the vicinity of the entrance of the toll road on the basis of the current position detected by the position detecting unit 313, in other words, the distance between the automotive vehicle and the entrance of the toll road is equal to or smaller than a predetermined threshold value (in the step S751). When the judgment is made that the automotive vehicle is not in the vicinity of the entrance of the toll road, the navigation apparatus 430 is operated to complete the step of guiding the automotive vehicle in the vicinity of the entrance of the toll road as shown in FIG. 19.

When the judgment is made in the step S751 that the automotive vehicle is in the vicinity of the entrance of the toll road, the judgment is made by the guiding unit 381 on whether or not the ETC system is utilized on the toll road on the basis of the setting of the operation mode setting unit 323 (in the step S752). When the judgment is made in the step S752 that the ETC system is not utilized on the toll road, the guiding unit 381 is operated to guide the automotive vehicle into the non-ETC lane (in the step S753) before completing the step of guiding the automotive vehicle in the vicinity of the entrance of the toll road as shown in FIG. 19.

When, on the other hand, the judgment is made in the step S752 that the ETC system is utilized on the toll road, the guiding unit 381 of the navigation apparatus 430 is operated to have the warning unit 422 receive the information on the operation mode of the in-vehicle apparatus from the communication unit 421 (in the step S754). The warning unit 422 is then operated to judge whether or not ETC in-vehicle apparatus is in the active mode to allow the ETC system to be utilized on the toll road (in the step S755).

When the judgment is made in the step S755 that the ETC in-vehicle apparatus 260 is in the inactive mode to prevent the ETC system from being utilized on the current toll road, the warning unit 422 is operated to issue a warning through the image to be displayed by the display apparatus 314 and the sound to be produced by the speaker unit 315 (in the step S756). When the judgment is made in the step S755 that the ETC in-vehicle apparatus 260 is in the active mode to allow the ETC system to be utilized on the current toll road, the guiding unit 381 is operated to guide the automotive vehicle into the ETC lane in the vicinity of the entrance of the toll road (in the step S757) before completing the step of guiding the automotive vehicle in the vicinity of the entrance of the toll road as shown in FIG. 19.

When the automotive vehicle is guided by the navigation apparatus 430, the navigation apparatus 430 is operated to compute the elapsed time after completing the operation shown in FIG. 19. When the judgment is made that the elapsed time exceeds a predetermined threshold value, the navigation apparatus 430 is operated to restart the operation shown in FIG. 19.

Figure 20:
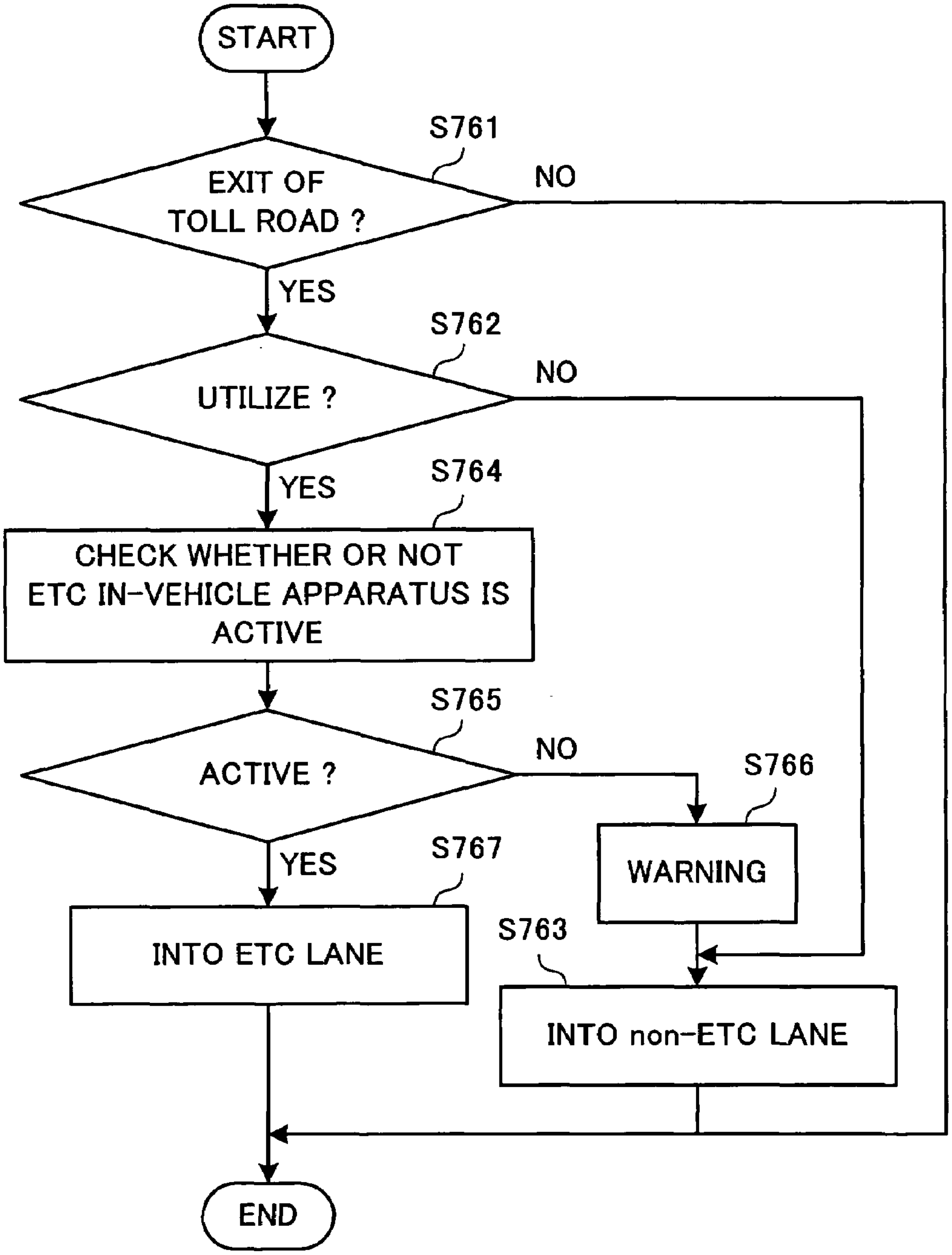
FIG. 20 is a flowchart showing an operation of guiding the automotive vehicle in the vicinity of the entrance of the toll by the navigation apparatus shown in FIG. 18.

When the automotive vehicle is guided by the guiding unit 381 of the navigation apparatus 430, the judgment is made by the guiding unit 381 on whether or not the automotive vehicle is in the vicinity of the exit of the toll road on the basis of the current position detected by the position detecting unit 313, in other words, the distance between the automotive vehicle and the exit of the toll road is equal to or smaller than a predetermined threshold value (in the step S761). When the judgment is made in the step S761 that the automotive vehicle is not in the vicinity of the exit of the toll road, the navigation apparatus 430 is operated to complete the step of guiding the automotive vehicle in the vicinity of the exit of the toll road as shown in FIG. 20.

When the judgment is made in the step S761 that the automotive vehicle is in the vicinity of the exit of the toll road, the judgment is made by the guiding unit 381 on whether or not the ETC system is utilized on the toll road of the travel route set by the travel route setting unit 322 on the basis of the setting of the operation mode setting unit 323 (in the step S762). When the judgment is made in the step S762 that the ETC system is not utilized on the toll road, the guiding unit 381 is operated to guide the automotive vehicle into the non-ETC lane (in the step S763) before completing the step of guiding the automotive vehicle in the vicinity of the exit of the toll road as shown in FIG. 20.

When, on the other hand, the judgment is made in the step S762 that the ETC system is utilized on the toll road, the guiding unit 381 of the navigation apparatus 430 is operated to have the warning unit 441 receive the information on the operation mode of the in-vehicle apparatus from the communication unit 421 (in the step S764) as has been described in the fifth embodiment. The warning unit 441 is then operated to judge whether or not ETC in-vehicle apparatus is in the active mode to allow the ETC system to be utilized on the toll road (in the step S765).

When the judgment is made in the step S765 that the ETC in-vehicle apparatus 260 is in the inactive mode to prevent the ETC system from being utilized on the current toll road, the warning unit 441 is operated to issue a warning through the image to be displayed by the display apparatus 314 and the sound to be produced by the speaker unit 315 (in the step S766). When the judgment is made in the step S765 that the ETC in-vehicle apparatus 260 is in the active mode to allow the ETC system to be utilized on the current toll road, the guiding unit 381 is operated to guide the automotive vehicle into the ETC lane at the exit of the current toll road (in the step S767) before completing the step of guiding the automotive vehicle in the vicinity of the exit of the toll road as shown in FIG. 20.

When the automotive vehicle is guided by the navigation apparatus 430, the navigation apparatus 430 is operated to compute the elapsed time after completing the operation shown in FIG. 20. When the judgment is made that the elapsed time exceeds a predetermined threshold value, the operation shown in FIG. 20 is restarted by the navigation apparatus 430. The operation shown in FIG. 21 may be executed by the navigation apparatus 430 in place of the operation shown in FIG. 20.

Figure 21:
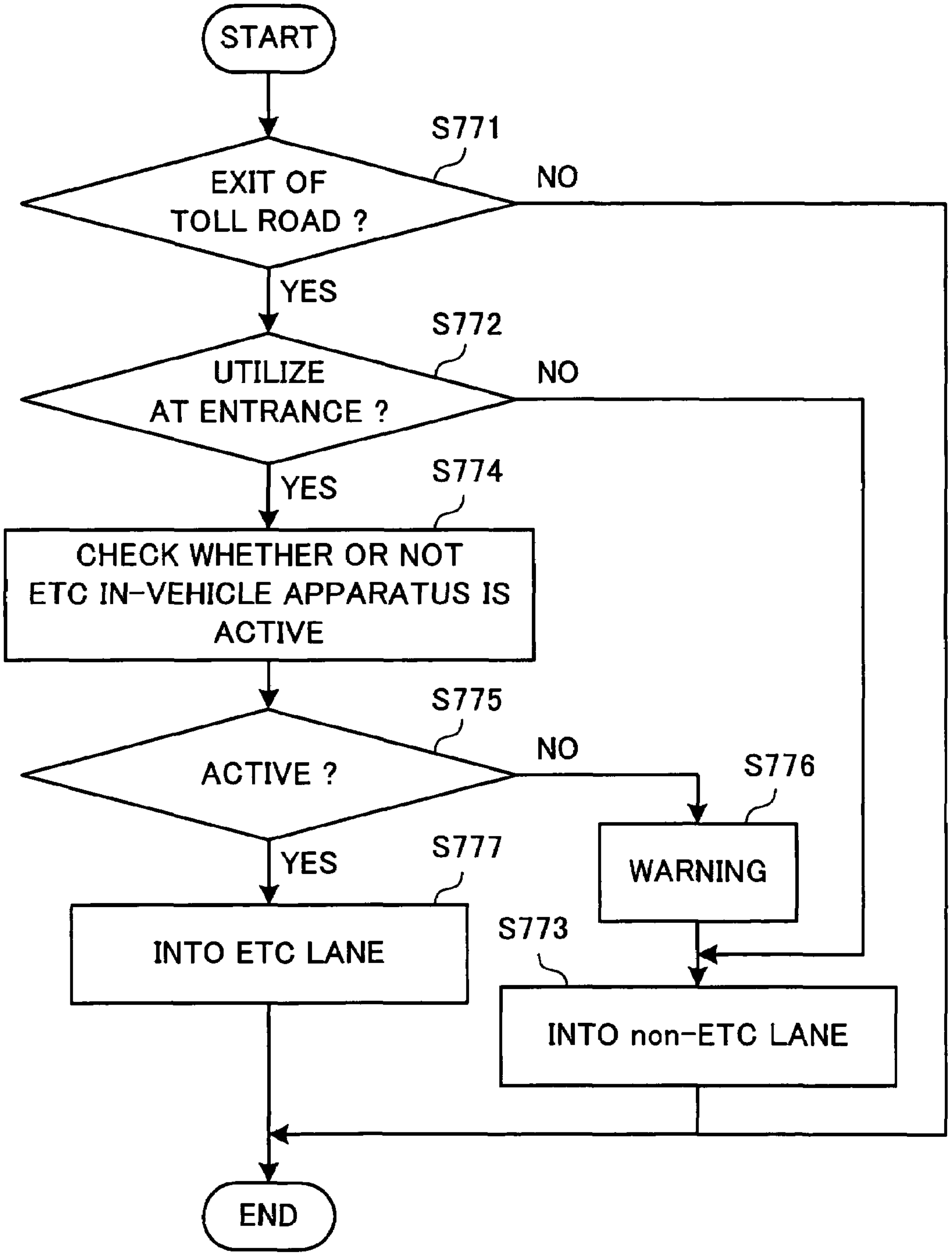
FIG. 21 is a flowchart showing an operation which is different from the operation shown in FIG. 20, and which is of guiding the automotive vehicle in the vicinity of the entrance of the toll by the navigation apparatus shown in FIG. 18.

When the automotive vehicle is guided by the guiding unit 381 of the navigation apparatus 430 as shown in FIG. 21, the judgment is made by the guiding unit 381 on whether or not the automotive vehicle is in the vicinity of the exit of the toll road on the basis of the current position detected by the position detecting unit 313, in other words, the distance between the automotive vehicle and the exit of the toll road is equal to or smaller than a predetermined threshold value (in the step S771). When the judgment is made in the step S771 that the automotive vehicle is not in the vicinity of the exit of the toll road, the navigation apparatus 430 is operated to complete the step of guiding the automotive vehicle in the vicinity of the exit of the toll road as shown in FIG. 21.

When the judgment is made in the step S771 that the automotive vehicle is in the vicinity of the exit of the current toll road, the judgment is made by the guiding unit 381 on whether or not the automotive vehicle is guided through the ETC lane at the entrance of the current toll road (in the step S772). When the judgment is made in the step S772 that the automotive vehicle is guided through the non-ETC lane at the entrance of the current toll road, the guiding unit 381 is operated to guide the automotive vehicle into the non-ETC lane at the exit of the current toll road (in the step S773) before completing the step of guiding the automotive vehicle in the vicinity of the exit of the toll road as shown in FIG. 21.

When, on the other hand, the judgment is made in the step S772 that the automotive vehicle is guided through the ETC lane at the entrance of the current toll road, the guiding unit 381 is operated to have the warning unit 441 receive the operation mode information from the ETC in-vehicle apparatus 260 (in the step S774) as has been described in the fifth embodiment. The warning unit 441 is then operated to judge whether or not the ETC in-vehicle apparatus 260 is in the active mode to allow the ETC system to be utilized on the current toll road (in the step S775).

When the judgment is made in the step S775 that the ETC in-vehicle apparatus 260 is in the inactive mode to prevent the ETC system from being utilized on the current toll road, the warning unit 441 is operated to issue a warning through the image to be displayed by the display apparatus 314 and the sound to be produced by the speaker unit 315 (in the step S776). When the judgment is made in the step S775 that the ETC in-vehicle apparatus 260 is in the active mode to allow the ETC system to be utilized on the current toll road, the guiding unit 381 is operated to guide the automotive vehicle into the ETC lane at the exit of the current toll road (in the step S777) before completing the step of guiding the automotive vehicle in the vicinity of the exit of the toll road as shown in FIG. 21.

When the automotive vehicle is guided by the navigation apparatus 430, the navigation apparatus 430 is operated to compute the elapsed time after completing the operation shown in FIG. 21. When the judgment is made that the elapsed time exceeds a predetermined threshold value, the navigation apparatus 430 is operated to restart the operation shown in FIG. 21.

From the above detail description, it will be understood that the navigation apparatus 430 according to the sixth embodiment can allow the user of the ETC system in a relatively early state to set the ETC in-vehicle apparatus 260 to the active mode to allow the ETC system to be utilized on the toll road by reason that the warning unit 441 is operative to issue a warning when the judgment is made that the ETC in-vehicle apparatus 260 is in the inactive mode to prevent the ETC system from being utilized on the toll road although the automotive vehicle is being guided into the ETC lane. Accordingly, the navigation apparatus 430 can reduce the tedious task to be imposed on the user of the ETC system by preventing the user of the ETC system from rushing to set the ETC in-vehicle apparatus 260 to the active mode to allow the ETC system to be utilized on the toll road when the automotive vehicle is guided with the ETC system on the toll road, compared with a task to be imposed by an apparatus which fails to comprise a warning unit 441 for issuing the warning.

The navigation system according to the sixth embodiment can reduce the tedious task to be imposed on the user of the ETC system in comparison with the tedious task to be imposed on the user of the ETC system by the conventional system by reason that the navigation apparatus 430 can reduce the tedious task to be imposed on the user of the ETC system in comparison with the tedious task to be imposed on the user of the ETC system by the conventional apparatus.

Additionally, even if the judgment is made that there are two or more toll roads on the travel route, the navigation apparatus 430 according to the sixth embodiment is operative to judge in a lump about whether or not to set the active mode to allow the ETC system to be utilized on the toll roads. However, the navigation apparatus according to the present invention may be operative to selectively set active and inactive modes on each of the toll roads by judging on each of the toll roads on whether to guide the automotive vehicle with the ETC system or without the ETC system as has been described in the second embodiment.

Further, the navigation apparatus 430 according to the sixth embodiment may allow the user to selectively set whether or to utilize the ETC system on the toll road of the travel route after allowing the user to notice the difference between the toll to be collected with the ETC system and the toll to be collected without the ETC system as has been described in the fourth embodiment.

(Seventh Embodiment)

The following description will then be directed to the constitution of the seventh embodiment of the navigation apparatus and the navigation system according to the present invention.

The constitutional elements of the navigation apparatus and the navigation system according to the seventh embodiment are substantially the same as those of the navigation apparatus and the navigation system according to the fifth embodiment except for the constitutional elements appearing in the following description. The constitutional elements of the navigation apparatus and the navigation system according to the seventh embodiment the same as those of the navigation apparatus and the navigation system according to the fifth embodiment will not be, therefore, described but bear the same reference numerals and legends as those of the navigation apparatus and the navigation system according to the fifth embodiment.

Figure 22:
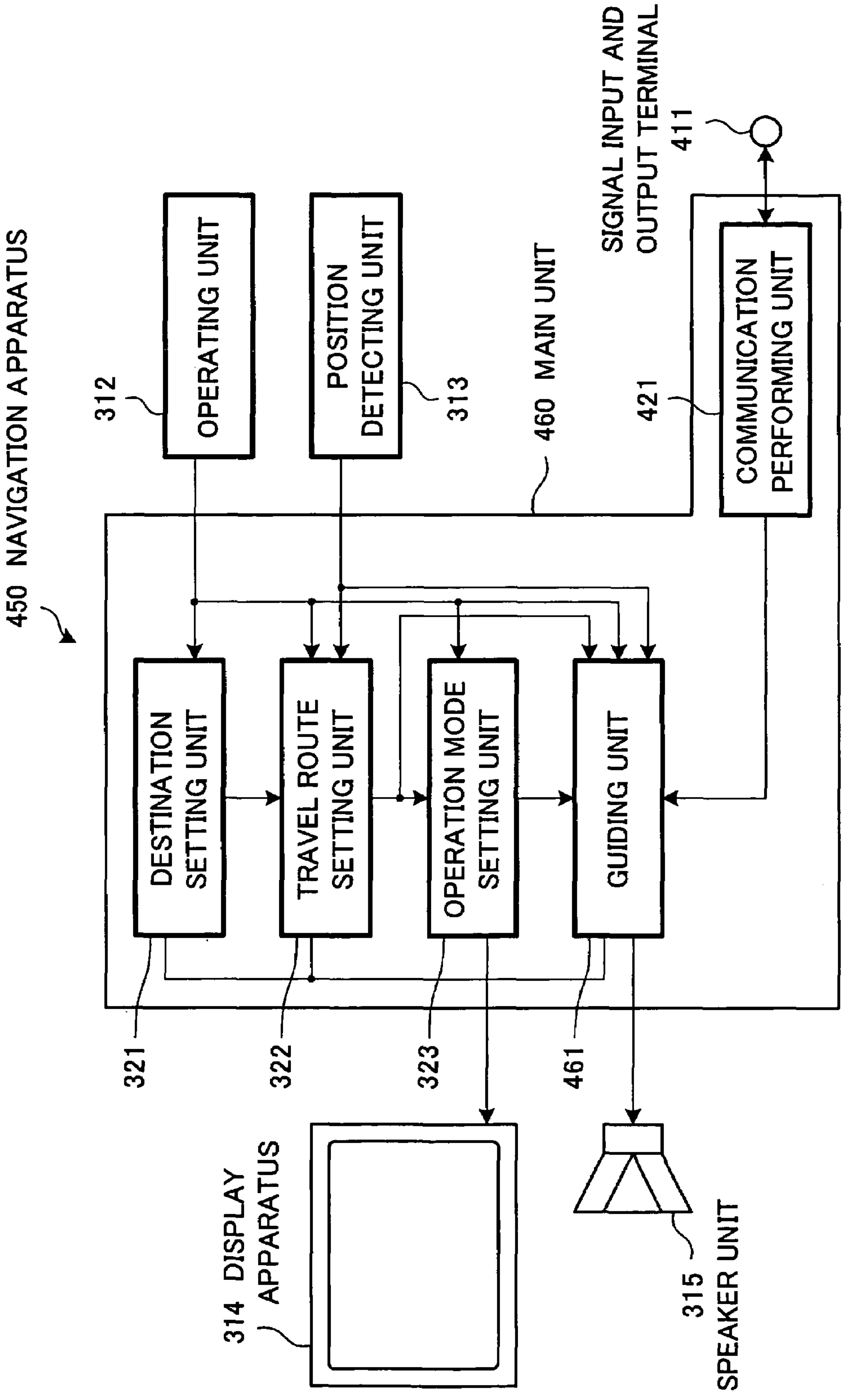
FIG. 22 is a block diagram showing the navigation apparatus according to the seventh embodiment of the present invention.

The ETC navigation system to be provided as a navigation system according to the seventh embodiment is substantially the same in construction as the ETC navigation system 120 (see FIG. 16) according to the fifth embodiment with the exception of the fact that the ETC navigation system according to the seventh embodiment comprises a navigation apparatus 450 shown in FIG. 22 in place of the navigation apparatus 410 (see FIG. 16).

The navigation apparatus 450 is substantially the same in construction as the navigation apparatus 410 with the exception of the fact that the navigation apparatus 450 comprises a main unit 460 in place of the main unit 420 (see FIG. 16).

The main unit 460 is substantially the same in construction as the main unit 420 with the exception of the fact that the main unit 460 includes a guiding unit 461 constituting guiding means for guiding the automotive vehicle through the travel route set by the travel route setting unit 322 without the warning unit 422 in place of the guiding unit 381 (see FIG. 15).

The guiding unit 461 is operative to receive signals from the operating unit 312, the position detecting unit 313, the travel route setting unit 322, the operation mode setting unit 323 and the communication unit 421, and to produce signals to be respectively outputted to the display apparatus 314, the speaker unit 315 and the communication unit 421. The guiding unit 461 is constituted by a central processing unit (not shown) and a memory unit (not shown).

The guiding unit 461 is operative to guide the automotive vehicle into a specific lane on the basis of the setting of the operation mode setting unit 323 and the information on the operation mode of the in-vehicle apparatus obtained by the communication unit 421. When, for example, the judgment is made that the ETC in-vehicle apparatus 260 is in the inactive mode to prevent the ETC system from being utilized on the toll road on the basis of the information on the operation mode of the in-vehicle apparatus obtained by the communication unit 421, the guiding unit 461 is operative to guide the automotive vehicle into the non-ETC lane on the basis of the current position detected by the position detecting unit 313.

The following description will then be directed to the operation of the seventh embodiment of the navigation apparatus and the navigation system according to the present invention.

The operation of the navigation apparatus according to the seventh embodiment substantially the same as the operation of the navigation apparatus according to the fifth embodiment will not be described hereinafter.

As shown in FIG. 10, the judgment is firstly made by the operation mode setting unit 323 of the navigation apparatus 450 on whether or not there is one or more toll roads on the travel route set by the travel route setting unit 322 (in the step S721). When the judgment is made that there is one or more toll roads on the travel route in the step S721, the operation mode setting unit 323 of the navigation apparatus 450 is operated to have the display apparatus 314 display setting information on each of the extracted toll roads (in the step S722), and to judge whether or not to set the active mode in each of the extracted toll roads (in the step S723).

When, on the other hand, the judgment is made in the step S721 that there is no toll road on the travel route, or after the step S723, the navigation apparatus 450 is operated to complete the step of determining the travel route as shown in FIG. 10.

Figure 23:
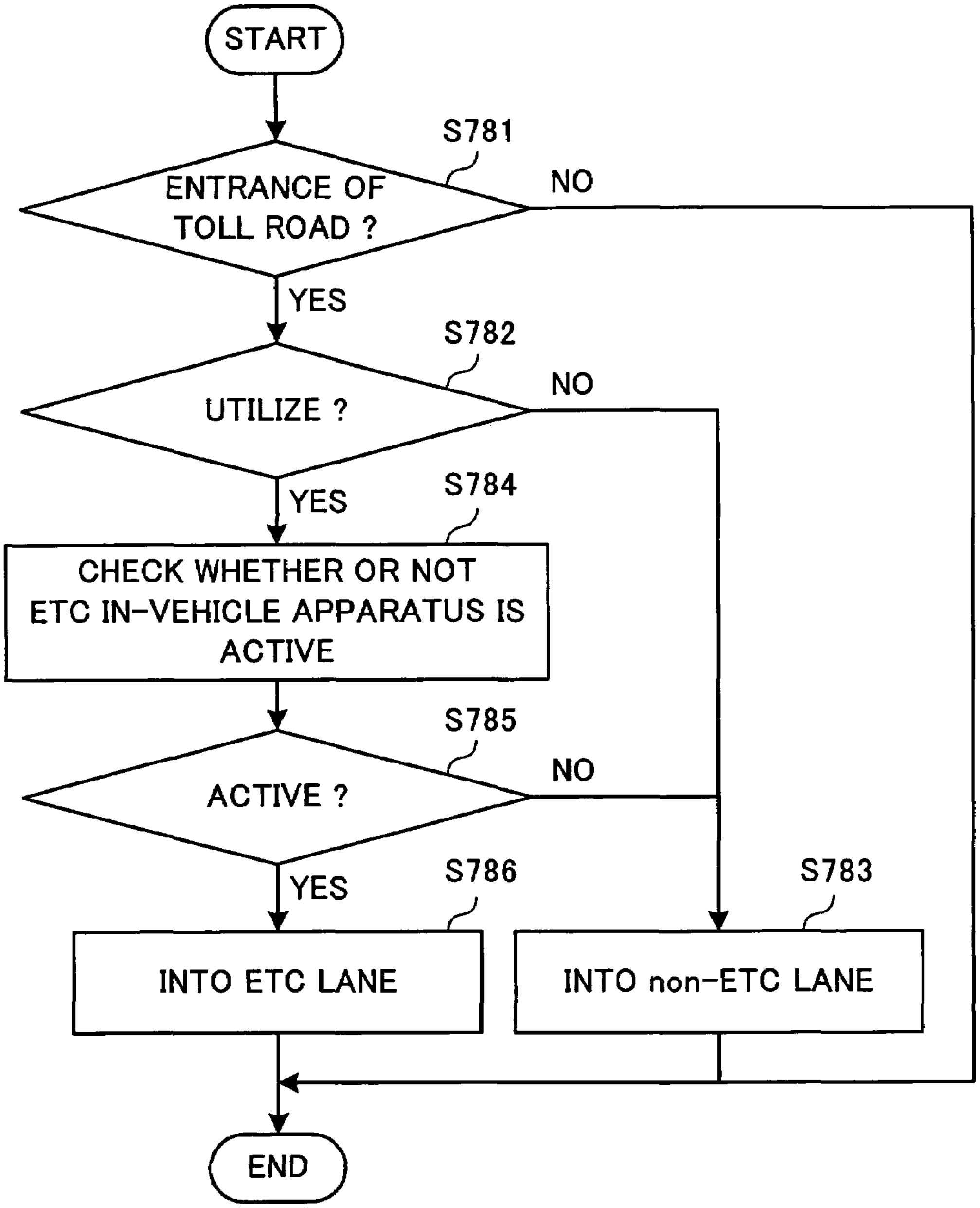
FIG. 23 is a flowchart showing an operation of guiding the automotive vehicle in the vicinity of the entrance of the toll road by the navigation apparatus shown in FIG. 22.

When the automotive vehicle is guided by the guiding unit 461 of the navigation apparatus 450 as shown in FIG. 23, the judgment is made by the guiding unit 461 on whether or not the automotive vehicle is in the vicinity of the entrance of the toll road on the basis of the current position detected by the position detecting unit 313, in other words, the distance between the automotive vehicle and the entrance of the toll road is equal to or smaller than a predetermined threshold value (in the step S781). When the judgment is made that the automotive vehicle is not in the vicinity of the entrance of the toll road as shown in FIG. 23, the navigation apparatus 450 is operated to complete the step of guiding the automotive vehicle in the vicinity of the entrance of the toll road.

When the judgment is made in the step S781 that the automotive vehicle is in the vicinity of the entrance of the toll road, the judgment is made by the guiding unit 461 on whether or not the ETC system is utilized on the toll road on the basis of the setting of the operation mode setting unit 323 (in the step S782). When the judgment is made in the step S782 that the ETC system is not utilized on the toll road as shown in FIG. 23, the guiding unit 461 is operated to guide the automotive vehicle into the non-ETC lane (in the step S783) before completing the step of guiding the automotive vehicle in the vicinity of the entrance of the toll road.

When the judgment is made that the automotive vehicle is guided with the ETC system through the toll road of the travel route on the basis of the setting of the operation mode setting unit 323 in the step S782, the navigation apparatus 450 is operated to have the guiding unit 461 judge whether or not the ETC in-vehicle apparatus 260 is in the active mode to allow the ETC system to be utilized on the toll road of the travel route (in the step S784).

The operation of the navigation apparatus and navigation system will be more specifically described hereinafter. The guiding unit 461 is firstly operated to have the communication unit 421 obtain the information on the operation mode of the in-vehicle apparatus from the ETC in-vehicle apparatus 260 (see FIG. 16) through the signal input and output terminal 411 and the connection cable 130 (see FIG. 16).

The communication unit 421 of the navigation apparatus 450 is operated to issue an instruction to the CPU 270 (see FIG. 16) of the ETC in-vehicle apparatus 260 to require the information on the operation mode of the in-vehicle apparatus through the connection cable 130 (see FIG. 16), the signal input and output terminal 411 and the interface unit 240 (FIG. 16). The information on the operation mode of the in-vehicle apparatus is then obtained from the CPU 270 (see FIG. 16) of the ETC in-vehicle apparatus 260 through the connection cable 130, the signal input and output terminal

411 and the interface unit 240 by the communication unit 421 of the navigation apparatus 450.

When the information on the operation mode of the in-vehicle apparatus is obtained from the ETC in-vehicle apparatus 260 through the connection cable 130 and the signal input and output terminal 411 by the communication unit 421 of the navigation apparatus 450, the communication unit 421 is operated to output the obtained information on the operation mode of the in-vehicle apparatus to the guiding unit 461.

The judgment is then made by the guiding unit 461 of the navigation apparatus 450 on whether or not the ETC in-vehicle apparatus 260 is in the inactive mode to prevent the ETC system from being utilized on the toll road of the travel route (in the step S785).

When the judgment is made in the step S785 that the ETC in-vehicle apparatus 260 is in the inactive mode to prevent the ETC system from being utilized on the toll road of the travel route, the step S785 proceeds to the step S783. When, on the other hand, the judgment is made in the step S785 that the ETC in-vehicle apparatus 260 is in the active mode to allow the ETC system to be utilized on the toll road of the travel route, the guiding unit 461 is operated to guide the automotive vehicle into the ETC lane (in the step S786) before completing the step of guiding the automotive vehicle in the vicinity of the entrance of the toll road as shown in FIG. 23.

When the automotive vehicle is guided by the navigation apparatus 450, the navigation apparatus 450 is operated to compute the elapsed time after completing the operation shown in FIG. 23. When the judgment is made that the elapsed time exceeds a predetermined threshold value, the operation shown in FIG. 23 is restarted by the navigation apparatus 450.

Figure 24:
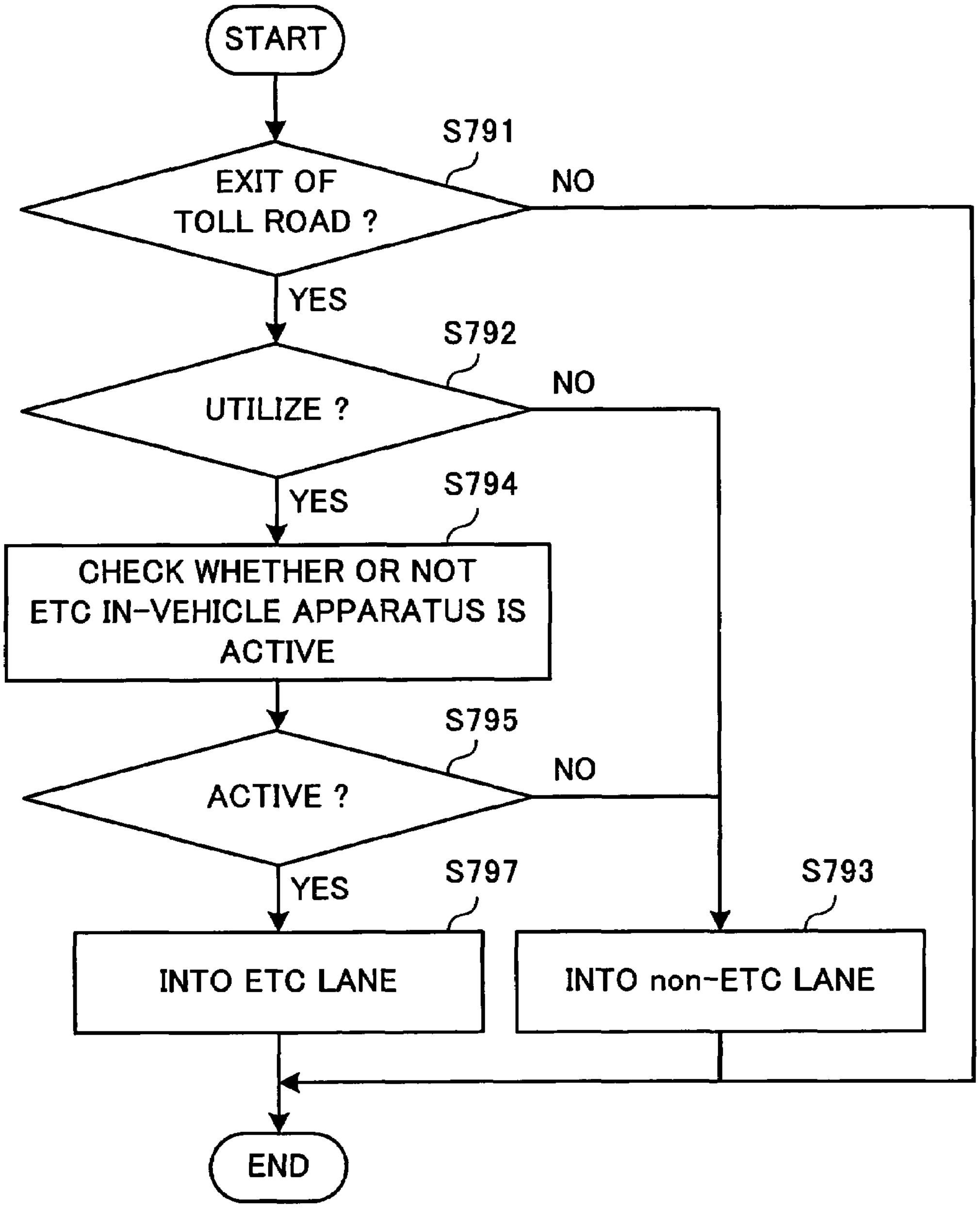
FIG. 24 is a flowchart showing an operation of guiding the automotive vehicle in the vicinity of the entrance of the toll by the navigation apparatus shown in FIG. 22.

When the automotive vehicle is guided by the guiding unit 461 of the navigation apparatus 450 as shown in FIG. 24, the judgment is made by the guiding unit 461 on whether or not the automotive vehicle is in the vicinity of the exit of the toll road on the basis of the current position detected by the position detecting unit 313, in other words, the distance between the automotive vehicle and the exit of the toll road is equal to or smaller than a predetermined threshold value (in the step S791). When the judgment is made in the step S791 that the automotive vehicle is not in the vicinity of the exit of the toll road, the navigation apparatus 450 is operated to complete the step of guiding the automotive vehicle in the vicinity of the exit of the toll road as shown in FIG. 24.

When the judgment is made in the step S791 that the automotive vehicle is in the vicinity of the exit of the toll road, the judgment is made by the guiding unit 461 of the navigation apparatus 450 on whether or not the ETC system is utilized on the toll road of the travel route set by the travel route setting unit 322 on the basis of the setting of the operation mode setting unit 323 (in the step S792). When the judgment is made in the step S792 that the ETC system is not utilized on the toll road, the guiding unit 461 is operated to guide the automotive vehicle into the non-ETC lane (in the step S793) before completing the step of guiding the automotive vehicle in the vicinity of the exit of the toll road as shown in FIG. 24.

When, on the other hand, the judgment is made in the step S792 that the ETC system is utilized on the toll road, the guiding unit 461 of the navigation apparatus 450 is operated to have the guiding unit 461 receive the information on the operation mode of the in-vehicle apparatus from the communication unit 421 (in the step S794) as has been described in the foregoing embodiment. The guiding unit 461 is then operated to judge whether or not ETC in-vehicle apparatus 260 is in the active mode to allow the ETC system to be utilized on the toll road on the basis of the information on the operation mode of the in-vehicle apparatus (in the step S795).

When the judgment is made in the step S795 that the ETC in-vehicle apparatus 260 is in the inactive mode to prevent the ETC system from being utilized on the current toll road, the step S795 proceeds to the step S793. When, on the other hand, the judgment is made in the step S795 that the ETC in-vehicle apparatus 260 is in the active mode to allow the ETC system to be utilized on the current toll road, the guiding unit 461 is operated to guide the automotive vehicle into the ETC lane at the exit of the current toll road (in the step S796) before completing the step of guiding the automotive vehicle in the vicinity of the exit of the toll road as shown in FIG. 24.

When the automotive vehicle is guided by the navigation apparatus 450, the navigation apparatus 450 is operated to compute the elapsed time after completing the operation shown in FIG. 24. When the judgment is made that the elapsed time exceeds a predetermined threshold value, the operation shown in FIG. 24 is restarted by the navigation apparatus 450.

Figure 25:
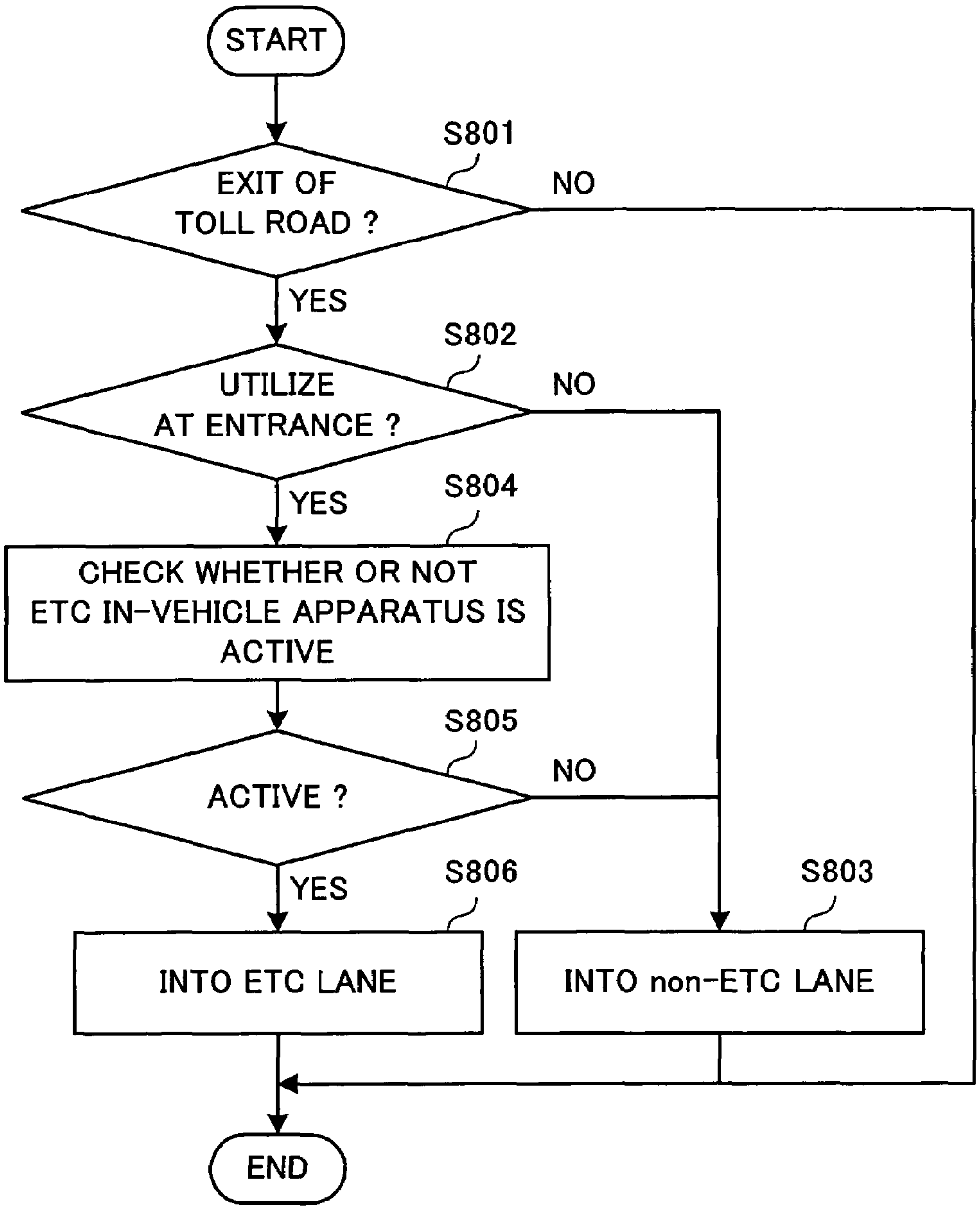
FIG. 25 is a flowchart showing an operation different from the operation shown in FIG. 20, and which is of guiding the automotive vehicle in the vicinity of the exit of the toll by the navigation apparatus shown in FIG. 22.

The operation shown in FIG. 25 may be executed by the navigation apparatus 450 in place of the operation shown in FIG. 24.

When the automotive vehicle is guided by the guiding unit 461 of the navigation apparatus 450 as shown in FIG. 25, the judgment is made by the guiding unit 461 on whether or not the automotive vehicle is in the vicinity of the exit of the toll road on the basis of the current position detected by the position detecting unit 313, in other words, the distance between the automotive vehicle and the exit of the toll road is equal to or smaller than a predetermined threshold value (in the step S801). When the judgment is made in the step S801 that the automotive vehicle is not in the vicinity of the exit of the toll road, the navigation apparatus 450 is operated to complete the step of guiding the automotive vehicle in the vicinity of the exit of the toll road as shown in FIG. 25.

When the judgment is made in the step S801 that the automotive vehicle is in the vicinity of the exit of the toll road, the judgment is made by the guiding unit 461 of the navigation apparatus 450 on whether or not the automotive vehicle is guided with the ETC system through the ETC lane at the entrance of the current toll road (in the step S802). When the judgment is made in the step S802 that the automotive vehicle is guided without the ETC system through the non-ETC lane at the entrance of the current toll road, the guiding unit 461 of the navigation apparatus 450 is operated to guide the automotive vehicle without the ETC system into the non-ETC lane (in the step S803) before completing the step of guiding the automotive vehicle in the vicinity of the exit of the toll road as shown in FIG. 25.

When, on the other hand, the judgment is made in the step S802 that the automotive vehicle is guided with the ETC system through the ETC lane at the entrance of the current toll road, the guiding unit 461 of the navigation apparatus 450 is operated to have the guiding unit 461 receive the information on the operation mode of the in-vehicle apparatus from the communication unit 421 (in the step S804) as has been described in the foregoing embodiment. The guiding unit 461 is then operated to judge whether or not ETC in-vehicle apparatus 260 is in the inactive mode to prevent the ETC system from being utilized on the toll road on the basis of the information on the operation mode of the in-vehicle apparatus (in the step S805).

When the judgment is made in the step S805 that the ETC in-vehicle apparatus 260 is in the inactive mode to prevent the ETC system from being utilized on the current toll road, the step S805 proceeds to the step 803. When, on the other hand, the judgment is made in the step S805 that the ETC in-vehicle apparatus 260 is in the active mode to allow the ETC system to be utilized on the current toll road, the guiding unit 461 is operated to guide the automotive vehicle with the ETC system into the ETC lane at the exit of the current toll road (in the step S806) before completing the step of guiding the automotive vehicle in the vicinity of the exit of the toll road as shown in FIG. 25.

When the automotive vehicle is guided by the navigation apparatus 450, the navigation apparatus 450 is operated to compute the elapsed time after completing the operation shown in FIG. 25. When the judgment is made that the elapsed time exceeds a predetermined threshold value, the operation shown in FIG. 25 is restarted by the navigation apparatus 450.

From the above detail description, it will be understood that the navigation apparatus 450 according to the seventh embodiment can switch the ETC in-vehicle apparatus 260 to the active mode in which the ETC system is utilized on the toll road from the inactive mode in which the ETC system fails to be utilized on the toll road by reason that the guiding unit 461 is operative to guide the automotive vehicle into the non-ETC lane on the basis of the current position detected by the position detecting unit 313 when the judgment is made that the ETC in-vehicle apparatus 260 is in the inactive mode to prevent the ETC system from being utilized on the toll road. Accordingly, the navigation apparatus 450 can reduce the tedious task to be imposed on the user of the ETC system by preventing the user of the ETC system from rushing to set the ETC in-vehicle apparatus 260 to the active mode in which the ETC system is utilized on the toll road when the automotive vehicle is guided with the ETC system on the toll road, compared with a task to be imposed by an apparatus which allows the user to tends to rush to set the ETC in-vehicle apparatus 260 to the active mode before the automotive vehicle is guided into the toll road.

The navigation system according to the seventh embodiment can reduce the tedious task to be imposed on the user of the ETC system in comparison with the tedious task to be imposed on the user of the ETC system by the conventional system by reason that the navigation apparatus 450 can reduce the tedious task to be imposed on the user of the ETC system in comparison with the tedious task to be imposed on the user of the ETC system by the conventional apparatus.

Additionally, even if the judgment is made that there are two or more toll roads on the travel route, the navigation apparatus 450 according to the seventh embodiment is operative to judge in a lump about whether or not to set the active mode in which the ETC system is utilized on the toll roads. However, the navigation apparatus according to the present invention may be operative to selectively set active and inactive modes on each of the toll roads by judging on each of the toll roads on whether to guide the automotive vehicle with the ETC system or without the ETC system as has been described in the second embodiment.

Further, the navigation apparatus 450 according to the seventh embodiment may allow the user to selectively set whether or to utilize the ETC system on the toll road of the travel route after allowing the user to notice the difference between the toll to be collected with the ETC system and the toll to be collected without the ETC system as has been described in the fourth embodiment.

(Eighth Embodiment)

The following description will then be directed to the constitution of the eighth embodiment of the navigation apparatus, the in-vehicle apparatus, and the navigation system according to the present invention.

The constitutional elements of the navigation apparatus, the in-vehicle apparatus, and the navigation system according to the eighth embodiment are substantially the same as those of the navigation apparatus, the in-vehicle apparatus, and the navigation system according to the first embodiment except for the constitutional elements appearing in the following description. Therefore, the constitutional elements of the navigation apparatus, the in-vehicle apparatus, and the navigation system according to the eighth embodiment the same as those of the navigation apparatus, the in-vehicle apparatus, and the navigation system according to the first embodiment will not be described but bear the same reference numerals and legends as those of the navigation apparatus, the in-vehicle apparatus, and the navigation system according to the first embodiment.

Figure 26:
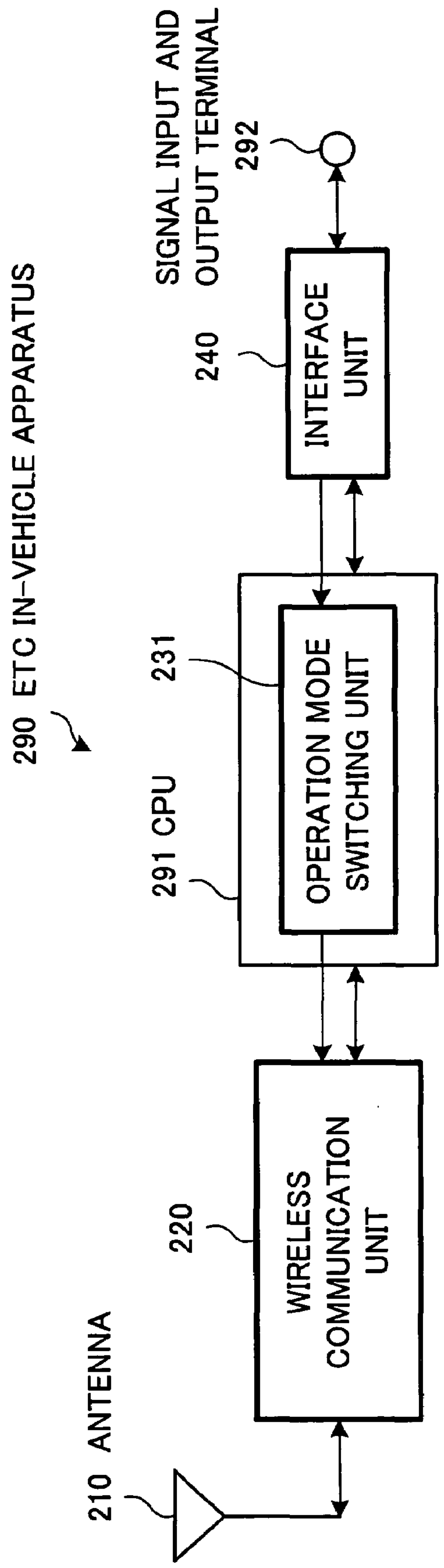
FIG. 26 is a block diagram showing the in-vehicle apparatus according to the eighth embodiment of the present invention.
Figure 27:
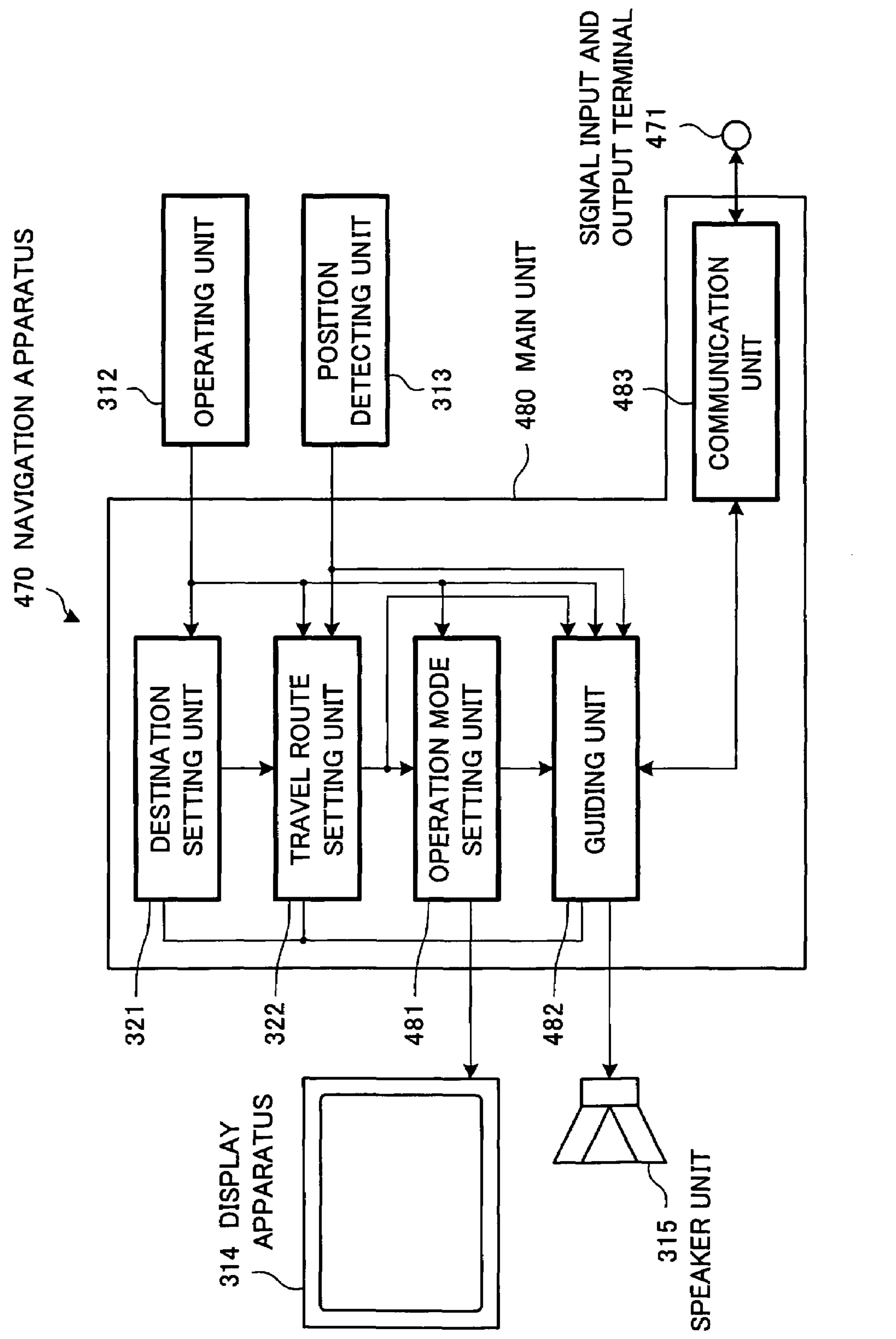
FIG. 27 is a block diagram showing the navigation apparatus according to the eighth embodiment of the present invention.

The ETC navigation system to be provided as a navigation system according to the eighth embodiment is substantially the same in construction as the ETC navigation system 100 according to the first embodiment with the exception of the fact that the ETC navigation system according to the eighth embodiment comprises an ETC in-vehicle apparatus 290 shown in FIG. 26 and a navigation apparatus 470 shown in FIG. 27 in place of the ETC in-vehicle apparatus 200 (see FIG. 2) and the navigation apparatus 300 (see FIG. 3).

As shown in FIG. 26, the ETC in-vehicle apparatus 290 is substantially the same in construction as the ETC in-vehicle apparatus 200 (see FIG. 2) with the exception of the fact that the ETC in-vehicle apparatus 290 includes a central processing unit (CPU) 291 and a signal input and output terminal 292 having inputted therein a signal which is received from the navigation apparatus 470 (see FIG. 27), and having outputted therethrough a signal which is outputted to the navigation apparatus 470 in place of the CPU 230 (see FIG. 2) and the signal input and output terminal 230 (see FIG. 2).

As shown in FIG. 27, the navigation apparatus 470 is substantially the same in construction as the navigation apparatus 300 (see FIG. 1) with the exception of the fact that the navigation apparatus 470 includes a main unit 480 in place of the main unit 320 (see FIG. 1), and further includes a signal input and output terminal 471 having inputted therein a signal which is received from the ETC in-vehicle apparatus 290 (see FIG. 26), and having outputted therethrough a signal which is outputted to the ETC in-vehicle apparatus 290.

The main unit 480 is substantially the same in construction as the main unit 320 with the exception of the fact that the main unit 480 includes an operation mode setting unit 481 constituting operation mode setting means for judging whether or not to set the active mode in which the ETC system is utilized on the toll road of the travel route set by the travel route setting unit 322, a guiding unit 482 constituting guiding means for guiding the automotive vehicle through the specific lane of the toll road, and a communication unit 483 constituting communication means for performing communication with the ETC in-vehicle apparatus 290 in place of the operation mode setting unit 323 (see FIG. 1), the guiding unit 324 (see FIG. 1) and the communication unit 325 (see FIG. 1).

The operation mode setting unit 481 is operative to receive a signal from the operating unit 312, and to produce signals to be respectively outputted to the display apparatus 314 and the guiding unit 482. The operation mode setting unit 481 is constituted by a central processing unit (not shown) and a memory element (not shown).

The guiding unit 482 is operative to receive signals from the operating unit 312, the position detecting unit 313, the travel route setting unit 322, the operation mode setting unit 481 and the communication unit 483, and to produce signals to be respectively outputted to the display apparatus 314, the speaker unit 315, and the communication unit 483. The guiding unit 482 is constituted by a central processing unit (not shown) and a memory element (not shown).

The communication unit 483 is operative to receive signals from the signal input and output terminal 471 and the guiding unit 482, and to produce signals to be respectively outputted to the signal input and output terminal 471 and the guiding unit 482. The communication unit 483 is constituted by a central processing unit (not shown), a memory unit (not shown) and an interface unit (not shown).

The communication unit 483 is operative to receive the utilization information on whether or not to guide the automotive vehicle with the ETC system at the entrance of the current toll road from the ETC in-vehicle apparatus 290. When the judgment is made that there are ETC and non-ETC lanes at the exit of the current toll road under the condition that the automotive vehicle is being guided on the toll road, the guiding unit 482 is operated to judge whether to guide the automotive vehicle with ETC system into the ETC lane, or without the ETC system into the non-ETC lane at the exit of the current toll road on the basis of the utilization information received by the communication unit 483.

The communication unit 483 is operative to transmit the inactive mode setting signal to the ETC in-vehicle apparatus 290 as a signal to have the ETC in-vehicle apparatus 290 assume the inactive mode to prevent the ETC system from not utilized on the toll road on the basis of the current position detected by the position detecting unit 313 and the setting of the operation mode setting unit 481.

The following description will then be directed to the operation of the eighth embodiment of the navigation apparatus, the in-vehicle apparatus, and the navigation system according to the present invention.

The operations of the navigation apparatus, the in-vehicle apparatus, and the navigation system according to the eighth embodiment substantially the same as those of the navigation apparatus, the in-vehicle apparatus, and the navigation system according to the first embodiment will not be described hereinafter.

The operation mode setting unit 481 is then operated to judging whether or not to set the active mode in which the ETC system is utilized on the toll road of the travel route set by the travel route setting unit 322 in response to the operation of the operating unit 312 by having the display apparatus 314 display, as operation mode information, an image to be watched by the user in response to the operation of the operating unit 312 and the travel route set by the travel route setting unit 322.

The operating unit 312 is then operated to issue an instruction to the guiding unit 482 to start to guide the automotive vehicle through the travel route set by the travel route setting unit 322 by having the display apparatus 314 display an image, and by having the speaker unit 315 produce a sound on the basis of the current position detected by the position detecting unit 313.

Figure 28:
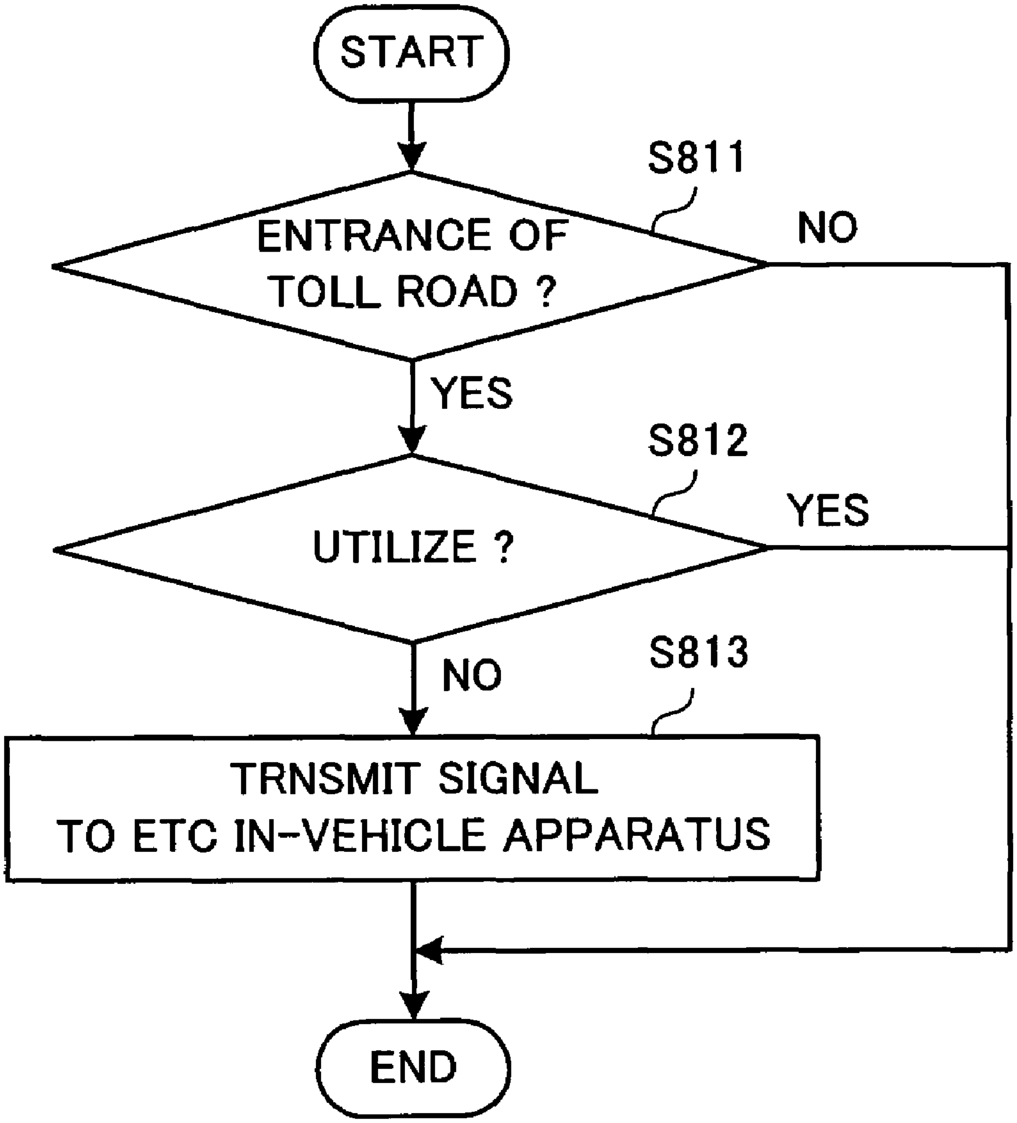
FIG. 28 is a flowchart showing an operation of guiding the automotive vehicle in the vicinity of the entrance of the toll by the navigation apparatus shown in FIG. 27.

When the automotive vehicle is guided by the guiding unit 482 as shown in FIG. 28, the judgment is made by the guiding unit 482 on whether or not the automotive vehicle is in the vicinity of the entrance of the toll road on the basis of the current position detected by the position detecting unit 313, in other words, the distance between the automotive vehicle and the entrance of the toll road is equal to or smaller than a predetermined threshold value (in the step S811). When the judgment is made in the step S811 that the automotive vehicle is not in the vicinity of the entrance of the toll road, the navigation apparatus 470 is operated to complete the step of guiding the automotive vehicle in the vicinity of the entrance of the toll road as shown in FIG. 28.

When, on the other hand, the judgment is made in the step S811 that the automotive vehicle is in the vicinity of the entrance of the toll road, the judgment is made by the guiding unit 482 on whether or not the ETC system is utilized on the toll road on the basis of the setting of the operation mode setting unit 481 (in the step S812). When the judgment is made in the step S812 that the ETC system is not utilized on the toll road, the communication unit 483 is operated to output the inactive mode setting signal to the ETC in-vehicle apparatus 290 (in the step S813). In other words, the inactive mode setting signal is transmitted to the ETC in-vehicle apparatus 290 from the communication unit 483 on the basis of the current position detected by the position detecting unit 313 and the setting of the operation mode setting unit 481.

When the judgment is made in the step S812 that the ETC system is utilized on the toll road, or after the step S813, the navigation apparatus 470 is operated to complete the step of guiding the automotive vehicle in the vicinity of the entrance of the toll road as shown in FIG. 28.

When the automotive vehicle is guided by the navigation apparatus 470, the navigation apparatus 470 is operated to compute the elapsed time after completing the operation shown in FIG. 28. When the judgment is made that the elapsed time exceeds a predetermined threshold value, the operation shown in FIG. 28 is restarted by the navigation apparatus 470.

When the inactive mode setting signal is inputted to the ETC in-vehicle apparatus 290 from the navigation apparatus 470 through the connection cable 110 (see FIG. 3), the ETC in-vehicle apparatus 290 is operated to prevent the ETC system from being utilized on the toll road as has been mentioned in the first embodiment.

Figure 29:
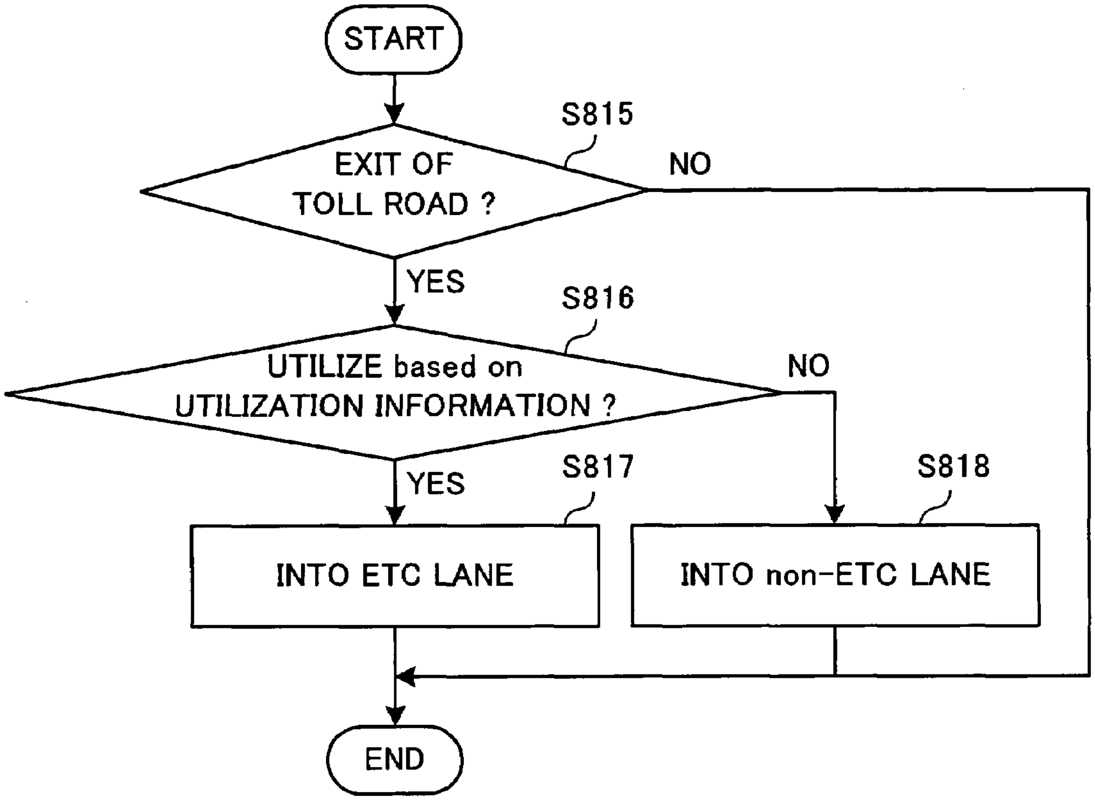
FIG. 29 is a flowchart showing an operation of guiding the automotive vehicle in the vicinity of the exit of the toll by the navigation apparatus shown in FIG. 27.
Figure 30:
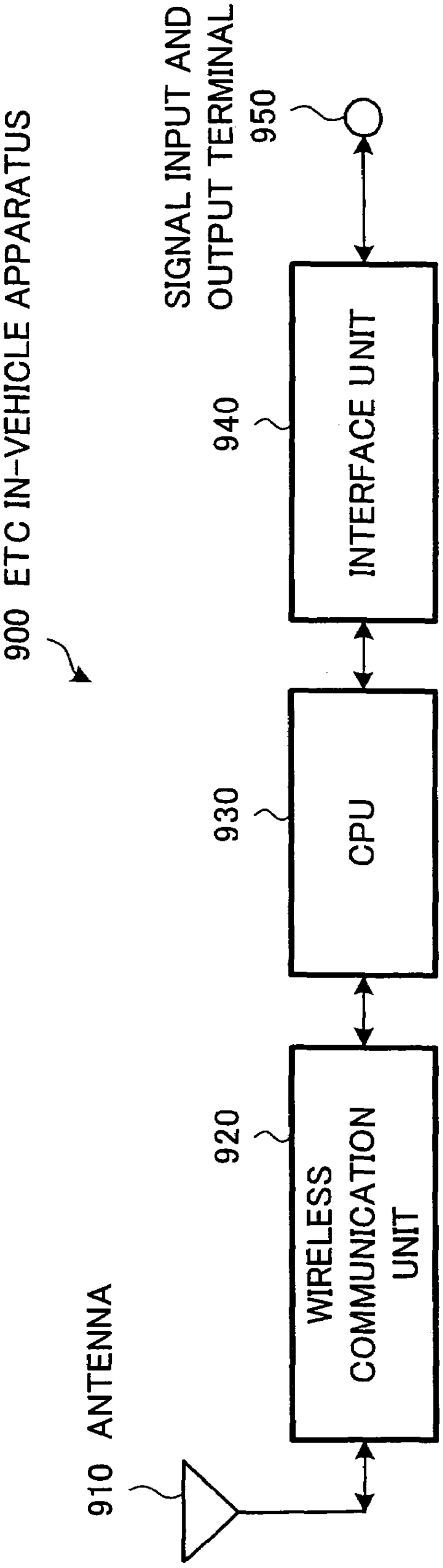
FIG. 30 Prior Art
FIG. 30 is a block diagram showing the conventional in-vehicle apparatus.

When the automotive vehicle is being guided by the guiding unit 482 as shown in FIG. 29, the judgment is made by the guiding unit 482 on whether or not the automotive vehicle is in the vicinity of the exit of the toll road on the basis of the current position detected by the position detecting unit 313, in other words, the distance between the automotive vehicle and the exit of the toll road is equal to or smaller than a predetermined threshold value (in the step S815). When the judgment is made in the step S815 that the automotive vehicle is not in the vicinity of the exit of the toll road, the navigation apparatus 470 is operated to complete the step of guiding the automotive vehicle in the vicinity of the exit of the toll road as shown in FIG. 29.

When the judgment is made in the step S815 that the automotive vehicle is in the vicinity of the exit of the toll road, the guiding unit 482 is operated to judge whether or not the automotive vehicle is guided with the ETC system through the ETC lane at the entrance of the current toll road (in the step S816).

The navigation apparatus, the in-vehicle apparatus, and the navigation system will be more specifically described hereinafter. The guiding unit 482 is firstly operated to have the communication unit 483 obtain the utilization information from the ETC in-vehicle apparatus 290 through the communication cable 110 (see FIG. 3) and the signal input and output terminal 471.

The communication unit 483 of the navigation apparatus 470 is then operated to issue an instruction to the CPU 291 of the ETC in-vehicle apparatus 290 to require the utilization information through the connection cable 130, the signal input and output terminal 292 and the interface unit 240. The utilization information is transmitted to the communication unit 483 of the navigation apparatus 470 through the connection cable 130, the signal input and output terminal 292 and the interface unit 240.

When the utilization information is obtained from the ETC in-vehicle apparatus 290 by the communication unit 483 of the navigation apparatus 470 through the communication cable 110 and the signal input and output terminal 471, the utilization information is inputted to the guiding unit 482 from the communication unit 483.

The judgment is made by the guiding unit 482 on whether or not the automotive vehicle is guided with the ETC system through the ETC lane at the entrance of the current toll road of the travel route on the basis of the utilization information inputted from the communication unit 483.

When the judgment is made in the step S816 on whether or not the automotive vehicle is guided with the ETC system through the ETC lane at the entrance of the current toll road of the travel route, the guiding unit 482 is operated to guide the automotive vehicle with the ETC system into the ETC lane (in the step S817). When, on the other hand, the judgment is made in the step S816 on whether or not the automotive vehicle is guided without the ETC system through the non-ETC lane at the entrance of the current toll road of the travel route, the guiding unit 482 is operated to guide the automotive vehicle into the non-ETC lane (in the step S818). When the judgment is made that there are ETC and non-ETC lanes on the current toll road, the guiding unit 482 is operated to guide the automotive vehicle through the current toll road by judging whether to guide the automotive vehicle into the ETC lane or the non-ETC lane on the basis of the utilization information obtained by the communication unit 483.

After the step 817 or the step S818, the navigation apparatus 470 is operated to complete the step of guiding the automotive vehicle in the vicinity of the exit of the toll road as shown in FIG. 29.

When the automotive vehicle is guided by the navigation apparatus 470, the navigation apparatus 470 is operated to compute the elapsed time after completing the operation shown in FIG. 29. When the judgment is made that the elapsed time exceeds a predetermined threshold value, the operation shown in FIG. 29 is restarted by the navigation apparatus 470.

From the above detail description, it will be understood that the navigation apparatus 470 can reduce the tedious task to be imposed on the user of the ETC system in comparison with the tedious task to be imposed on the user of the ETC system by the conventional apparatus by reason that the ETC in-vehicle apparatus 290 is operative to assume the inactive mode to prevent the ETC system from being utilized in response to the inactive mode setting signal received from the communication unit 483 without ejecting the ETC card from the ETC in-vehicle apparatus 290 when, for example, the automotive vehicle is guided without the ETC system into the toll road.

In this embodiment, the inactive mode setting signal is transmitted to the ETC in-vehicle apparatus 290 from the navigation apparatus 470 on the basis of the judgment of the operation mode setting unit 481. However, the active mode setting signal may be transmitted to the ETC in-vehicle apparatus 290, as a signal to have the ETC in-vehicle apparatus 290 assume an operation mode in which the ETC system is utilized, on the basis of the judgment of the operation mode setting unit 481.

The navigation apparatus 470 can reduce the tedious task to be imposed on the user of the ETC system in comparison with the tedious task to be imposed on the user of the ETC system by the conventional apparatus by reason that the navigation apparatus 470 is operative to transmit an active mode setting signal to the ETC in-vehicle apparatus 290 on the basis of the setting of the operation mode setting unit 481 to set the ETC in-vehicle apparatus 290 to the active mode to allow the ETC system to be utilized in response to the active mode setting signal without allowing the user of ETC system to insert the ETC card into the ETC in-vehicle apparatus 290 when, for example, the automotive vehicle is guided with the ETC system into the toll road.

The ETC in-vehicle apparatus 290 can reduce the tedious task to be imposed on the user of the ETC system in comparison with the tedious task to be imposed on the user of the ETC system by the conventional apparatus by reason that the ETC in-vehicle apparatus 290 is operative to assume the inactive mode to prevent the ETC system from being utilized in response to the inactive mode setting signal received from the communication unit 483 without ejecting the ETC card from the ETC in-vehicle apparatus 290 when, for example, the automotive vehicle is guided without the ETC system into the toll road.

In this embodiment, the navigation apparatus 470 can reduce the tedious task to be imposed on the user of the ETC system in comparison with the tedious task to be imposed on the user of the ETC system by the conventional apparatus by reason that the guiding unit 482 is operative to guide the automotive vehicle into a lane based on the utilization information obtained from the ETC in-vehicle apparatus 290 through the communication unit 483 without allowing the user of the ETC system to check the traffic sign indicative of the ETC lane or the non-ETC lane at the exit of the toll road.

The navigation apparatus 470 can reduce the tedious task to be imposed on the user of the ETC system in comparison with the tedious task to be imposed on the user of the ETC system by the conventional apparatus by reason that the guiding unit 482 is operative to guide the automotive vehicle into a lane based on the utilization information obtained from the ETC in-vehicle apparatus 290 through the communication unit 483 if the user carelessly forgets the fact that the automotive vehicle is guided with the ETC system at the entrance of the toll road, or without the ETC system at the entrance of the current toll road.

The ETC navigation system according to the eighth embodiment can reduce the tedious task to be imposed on the user of the ETC system in comparison with the tedious task to be imposed on the user of the ETC system by the conventional system by reason that the ETC navigation system comprises an ETC in-vehicle apparatus 290 and a navigation apparatus 470.

In this embodiment, the operation mode setting unit 481 is operative to have the display apparatus 314 display an image as output information. However, the operation mode setting unit may be operative to have the speaker unit 315 produce a sound in addition to the image displayed by the display apparatus 314.

In accordance with the present invention, there is provided a navigation apparatus which can reduce the tedious task to be imposed on the user of the ETC system in comparison with the tedious task to be imposed on the user of the ETC system by the conventional apparatus.

What is claimed is:

1. A navigation apparatus, comprising:

position detecting means for detecting a current position of an automotive vehicle;

destination setting means for setting a destination of said automotive vehicle;

travel route setting means for setting a travel route to said destination set by said destination setting means on the basis of said current position detected by said position detecting means, wherein an electronic toll collection system is situated on said travel route;

operation mode setting means for setting whether or not to utilize an electronic toll collection system on said travel route set by said travel route setting means; and communication means for performing communication with an in-vehicle apparatus provided in said automotive vehicle as part of said electronic toll collection system, said communication means being operative to transmit a signal to said in-vehicle apparatus to change an operation mode of said in-vehicle apparatus between utilizing said electronic toll collection system and not utilizing said electronic toll collection system as said automotive vehicle travels on said travel route on which said electronic toll collection system is situated.

2. A navigation apparatus as set forth in claim 1, in which said operation mode setting means includes toll road extracting means for extracting a toll road from the travel route set by the travel route setting unit, and toll road setting means for setting in each toll road extracted by said toll road extracting means whether or not an electronic toll collection system is utilized.

3. A navigation system, comprising:

a navigation apparatus as set forth in claim 1; and an in-vehicle apparatus provided in said automotive vehicle as part of said electronic toll collection system, and adapted to perform communication with said communication means of said navigation apparatus.

4. A navigation apparatus as set forth in claim 1, in which said communication means is operative to produce an active state setting signal as said signal to be transmitted to said in-vehicle apparatus, and to allow said in-vehicle apparatus to perform communication with a roadside antenna located as part of said electronic toll collection system at a toll station on said travel route.

5. A navigation apparatus as set forth in claim 1, in which said communication means is operative to produce an inactive state setting signal as said signal to be transmitted to said in-vehicle apparatus, and to prevent said in-vehicle apparatus from performing communication with a roadside antenna located as part of said electronic toll collection system at a toll station on said travel route.

6. A navigation apparatus, comprising:

position detecting means for detecting a current position of an automotive vehicle;

on a travel route operation mode setting means for setting whether or not an electronic toll collection system is utilized by travel route setting means; and communication means for performing communication with an in-vehicle apparatus provided in said automotive vehicle as part of said electronic toll collection system, said communication means being operative to transmit a signal to said in-vehicle apparatus to change an operation mode of said in-vehicle apparatus between utilizing said electronic toll collection system and not utilizing said electronic toll collection system as said automotive vehicle travels on said travel route on which said electronic toll collection system is situated.

7. A navigation system, comprising:

a navigation apparatus as set forth in claim 6; and an in-vehicle apparatus provided in said automotive vehicle as part of said electronic toll collection system to perform communication with said communication means of said navigation apparatus.

* * * * *